United States Patent
Hsu et al.

(10) Patent No.: US 9,316,819 B2
(45) Date of Patent: Apr. 19, 2016

(54) IMAGING LENS SYSTEM

(71) Applicant: LARGAN PRECISION CO., LTD., Taichung (TW)

(72) Inventors: Po-Lun Hsu, Taichung (TW); Wei-Yu Chen, Taichung (TW); Chun-Che Hsueh, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 624 days.

(21) Appl. No.: 13/677,556

(22) Filed: Nov. 15, 2012

(65) Prior Publication Data

US 2014/0071522 A1 Mar. 13, 2014

(30) Foreign Application Priority Data

Sep. 10, 2012 (TW) .............................. 101132947 A

(51) Int. Cl.
*G02B 13/18* (2006.01)
*G02B 9/12* (2006.01)
*G02B 13/14* (2006.01)
*G02B 13/00* (2006.01)

(52) U.S. Cl.
CPC ...... *G02B 13/18* (2013.01); *G02B 9/12* (2013.01); *G02B 13/0035* (2013.01); *G02B 13/14* (2013.01)

(58) Field of Classification Search
CPC .............. G02B 9/00; G02B 9/12; G02B 9/16; G02B 13/00; G02B 13/001; G02B 13/002; G02B 13/0035; G02B 13/0055; G02B 13/008; G02B 13/14; G02B 13/18
See application file for complete search history.

(56) References Cited

U.S. PATENT DOCUMENTS

| 2007/0279767 | A1* | 12/2007 | Murakami et al. ............. 359/791 |
| 2008/0019023 | A1* | 1/2008 | Noda ............................. 359/784 |
| 2013/0170050 | A1* | 7/2013 | Lu et al. ......................... 359/784 |

FOREIGN PATENT DOCUMENTS

JP 2012-108230 A 6/2012

OTHER PUBLICATIONS

Translation of "Search Report" for TW Application No. 101132947.

* cited by examiner

*Primary Examiner* — Thong Nguyen
(74) *Attorney, Agent, or Firm* — Locke Lord LLP; Tim Tingkang Xia, Esq.

(57) ABSTRACT

This invention provides an imaging lens system, in order from an object side to an image side comprising: a first positive lens element having a convex object-side surface at a paraxial region and a convex image-side surface at the paraxial region; a plastic positive second lens element having a concave object-side surface at the paraxial region, a convex image-side surface at the paraxial region, and both of the object-side and image-side surfaces being aspheric; and a plastic negative third lens element having a concave object-side surface at the paraxial region, a concave at the paraxial region and convex at a peripheral region image-side surface, and both of the object-side and image-side surfaces being aspheric.

18 Claims, 36 Drawing Sheets

IMAGING LENS SYSTEM

CROSS-REFERENCE TO RELATED APPLICATION

This non-provisional application claims priority under 35 U.S.C. §119(a) on Patent Application No. 101132947 filed in Taiwan (R.O.C.) on Sep. 10, 2012, the entire contents of which are hereby incorporated by reference.

BACKGROUND OF THE INVENTION

1. Field of the Invention

The present invention relates to an imaging lens system, and more particularly, to an imaging lens system used in electronic products and infrared photography.

2. Description of the Related Art

The demand for compact imaging lens assembly grows in recent years with the increasing popularity of portable electronic products with photographing function. The sensor of a general photographing camera is none other than CCD (Charge Coupled Device) or CMOS (Complementary Metal Oxide Semiconductor) sensor. Furthermore, as the advanced semiconductor manufacturing technology has allowed the pixel size of the sensors to be reduced, and the current electronic products are leaning toward a trend of being more compact, there is an increasing demand for high quality imaging lens.

On the other hand, the emerging motion capture technology applied in smart TV or motion sensing games also expands the application of compact imaging lens. The feature of these applications is by an infrared camera directly capturing the user's motion, the user takes control of the device intuitively; the experience of the motion sensing operation is elevated. Therefore, the demand for compact imaging lens operated in the infrared wavelength range has increased; what is more, lenses with wide viewing angle are even more welcome because they can extend the capturing range of the camera.

In view of this, an imaging lens structure applied in slim and portable electronic devices is needed; on one hand, imaging lenses with this structure can be optimized for the requirement of ordinary photography (wide viewing angle, large aperture, image quality, etc.), on the other hand, lenses with this structure can be optimized for motion capture in the infrared wavelength range.

SUMMARY OF THE INVENTION

The present invention provides an imaging lens system, in order from an object side to an image side comprising: a first lens element with positive refractive power having a convex object-side surface at a paraxial region and a convex image-side surface at the paraxial region; a plastic second lens element with positive refractive power having a concave object-side surface at the paraxial region, a convex image-side surface at the paraxial region, and both of the object-side and image-side surfaces thereof being aspheric; and a plastic third lens element with negative refractive power having a concave object-side surface at the paraxial region, a concave at the paraxial region and convex at a peripheral region image-side surface, and both of the object-side and image-side surfaces thereof being aspheric; wherein the lens elements of the imaging lens system with refractive power are the first lens element, the second lens element, and the third lens element, a curvature radius of the object-side surface of the first lens element is R1, a curvature radius of the image-side surface of the first lens element is R2, a focal length of the first lens element is f1, a focal length of the second lens element is f2, and they satisfy the following relations: $-0.5<(R1+R2)/(R1-R2)<1.0$; and $1.65<f1/f2<5.0$.

In another aspect, the present invention provides an imaging lens system, in order from an object side to an image side comprising: a first lens element with positive refractive power having a convex object-side surface at a paraxial region and a convex image-side surface at the paraxial region; a plastic second lens element with positive refractive power having a concave object-side surface at the paraxial region, a convex image-side surface at the paraxial region, and both of the object-side and image-side surfaces thereof being aspheric; and a plastic third lens element with negative refractive power having a concave object-side surface at the paraxial region, a concave at the paraxial region and convex at a peripheral region image-side surface, and both of the object-side and image-side surfaces thereof being aspheric; wherein the lens elements of the imaging lens system with refractive power are the first lens element, the second lens element, and the third lens element, a curvature radius of the object-side surface of the first lens element is R1, a curvature radius of the image-side surface of the first lens element is R2, a curvature radius of the object-side surface of the third lens element is R5, a focal length of the imaging lens system is f, and they satisfy the following relations: $-0.5<(R1+R2)/(R1-R2)<1.0$; and $-1.33<R5/f<-0.55$.

In still another aspect, the present invention provides an imaging lens system, in order from an object side to an image side comprising: a first lens element with positive refractive power having a convex object-side surface at a paraxial region and a convex image-side surface at the paraxial region; a plastic second lens element with positive refractive power having a concave object-side surface at the paraxial region, a convex image-side surface at the paraxial region, and both of the object-side and image-side surfaces thereof being aspheric; and a plastic third lens element with negative refractive power having a concave at the paraxial region and convex at a peripheral region image-side surface, and both of the object-side and image-side surfaces thereof being aspheric; wherein the lens elements of the imaging lens system with refractive power are the first lens element, the second lens element, and the third lens element, the imaging lens system is used for optical wavelengths ranging from 780 nm to 950 nm, a curvature radius of the object-side surface of the first lens element is R1, a curvature radius of the image-side surface of the first lens element is R2, and they satisfy the following relation: $-0.5<(R1+R2)/(R1-R2)<1.0$.

In the aforementioned imaging lens system, the first lens element has positive refractive power to effectively distribute the refractive power of the second lens and helps to reduce the sensitivity of the imaging lens system. The second lens element has positive refractive power and provides the main refractive power of the system to control the total track length of the lens system effectively and avoid too large a volume of the lens system. The third lens element has negative refractive power and forms a positive-negative telephoto structure with the second lens element and can reduce the total track length of the imaging lens system effectively. With the aforementioned configuration, the present invention can reduce the total track length of the imaging lens system, increase the viewing angle of the lens system effectively, and facilitate the compact and wide-angle applications.

DETAILED DESCRIPTION OF THE PREFERRED EMBODIMENTS

Figure 1A:
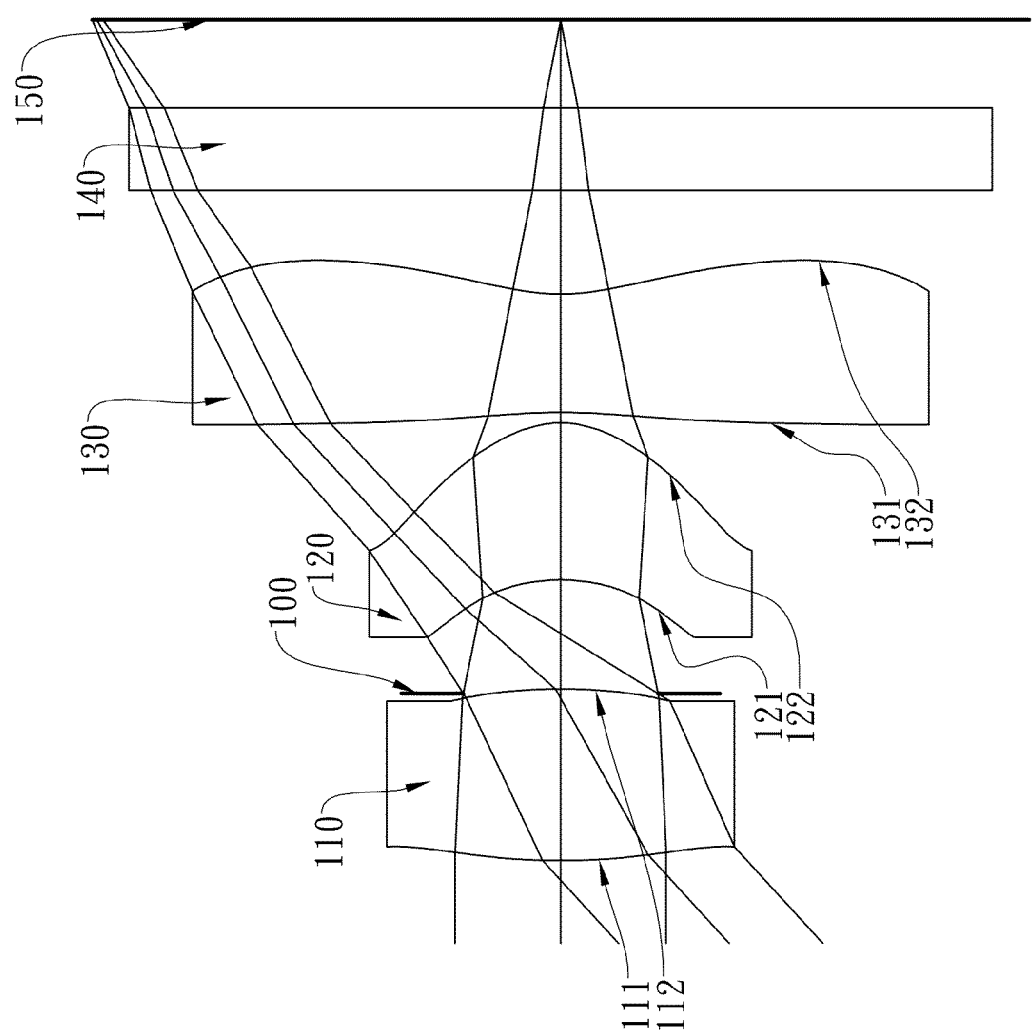
FIG. 1A shows an imaging lens system in accordance with the first embodiment of the present invention.

The present invention provides an imaging lens system, in order from an object side to an image side comprising: a first lens element with positive refractive power having a convex object-side surface at a paraxial region and a convex image-side surface at the paraxial region; a plastic second lens element with positive refractive power having a concave object-side surface at the paraxial region, a convex image-side surface at the paraxial region, and both of the object-side and image-side surfaces thereof being aspheric; and a plastic third lens element with negative refractive power having a concave object-side surface at the paraxial region, a concave at the paraxial region and convex at a peripheral region image-side surface, and both of the object-side and image-side surfaces thereof being aspheric; wherein the lens elements of the imaging lens system with refractive power are the first lens element, the second lens element, and the third lens element, a curvature radius of the object-side surface of the first lens element is R1, a curvature radius of the image-side surface of the first lens element is R2, a focal length of the first lens element is f1, a focal length of the second lens element is f2, and they satisfy the following relations: $-0.5<(R1+R2)/(R1-R2)<1.0$; and $1.65<f1/f2<5.0$.

When the relation of $-0.5<(R1+R2)/(R1-R2)<1.0$ is satisfied, the positive refractive power of the first lens element can be controlled properly to correct spherical aberration; preferably, the following relation is satisfied: $-0.1<(R1+R2)/(R1-R2)<0.8$.

When the relation of $1.65<f1/f2<5.0$ is satisfied, the refractive power of the first and the second lens element can be distributed properly; therefore, aberrations of the imaging lens system are not excessively large; preferably, the following relation is satisfied: $2.0<f1/f2<3.4$.

In the aforementioned imaging lens system, the lens system further comprises a stop disposed between the first lens element and the second lens element, an axial distance between the stop and the image plane is SL, an axial distance between the object-side surface of the first lens element and the image plane is TTL; preferably, they satisfy the following relation: $0.65<SL/TTL<0.88$, which is favorable for the imaging lens system's having a good balance between the telecentric property and wide field of view.

In the aforementioned imaging lens system, the non-axial tangent points of tangential lines perpendicular to the optical axis on the object-side surface of the third lens element are critical points; preferably, at least one critical point is formed on the object-side surface of the third lens element, which reduces the incident angle at which rays from off-axis field enter the sensor and further corrects the off-axis aberrations.

In the aforementioned imaging lens system, a curvature radius of the object-side surface of the third lens element is R5, a focal length of the imaging lens system is f; preferably, they satisfy the following relation: $-1.33<R5/f<-0.55$, which is favorable for reducing the incident angle at which rays enter the sensor and increasing the photosensitivity.

In the aforementioned imaging lens system, a central thickness of the second lens element is CT2, a focal length of the imaging lens system is f; preferably, they satisfy the following relation: $0.28<CT2/f<0.50$, which is favorable for the molding and uniformity of the lens during plastic injection molding, and ensures good image quality from the imaging lens system.

In the aforementioned imaging lens system; preferably, the imaging lens system is used for optical wavelengths ranging from 780 nm to 950 nm to reduce the interference from ambient visible light, increase the image resolution effectively, and fulfill the requirements of motion capture technology.

In the aforementioned imaging lens system, a curvature radius of the object-side surface of the third lens element is R5, a curvature radius of the image-side surface of the third lens element is R6; preferably, they satisfy the following relation: $0<(R5+R6)/(R5-R6)<0.8$, which is favorable for correcting the high-order aberration of the system.

In the aforementioned imaging lens system; preferably, the stop of the lens system is closer to the object side than an intersection of the image-side surface of the first lens element and the optical axis to increase the distance between the exit pupil of the lens system and the image plane; therefore, the lens system possesses telecentric property; the photosensitivity of the sensors, such as CCD or CMOS, is improved.

In the aforementioned imaging lens system, a focal length of the imaging lens system is f, the focal length of the second lens element is f2; preferably, they satisfy the following relation: $2.0<f/f2<3.6$. When the above relation is satisfied, the second lens element provides most of the refractive power of the imaging lens system, and the astigmatism of the system can be corrected effectively.

In the aforementioned imaging lens system, a distance in parallel with an optical axis from a point on the object-side surface of the third lens element to an axial vertex on the object-side surface of the third lens element is Sag31, a height perpendicular to the optical axis from the point on the object-side surface of the third lens element to the optical axis is Y, a derivative of the distance Sag31 with respect to the height Y is Dsag31, and Dsag31 changes from positive to negative or vice versa at least twice between a paraxial region and a peripheral region of the object-side surface of the third lens element, which effectively reduces the incident angle at which rays from off-axis field enter the sensor and corrects the aberrations of the off-axis field further.

In the aforementioned imaging lens system; preferably, the object-side surface of the first lens element is concave at the peripheral region, which effectively reduces the incident angle at which rays from off-axis field enter the sensor and corrects the aberrations of the off-axis field further.

In the aforementioned imaging lens system, an axial distance between the object-side surface of the first lens element and the image-side surface of the third lens element is Td; preferably, Td satisfies the following relation: 1.0 mm<Td<2.70 mm, which is favorable for the compactness of the lens system integrated into a slim and portable electronic device.

In another aspect, the present invention provides an imaging lens system, in order from an object side to an image side comprising: a first lens element with positive refractive power having a convex object-side surface at a paraxial region and a convex image-side surface at the paraxial region; a plastic second lens element with positive refractive power having a concave object-side surface at the paraxial region, a convex image-side surface at the paraxial region, and both of the object-side and image-side surfaces thereof being aspheric; and a plastic third lens element with negative refractive power having a concave object-side surface at the paraxial region, a concave at the paraxial region and convex at a peripheral region image-side surface, and both of the object-side and image-side surfaces thereof being aspheric; wherein the lens elements of the imaging lens system with refractive power are the first lens element, the second lens element, and the third lens element, a curvature radius of the object-side surface of the first lens element is R1, a curvature radius of the image-side surface of the first lens element is R2, a curvature radius of the object-side surface of the third lens element is R5, a focal length of the imaging lens system is f, and they satisfy the following relations: $-0.5<(R1+R2)/(R1-R2)<1.0$; and $-1.33<R5/f<-0.55$.

When the relation of $-0.5<(R1+R2)/(R1-R2)<1.0$ is satisfied, the positive refractive power of the first lens element can be controlled properly to correct spherical aberration.

When the relation of $-1.33<R5/f<-0.55$ is satisfied, the incident angle at which rays enter the sensor is reduced, and the photosensitivity of the system is improved.

In the aforementioned imaging lens system, the focal length of the imaging lens system is f, a focal length of the first lens element is f1; preferably, they satisfy the following relation: $0.5<f/f1<1.1$, which makes the refractive power allocated to the first lens element more balanced to control the total track length of the imaging lens system, maintains the compactness of the system, and avoids the excessive high-order spherical aberration to enhance the image quality.

In the aforementioned imaging lens system, the focal length of the imaging lens system is f, a focal length of the second lens element is f2; preferably, they satisfy the following relation: $2.0<f/f2<3.6$. When the above relation is satisfied, the second lens element provides most of the refractive power of the imaging lens system, and the astigmatism of the system can be corrected effectively.

In the aforementioned imaging lens system, the non-axial tangent points of tangential lines perpendicular to the optical axis on the object-side surface of the third lens element are critical points; preferably, at least one critical point is formed on the object-side surface of the third lens element, which reduces the incident angle at which rays from off-axis field enter the sensor and further corrects the off-axis aberrations.

In the aforementioned imaging lens system; preferably, the imaging lens system is used for optical wavelengths ranging from 780 nm to 950 nm to reduce the interference from ambient visible light, increase the image resolution effectively, and fulfill the requirements of motion capture technology.

In the aforementioned imaging lens system, an axial distance between the object-side surface of the first lens element and the image-side surface of the third lens element is Td; preferably, Td satisfies the following relation: 1.0 mm<Td<2.70 mm, which is favorable for the compactness of the lens system integrated into a slim and portable electronic device.

In the aforementioned imaging lens system, a maximal field of view of the imaging lens system is FOV; preferably, it satisfies the following relation: 75 degrees<FOV<100 degrees, which fulfills the application in wide field of view.

In the aforementioned imaging lens system, the focal length of the imaging lens system is f, an entrance pupil diameter of the imaging lens system is EPD; preferably, they satisfy the following relation: $1.4<f/EPD<2.6$, which ensures sufficient amount of incident light to enhance the efficiency of the sensor and is favorable for capturing dynamic and high-speed images.

In the aforementioned imaging lens system, a distance in parallel with an optical axis from a point on the object-side surface of the third lens element to an axial vertex on the object-side surface of the third lens element is Sag31, a height perpendicular to the optical axis from the point on the object-side surface of the third lens element to the optical axis is Y, a derivative of the distance Sag31 with respect to the height Y is Dsag31, and Dsag31 changes from positive to negative or vice versa at least twice between a paraxial region and a peripheral region of the object-side surface of the third lens element, which effectively reduces the incident angle at which rays from off-axis field enter the sensor and corrects the aberrations of the off-axis field further.

In yet another aspect, the present invention provides An imaging lens system, in order from an object side to an image side comprising: a first lens element with positive refractive power having a convex object-side surface at a paraxial region and a convex image-side surface at the paraxial region; a plastic second lens element with positive refractive power having a concave object-side surface at the paraxial region, a convex image-side surface at the paraxial region, and both of the object-side and image-side surfaces thereof being aspheric; and a plastic third lens element with negative refractive power having a concave at the paraxial region and convex at a peripheral region image-side surface, and both of the object-side and image-side surfaces thereof being aspheric; wherein the lens elements of the imaging lens system with refractive power are the first lens element, the second lens element, and the third lens element, the imaging lens system is used for optical wavelengths ranging from 780 nm to 950 nm, a curvature radius of the object-side surface of the first lens element is R1, a curvature radius of the image-side surface of the first lens element is R2, and they satisfy the following relation: $-0.5<(R1+R2)/(R1-R2)<1.0$.

When the relation of $-0.5<(R1+R2)/(R1-R2)<1.0$ is satisfied, the positive refractive power of the first lens element can be controlled properly to correct spherical aberration.

In the aforementioned imaging lens system; preferably, the object-side surface of the third lens element is concave at the paraxial region, which effectively reduces the incident angle at which rays from off-axis field enter the sensor and corrects the aberrations of the off-axis field further.

In the aforementioned imaging lens system, a focal length of the imaging lens system is f, an entrance pupil diameter of the imaging lens system is EPD; preferably, they satisfy the following relation: $1.4<f/EPD<2.6$, which ensures sufficient amount of incident light to enhance the efficiency of the sensor and is favorable for capturing dynamic and high-speed images.

In the aforementioned imaging lens system, a focal length of the first lens element is f1, a focal length of the second lens element is f2; preferably, they satisfy the following relation: $2.0<f1/f2<3.4$. When the above relation is satisfied, the refractive power of the first and the second lens element can be distributed properly; therefore, aberrations of the imaging lens system are not excessively large.

In the aforementioned imaging lens system, an axial distance between the object-side surface of the first lens element and the image-side surface of the third lens element is Td; preferably, Td satisfies the following relation: $1.0 \text{ mm}<Td<2.70 \text{ mm}$, which is favorable for the compactness of the lens system integrated into a slim and portable electronic device.

In the aforementioned imaging lens system, a distance in parallel with an optical axis from a point on the object-side surface of the third lens element to an axial vertex on the object-side surface of the third lens element is Sag31, a height perpendicular to the optical axis from the point on the object-side surface of the third lens element to the optical axis is Y, a derivative of the distance Sag31 with respect to the height Y is Dsag31, and Dsag31 changes from positive to negative or vice versa at least twice between a paraxial region and a peripheral region of the object-side surface of the third lens element, which effectively reduces the incident angle at which rays from off-axis field enter the sensor and corrects the aberrations of the off-axis field further.

In the imaging lens system of the present invention, the lens elements can be made of glass or plastic materials. If the lens elements are made of glass, the freedom for distributing the refractive power of the imaging lens system can be increased. If plastic material is adopted to produce the lens elements, the production cost will be reduced effectively; additionally, the surfaces of the lens elements can be aspheric and easily made into non-spherical profiles, allowing more design parameters which can be used to reduce aberrations and the number of the lens elements used in an optical system. Consequently, the total track length of the imaging lens system can be effectively reduced.

In the imaging lens system of the present invention, there can be at least one stop provided, such as an aperture stop, a glare stop or a field stop. Said glare stop or said field stop is for eliminating the stray light and thereby improving the image resolution thereof.

In the imaging lens system of the present invention, if a lens element is described to have a convex surface, it means the portion of the surface in proximity to the optical axis is convex; if a lens element is described to have a concave surface, it means the portion of the surface in proximity to the optical axis is concave. In the imaging lens system of the present invention, if a surface of a lens element is described to have an inflection point, the second derivative of the sag of said surface switches signs once.

The imaging lens system of the present invention will be detailed by the following embodiments accompanied by the drawings.

Embodiment 1

Figure 1B:
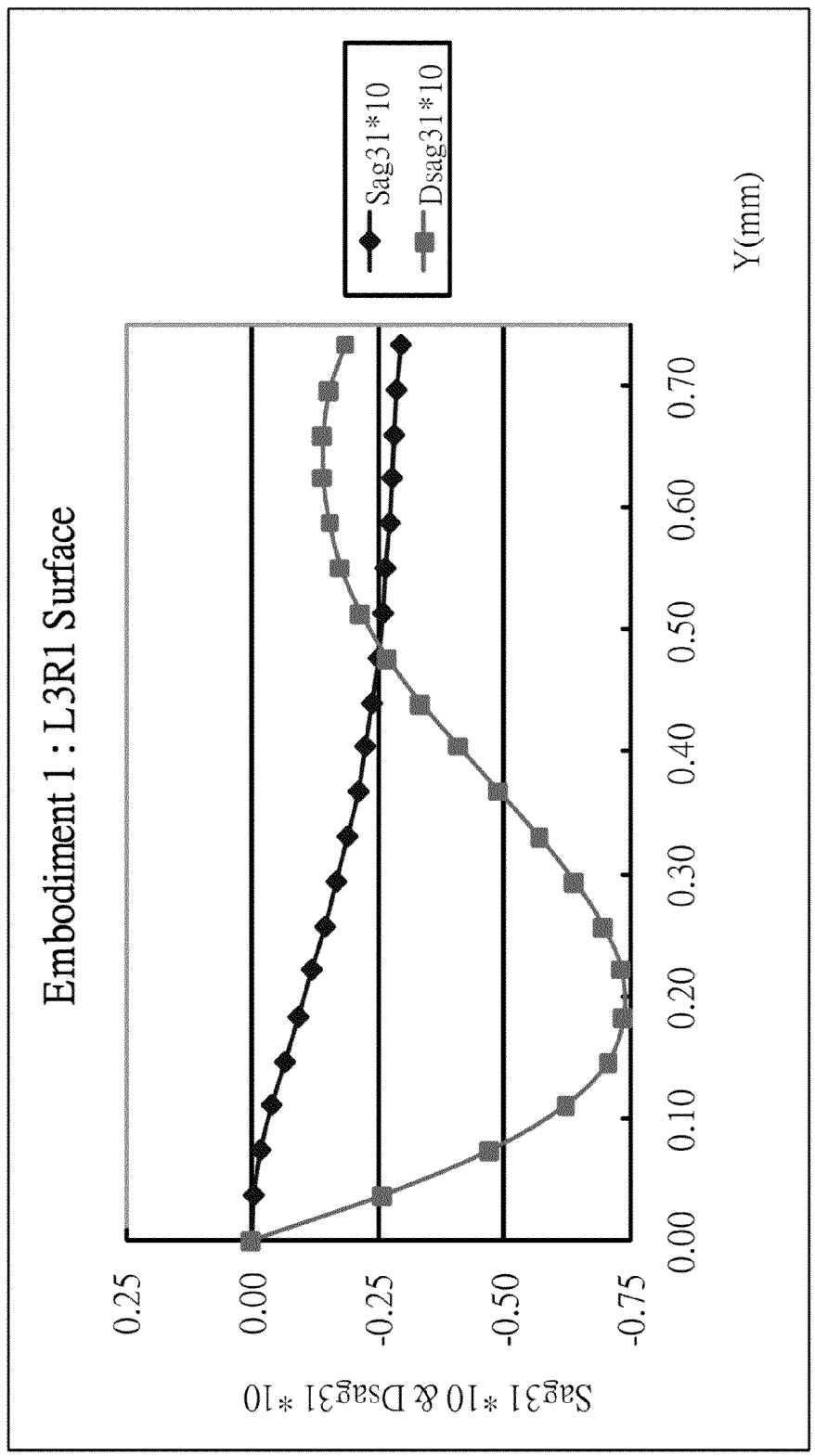
FIG. 1B shows the object-side surface characteristics of the third lens element of the first embodiment of the present invention.
Figure 1C:
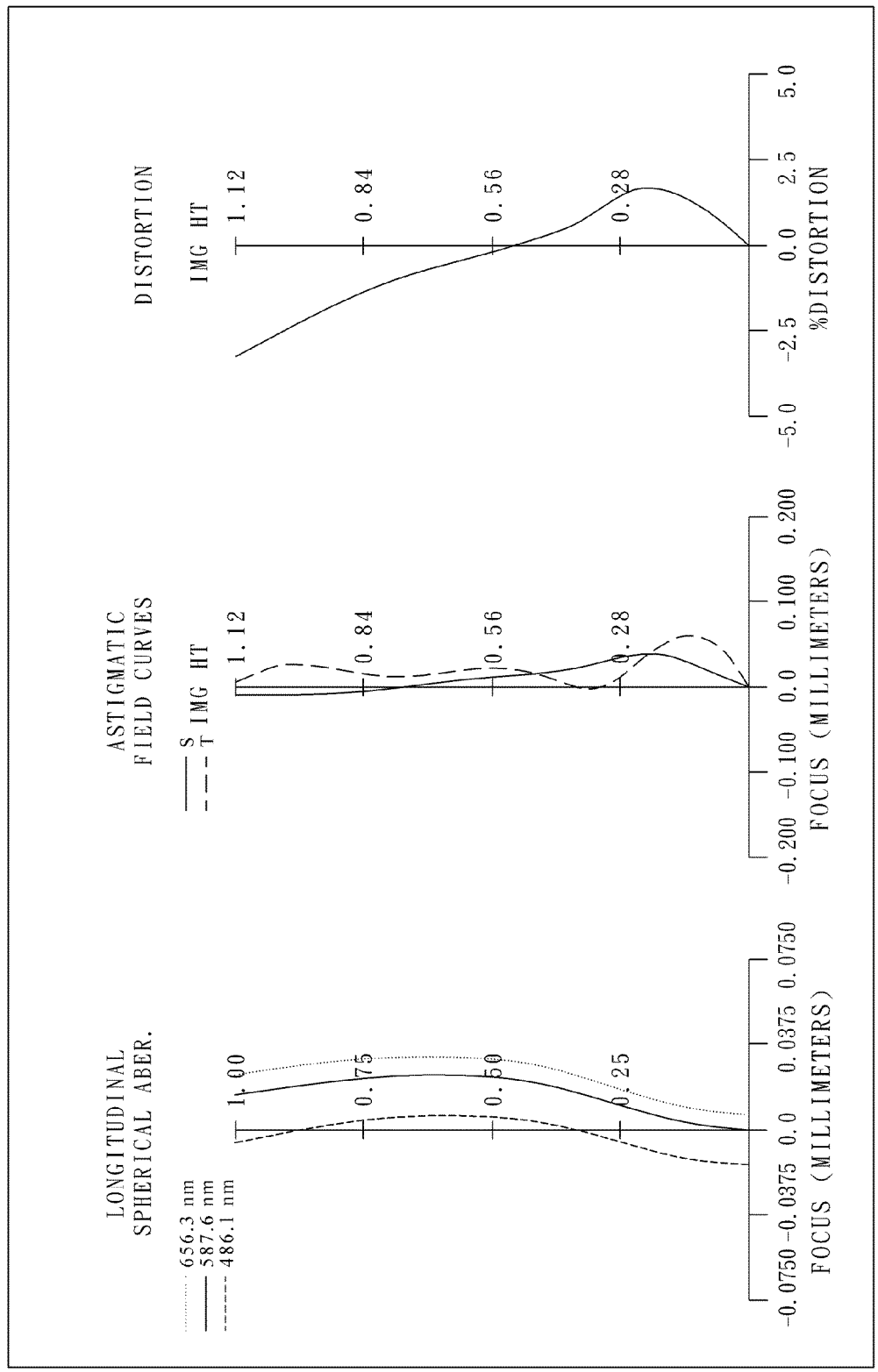
FIG. 1C shows the aberration curves of the first embodiment of the present invention.

FIG. 1A shows an imaging lens system in accordance with the first embodiment of the present invention, FIG. 1B shows the object-side surface characteristics of the third lens element of the first embodiment of the present invention, and FIG. 1C shows the aberration curves of the first embodiment of the present invention. The imaging lens system of the first embodiment of the present invention mainly comprises three lens elements, in order from an object side to an image side:

a plastic first lens element 110 with positive refractive power having a convex at the paraxial region and concave at the peripheral region object-side surface 111, a convex image-side surface 112 at the paraxial region, and both of the object-side surface 111 and image-side surface 112 thereof being aspheric;

a plastic second lens element 120 with positive refractive power having a concave object-side surface 121 at the paraxial region, a convex image-side surface 122 at the paraxial region, and both of the object-side surface 121 and image-side surface 122 thereof being aspheric; and a plastic third lens element 130 with negative refractive power having a concave object-side surface 131 at the paraxial region, a concave at the paraxial region and convex at the peripheral region image-side surface 132, and both of the object-side surface 131 and image-side surface 132 thereof being aspheric;

wherein the imaging lens system further comprises a stop 100 disposed between the first lens element 110 and the second lens element 120, and the stop 100 is closer to the object side than an intersection of the image-side surface 112 of the first lens element 110 and the optical axis;

the imaging lens system further comprises a filter element 140 disposed between the image-side surface 132 of the third lens element 130 and an image plane 150, and the filter element 140 is made of glass and has no influence on the focal length of the imaging lens system.

The detailed optical data of the first embodiment is shown in TABLE 1, the aspheric surface data is shown in TABLE 2, and the object-side surface characteristics of the third lens element is shown in TABLE 3, wherein the units of the curvature radius, the thickness and the focal length are mm, and HFOV is half of the maximal field of view.

TABLE 1

(Embodiment 1)
f = 1.25 mm, Fno = 2.46, HFOV = 42.5 deg.

| Surface # | | Curvature Radius | | Thickness | Material | | Refractive Index | Focal Length |
|---|---|---|---|---|---|---|---|---|
| 0 | Object | Plano | | Infinity | | | | |
| 1 | Lens 1 | 1.458 | ASP | 0.415 | Plastic | APEL-5514ML | 1.544 | 1.41 |
| 2 | | −1.458 | ASP | −0.011 | | | | |
| 3 | Ape. Stop | Plano | | 0.275 | | | | |
| 4 | Lens 2 | −0.450 | ASP | 0.380 | Plastic | APEL-5514ML | 1.544 | 0.53 |
| 5 | | −0.229 | ASP | 0.025 | | | | |
| 6 | Lens 3 | −1.356 | ASP | 0.286 | Plastic | APEL-5514ML | 1.544 | −0.60 |
| 7 | | 0.458 | ASP | 0.250 | | | | |
| 8 | Filter | Plano | | 0.200 | Glass | HOYA BSC7 | 1.517 | — |
| 9 | | Plano | | 0.213 | | | | |
| 10 | Image | Plano | | — | | | | |

*The reference wavelength is d-line 587.6 nm

TABLE 2

Aspheric Coefficients

| | Surface # | | | | | |
|---|---|---|---|---|---|---|
| | 1 | 2 | 4 | 5 | 6 | 7 |
| k = | −1.0686E+01 | −8.9224E+01 | −1.1614E+00 | −3.7700E+00 | −9.0000E+01 | −1.2267E+01 |
| A4 = | 3.9507E−01 | −4.3871E+00 | −3.2612E+00 | −1.1334E+01 | 4.4383E−01 | −1.1945E+00 |
| A6 = | −1.6429E+01 | 4.1637E+01 | −9.7165E+01 | 1.2584E+02 | −1.2279E+00 | 4.6522E+00 |
| A8 = | 2.1508E+02 | −3.3039E+02 | 3.4741E+03 | −9.9684E+02 | 1.8033E+00 | −1.2726E+01 |
| A10 = | −1.9002E+03 | 1.2218E+03 | −6.4486E+04 | 4.2152E+03 | −1.5173E+00 | 2.1255E+01 |
| A12 = | 9.2563E+03 | | 6.9838E+05 | −6.4320E+03 | 6.7771E−01 | −2.1403E+01 |
| A14 = | −2.3606E+04 | | −3.6850E+06 | | −1.4888E−01 | 1.1809E+01 |
| A16 = | 2.3991E+04 | | 7.1574E+06 | | 1.2610E−02 | −2.7439E+00 |

TABLE 3

Embodiment 1: Characteristics of the object-side surface of Lens 3

| Y (mm) | Sag31* 10 | Dsag31* 10 |
|---|---|---|
| 0.00 | 0.000 | 0.000 |
| 0.04 | −0.005 | −0.261 |
| 0.07 | −0.019 | −0.474 |
| 0.11 | −0.039 | −0.621 |
| 0.15 | −0.063 | −0.705 |
| 0.18 | −0.090 | −0.739 |
| 0.22 | −0.117 | −0.733 |
| 0.26 | −0.143 | −0.697 |
| 0.29 | −0.168 | −0.640 |
| 0.33 | −0.190 | −0.568 |
| 0.37 | −0.209 | −0.489 |
| 0.40 | −0.226 | −0.410 |
| 0.44 | −0.239 | −0.335 |
| 0.48 | −0.250 | −0.270 |
| 0.51 | −0.259 | −0.217 |
| 0.55 | −0.266 | −0.178 |
| 0.59 | −0.272 | −0.153 |
| 0.62 | −0.278 | −0.141 |
| 0.66 | −0.283 | −0.142 |
| 0.70 | −0.288 | −0.156 |
| 0.73 | −0.295 | −0.184 |

*The optical effective radius of the object-side surface of lens 3 is 0.73 mm

The equation of the aspheric surface profiles is expressed as follows:

$$X(Y) = (Y^2/R)/(1 + \mathrm{sqrt}(1 - (1+k)*(Y/R)^2)) + \sum_i (Ai)*(Y^i)$$

wherein:

X: the relative distance between a point on the aspheric surface at a distance Y from the optical axis and the tangential plane at the aspheric surface vertex;

Y: the distance from the point on the curve of the aspheric surface to the optical axis;
R: the curvature radius;
k: the conic coefficient;
Ai: the aspheric coefficient of order i.

In the first embodiment of the present imaging lens system, the focal length of the imaging lens system is f, and it satisfies the following relation: f=1.25 (mm).

In the first embodiment of the present imaging lens system, the f-number of the imaging lens system is Fno, and it satisfies the relation: Fno=2.46.

In the first embodiment of the present imaging lens system, half of the maximal field of view of the imaging lens system is HFOV, and it satisfies the relation: HFOV=42.5 deg.

In the first embodiment of the present imaging lens system, the central thickness of the second lens element 120 is CT2, the focal length of the imaging lens system is f, and they satisfy the following relation: CT2/f=0.304.

In the first embodiment of the present imaging lens system, the curvature radius of the object-side surface 111 of the first lens element 110 is R1, the curvature radius of the image-side surface 112 of the first lens element 110 is R2, and they satisfy the following relations: (R1+R2)/(R1−R2)=0.

In the first embodiment of the present imaging lens system, the curvature radius of the object-side surface 131 of the third lens element 130 is R5, the curvature radius of the image-side surface 132 of the third lens element 130 is R6, and they satisfy the following relation: (R5+R6)/(R5−R6)=0.5.

In the first embodiment of the present imaging lens system, the curvature radius of the object-side surface 131 of the third lens element 130 is R5, the focal length of the imaging lens system is f, and they satisfy the following relations: R5/f=−1.09.

In the first embodiment of the present imaging lens system, the focal length of the imaging lens system is f, the focal length of the first lens element 110 is f1, and they satisfy the following relation: f/f1=0.89.

In the first embodiment of the present imaging lens system, the focal length of the imaging lens system is f, the focal length of the second lens element 120 is f2, and they satisfy the following relation: f/f2=2.35

In the first embodiment of the present imaging lens system, the focal length of the first lens element 110 is f1, the focal length of the second lens element 120 is f2, and they satisfy the following relation: f1/f2=2.66.

In the first embodiment of the present imaging lens system, the maximal field of view of the imaging lens system is FOV, and it satisfies the following relation: FOV=85 degrees.

In the first embodiment of the present imaging lens system, the focal length of the imaging lens system is f, the entrance pupil diameter of the imaging lens system is EPD, and they satisfy the following relation: f/EPD=2.46.

In the first embodiment of the present imaging lens system, the axial distance between the stop 100 and the image plane 150 is SL, the axial distance between the object-side surface 111 of the first lens element 110 and the image plane 150 is TTL, and they satisfy the following relation: SL/TTL=0.79.

In the first embodiment of the present imaging lens system, the axial distance between the object-side surface 111 of the first lens element 110 and the image-side surface 132 of the third lens element 130 is Td, and it satisfies the following relation: Td=1.37 mm.

Embodiment 2

Figure 2A:
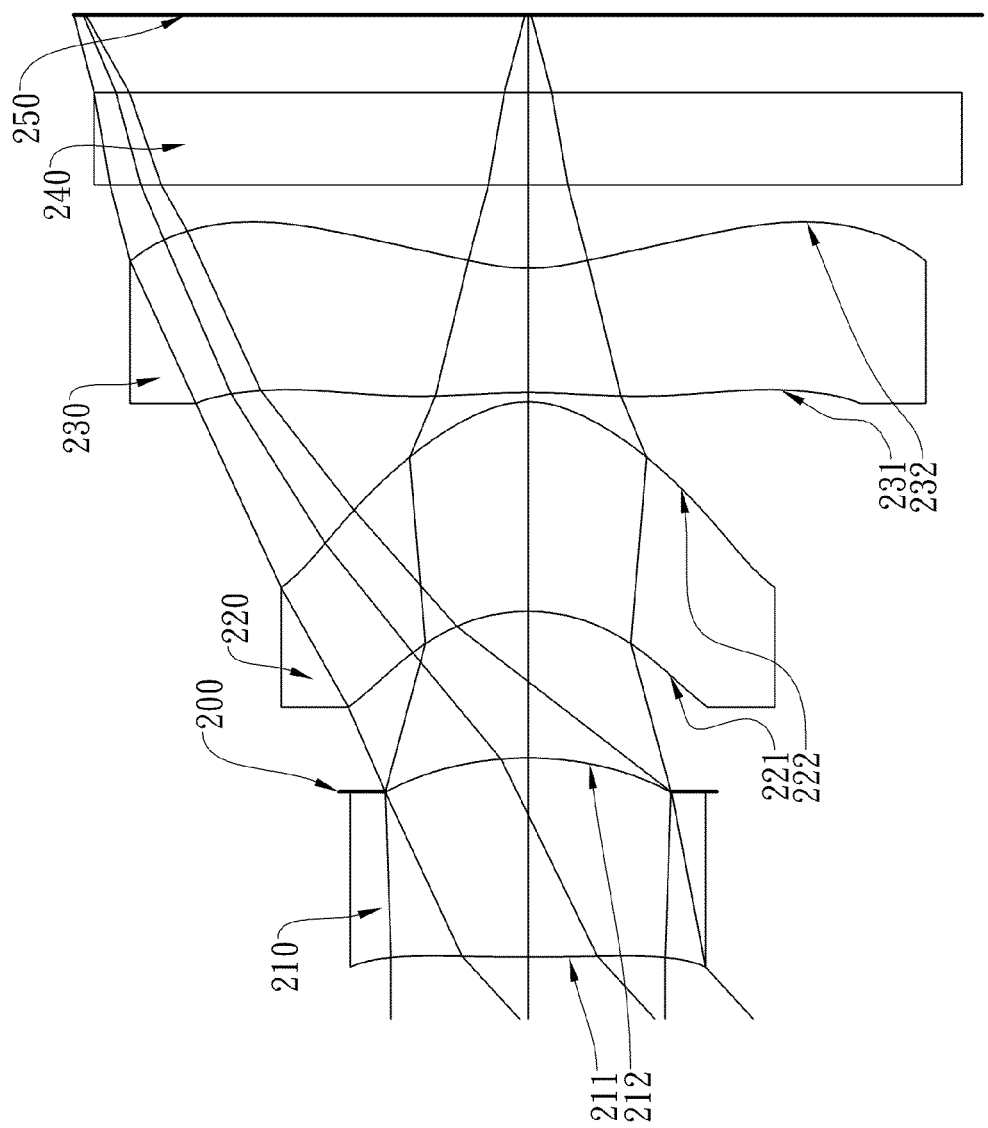
FIG. 2A shows an imaging lens system in accordance with the second embodiment of the present invention.
Figure 2B:
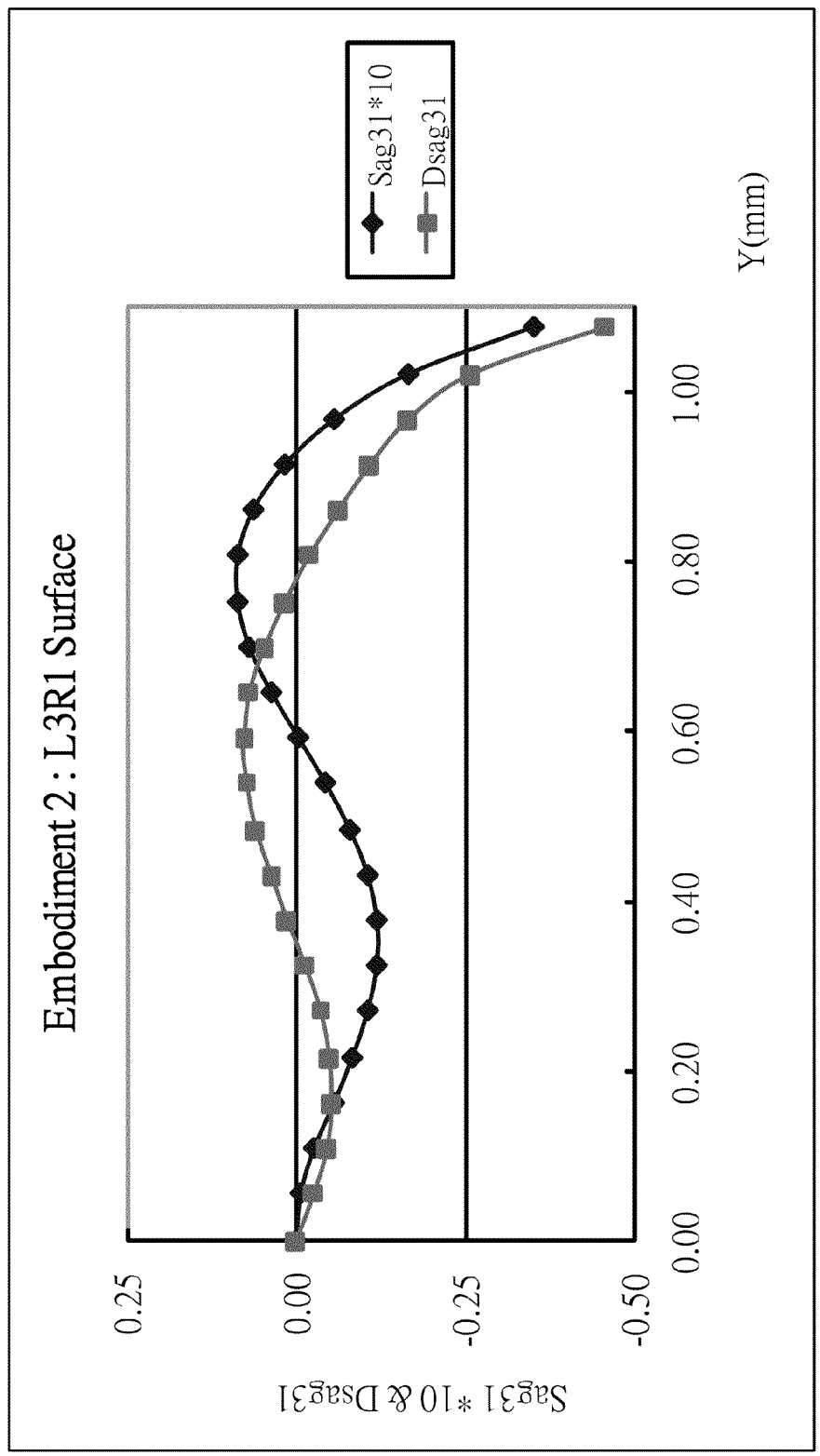
FIG. 2B shows the object-side surface characteristics of the third lens element of the second embodiment of the present invention.
Figure 2C:
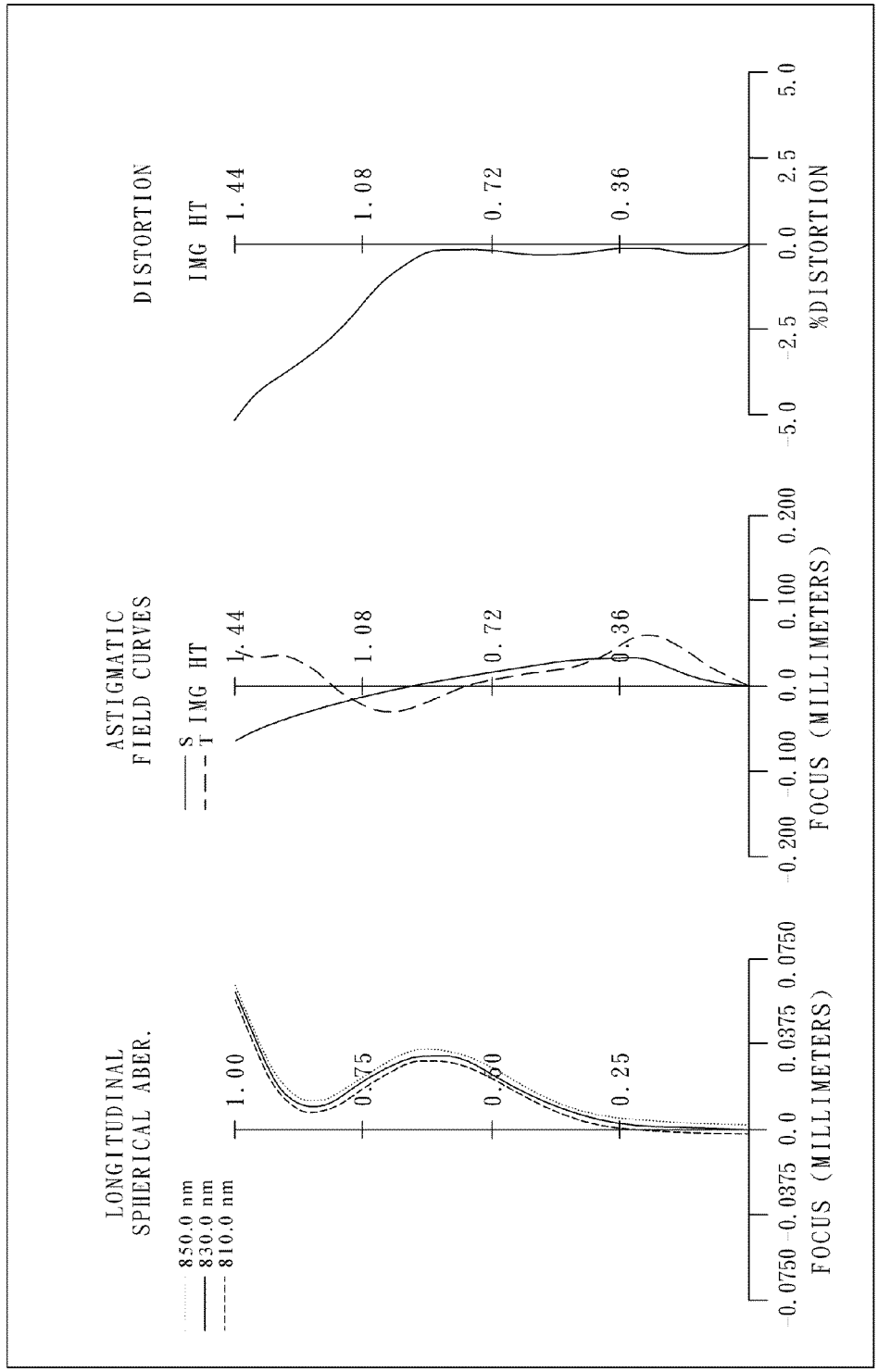
FIG. 2C shows the aberration curves of the second embodiment of the present invention.

FIG. 2A shows an imaging lens system in accordance with the second embodiment of the present invention, FIG. 2B shows the object-side surface characteristics of the third lens element of the second embodiment of the present invention, and FIG. 2C shows the aberration curves of the second embodiment of the present invention. The imaging lens system of the second embodiment of the present invention mainly comprises three lens elements, in order from an object side to an image side:

a plastic first lens element 210 with positive refractive power having a convex at the paraxial region and concave at the peripheral region object-side surface 211, a convex image-side surface 212 at the paraxial region, and both of the object-side surface 211 and image-side surface 212 thereof being aspheric;

a plastic second lens element 220 with positive refractive power having a concave object-side surface 221 at the paraxial region, a convex image-side surface 222 at the paraxial region, and both of the object-side surface 221 and image-side surface 222 thereof being aspheric; and a plastic third lens element 230 with negative refractive power having a concave object-side surface 231 at the paraxial region, a concave at the paraxial region and convex at the peripheral region image-side surface 232, and both of the object-side surface 231 and image-side surface 232 thereof being aspheric, wherein the object-side surface 231 of the third lens element 230 has two critical points and the Dsag31 thereof switches signs twice;

wherein the imaging lens system further comprises a stop 200 disposed between the first lens element 210 and the second lens element 220, and the stop 200 is closer to the object side than an intersection of the image-side surface 212 of the first lens element 210 and the optical axis;

the imaging lens system further comprises a filter element 240 disposed between the image-side surface 232 of the third lens element 230 and an image plane 250, and the filter element 240 is made of glass and has no influence on the focal length of the imaging lens system.

The detailed optical data of the second embodiment is shown in TABLE 4, the aspheric surface data is shown in TABLE 5, and the object-side surface characteristics of the third lens element is shown in TABLE 6, wherein the units of the curvature radius, the thickness and the focal length are mm, and HFOV is half of the maximal field of view.

TABLE 4

(Embodiment 2)
f = 1.64 mm, Fno = 1.85, HFOV = 42.6 deg.

| Surface # | | Curvature Radius | | Thickness | Material | | Refractive Index | Focal Length |
|---|---|---|---|---|---|---|---|---|
| 0 | Object | Plano | | Infinity | | | | |
| 1 | Lens 1 | 7.842 | ASP | 0.646 | Plastic | PC | 1.569 | 1.72 |
| 2 | | −1.085 | ASP | −0.110 | | | | |
| 3 | Ape. Stop | Plano | | 0.585 | | | | |

TABLE 4-continued (Embodiment 2)
f = 1.64 mm, Fno = 1.85, HFOV = 42.6 deg.

| Surface # | | Curvature Radius | | Thickness | Material | | Refractive Index | Focal Length |
|---|---|---|---|---|---|---|---|---|
| 4 | Lens 2 | −0.593 | ASP | 0.680 | Plastic | PC | 1.569 | 0.61 |
| 5 | | −0.311 | ASP | 0.030 | | | | |
| 6 | Lens 3 | −1.912 | ASP | 0.403 | Plastic | PC | 1.569 | −0.71 |
| 7 | | 0.555 | ASP | 0.270 | | | | |
| 8 | Filter | Plano | | 0.300 | Glass | HOYA BSC7 | 1.510 | |
| 9 | | Plano | | 0.250 | | | | |
| 10 | Image | Plano | | — | | | | |

*The optical system can be applied in an infrared wavelength range; the reference wavelength is 830 nm

TABLE 5

Aspheric Coefficients

| | Surface # | | | | | |
|---|---|---|---|---|---|---|
| | 1 | 2 | 4 | 5 | 6 | 7 |
| k = | −5.5235E+01 | −2.7871E+01 | −4.1648E−01 | −2.9692E+00 | −9.0000E+01 | −1.4776E+01 |
| A4 = | 2.3066E−01 | −2.5743E+00 | −1.4489E+00 | −1.5093E+00 | 8.0955E−01 | −2.9141E−01 |
| A6 = | −1.0971E+01 | 1.6594E+01 | 1.4999E+01 | 4.1840E+00 | −1.7931E+00 | 1.0815E+00 |
| A8 = | 1.0894E+02 | −9.3563E+01 | −8.5190E+01 | −6.2258E+00 | 1.8082E+00 | −2.1295E+00 |
| A10 = | −6.3066E+02 | 3.2109E+02 | 2.6128E+02 | −4.8266E+00 | −1.0299E+00 | 2.0869E+00 |
| A12 = | 2.0410E+03 | −5.3396E+02 | −2.8273E+02 | 2.4961E+01 | 3.0671E−01 | −1.1097E+00 |
| A14 = | −3.4592E+03 | 2.7214E+02 | −3.8239E−10 | −1.8201E+01 | 7.7174E−03 | 3.0883E−01 |
| A16 = | 2.3621E+03 | | | | −3.4050E−02 | −3.5967E−02 |

TABLE 6

Embodiment 2: Characteristics of the object-side surface of Lens 3

| Y (mm) | Sag31*10 | Dsag31 |
|---|---|---|
| 0.00 | 0.000 | 0.000 |
| 0.05 | −0.007 | −0.027 |
| 0.11 | −0.027 | −0.046 |
| 0.16 | −0.055 | −0.054 |
| 0.22 | −0.083 | −0.050 |
| 0.27 | −0.106 | −0.035 |
| 0.32 | −0.120 | −0.014 |
| 0.38 | −0.120 | 0.012 |
| 0.43 | −0.106 | 0.038 |
| 0.48 | −0.080 | 0.060 |
| 0.54 | −0.043 | 0.074 |
| 0.59 | −0.002 | 0.077 |
| 0.65 | 0.038 | 0.069 |
| 0.70 | 0.070 | 0.048 |
| 0.75 | 0.087 | 0.017 |
| 0.81 | 0.087 | −0.021 |
| 0.86 | 0.064 | −0.063 |
| 0.91 | 0.018 | −0.109 |
| 0.97 | −0.055 | −0.166 |
| 1.02 | −0.167 | −0.259 |
| 1.08 | −0.352 | −0.458 |

*The optical effective radius of the object-side surface of lens 3 is 1.08 mm

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 7.

TABLE 7

(Embodiment 2)

| f [mm] | 1.64 | f/f1 | 0.96 |
|---|---|---|---|
| Fno | 1.85 | f/f2 | 2.68 |
| HFOV [deg.] | 42.6 | f1/f2 | 2.82 |
| CT2/f | 0.415 | FOV [deg.] | 85.2 |
| (R1 + R2)/(R1 − R2) | 0.76 | f/EPD | 1.85 |
| (R5 + R6)/(R5 − R6) | 0.55 | SL/TTL | 0.82 |
| R5/f | −1.17 | Td [mm] | 2.234 |

Embodiment 3

Figure 3A:
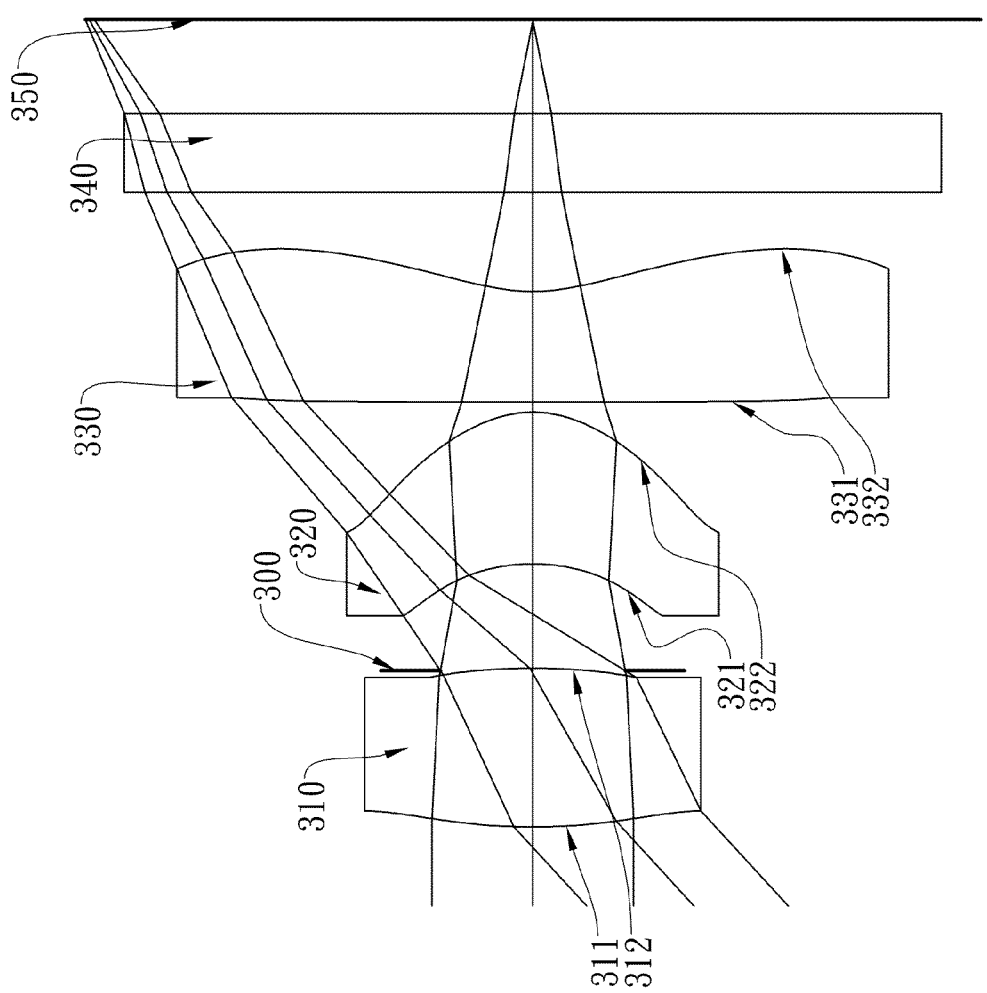
FIG. 3A shows an imaging lens system in accordance with the third embodiment of the present invention.
Figure 3B:
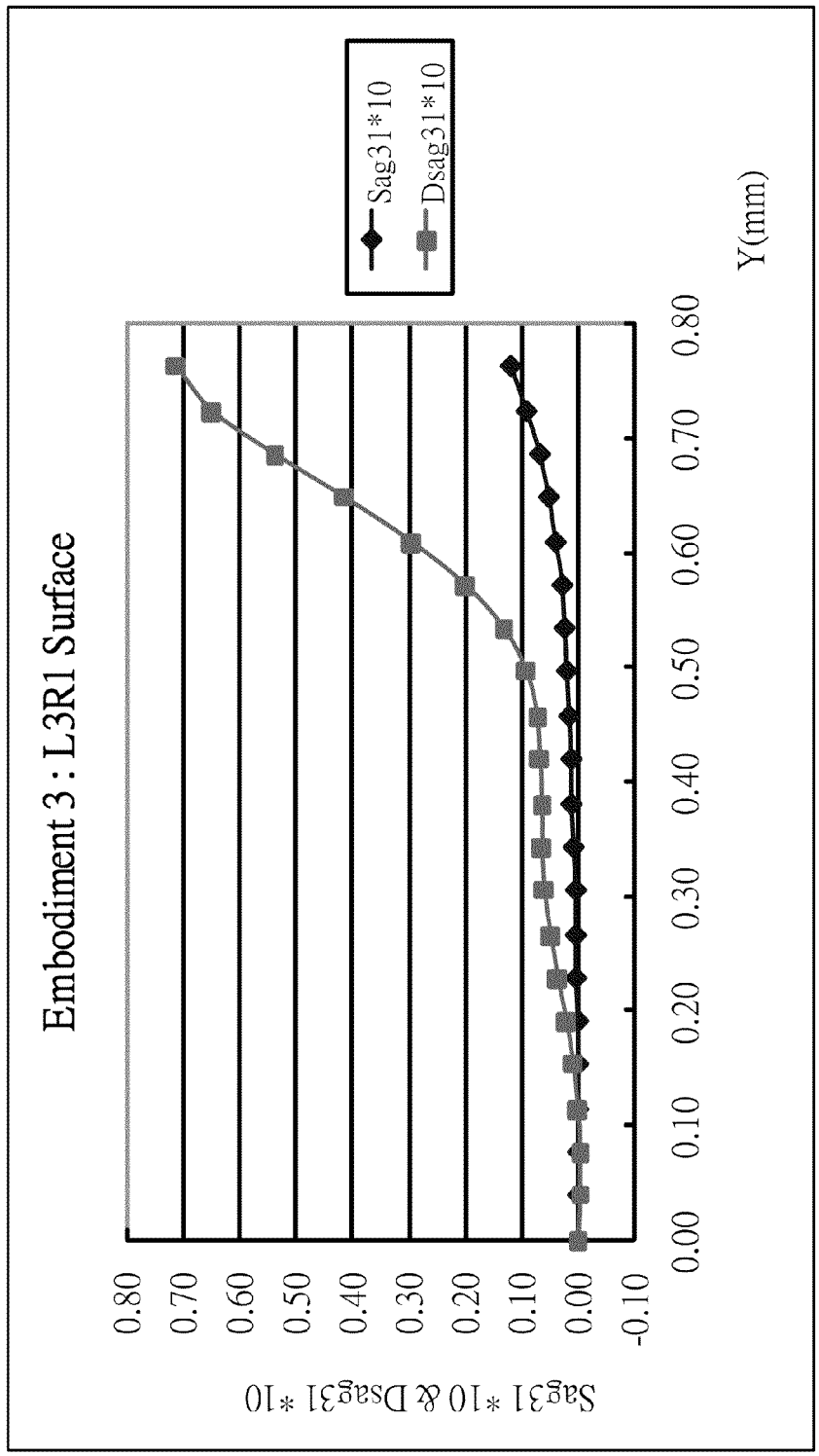
FIG. 3B shows the object-side surface characteristics of the third lens element of the third embodiment of the present invention.
Figure 3C:
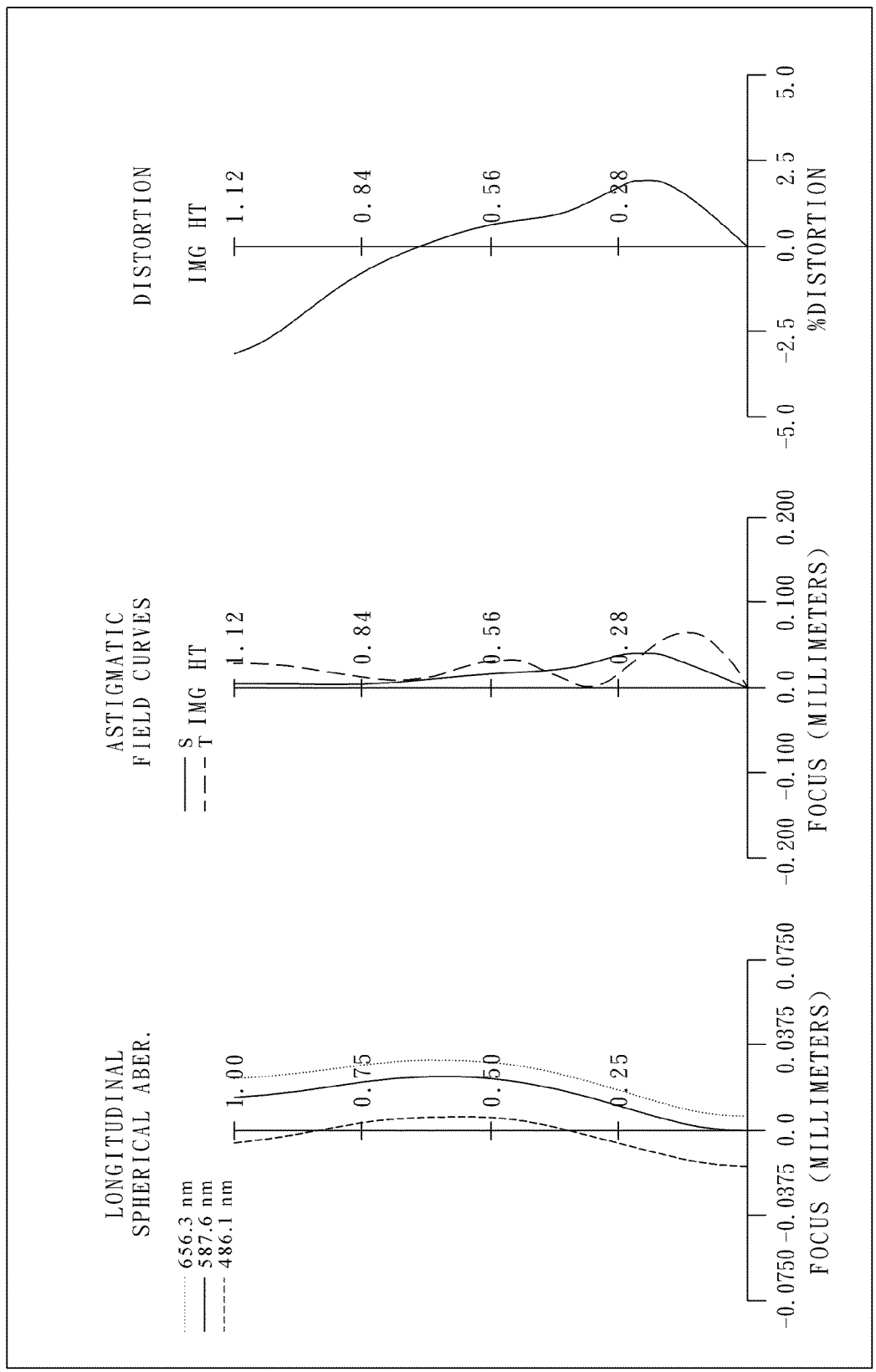
FIG. 3C shows the aberration curves of the third embodiment of the present invention.

FIG. 3A shows an imaging lens system in accordance with the third embodiment of the present invention, FIG. 3B shows the object-side surface characteristics of the third lens element of the third embodiment of the present invention, and FIG. 3C shows the aberration curves of the third embodiment of the present invention. The imaging lens system of the third embodiment of the present invention mainly comprises three lens elements, in order from an object side to an image side:

a plastic first lens element 310 with positive refractive power having a convex at the paraxial region and concave at the peripheral region object-side surface 311, a convex image-side surface 312 at the paraxial region, and both of the object-side surface 311 and image-side surface 312 thereof being aspheric;

a plastic second lens element 320 with positive refractive power having a concave object-side surface 321 at the paraxial region, a convex image-side surface 322 at the paraxial region, and both of the object-side surface 321 and image-side surface 322 thereof being aspheric; and a plastic third lens element 330 with negative refractive power having a concave object-side surface 331 at the paraxial region, a concave at the paraxial region and convex at the peripheral region image-side surface 332, and both of the object-side surface 331 and image-side surface 332 thereof being aspheric, wherein the object-side surface 331 of the third lens element 330 has two critical points and the Dsag31 thereof switches signs twice;

wherein the imaging lens system further comprises a stop 300 disposed between the first lens element 310 and the second lens element 320, and the stop 300 is closer to the object side than an intersection of the image-side surface 312 of the first lens element 310 and the optical axis;

the imaging lens system further comprises a filter element 340 disposed between the image-side surface 332 of the third lens element 330 and an image plane 350, and the filter element 340 is made of glass and has no influence on the focal length of the imaging lens system.

The detailed optical data of the third embodiment is shown in TABLE 8, the aspheric surface data is shown in TABLE 9, and the object-side surface characteristics of the third lens element is shown in TABLE 10, wherein the units of the curvature radius, the thickness and the focal length are mm, and HFOV is half of the maximal field of view.

TABLE 8

(Embodiment 3)
f = 1.25 mm, Fno = 2.46, HFOV = 42.4 deg.

| Surface # | | Curvature Radius | | Thickness | Material | | Refractive Index | Focal Length |
|---|---|---|---|---|---|---|---|---|
| 0 | Object | Plano | | Infinity | | | | |
| 1 | Lens 1 | 1.404 | ASP | 0.401 | Plastic | APEL-5514ML | 1.544 | 1.53 |
| 2 | | −1.853 | ASP | −0.006 | | | | |
| 3 | Ape. Stop | Plano | | 0.270 | | | | |
| 4 | Lens 2 | −0.489 | ASP | 0.384 | Plastic | APEL-5514ML | 1.544 | 0.68 |
| 5 | | −0.269 | ASP | 0.025 | | | | |
| 6 | Lens 3 | −100.000 | ASP | 0.280 | Plastic | APEL-5514ML | 1.544 | −0.81 |
| 7 | | 0.442 | ASP | 0.250 | | | | |
| 8 | Filter | Plano | | 0.200 | Glass | HOYA BSC7 | 1.517 | |
| 9 | | Plano | | 0.238 | | | | |
| 10 | Image | Plano | | — | | | | |

*The reference wavelength is d-line 587.6 nm

TABLE 9

Aspheric Coefficients

| | Surface # | | | | |
|---|---|---|---|---|---|
| 1 | 2 | 4 | 5 | 6 | 7 |
| k = −1.2542E+01 | −8.9220E+01 | −1.2264E+00 | −4.6410E+00 | −9.0000E+01 | −9.4326E+00 |
| A4 = 4.9025E−01 | −2.7978E+00 | −1.6776E+00 | −1.1672E+01 | 1.9892E−01 | −8.4836E−01 |
| A6 = −1.1932E+01 | 1.9958E+01 | −1.1389E+02 | 1.3016E+02 | −1.2817E+00 | 2.4704E+00 |
| A8 = 1.2228E+02 | −1.7522E+02 | 3.4227E+03 | −9.9832E+02 | 3.8866E+00 | −5.4655E+00 |
| A10 = −8.9073E+02 | 8.2243E+02 | −5.8944E+04 | 3.9563E+03 | −5.5426E+00 | 6.9115E+00 |
| A12 = 3.4920E+03 | | 5.9669E+05 | −5.6649E+03 | 3.9035E+00 | −4.8087E+00 |
| A14 = −7.1144E+03 | | −2.9909E+06 | | −1.3131E+00 | 1.6743E+00 |
| A16 = 5.8722E+03 | | 5.6365E+06 | | 1.6932E−01 | −2.3372E−01 |

TABLE 10

Embodiment 3: Characteristics of the object-side surface of Lens 3

| Y (mm) | Sag31* 10 | Dsag31* 10 |
|---|---|---|
| 0.00 | 0.000 | 0.000 |
| 0.04 | 0.000 | −0.003 |
| 0.08 | 0.000 | −0.004 |

TABLE 10-continued

Embodiment 3: Characteristics of the object-side surface of Lens 3

| Y (mm) | Sag31* 10 | Dsag31* 10 |
|---|---|---|
| 0.11 | 0.000 | −0.001 |
| 0.15 | 0.000 | 0.007 |
| 0.19 | 0.000 | 0.019 |
| 0.23 | 0.001 | 0.033 |
| 0.27 | 0.003 | 0.047 |
| 0.30 | 0.005 | 0.057 |
| 0.34 | 0.007 | 0.062 |
| 0.38 | 0.009 | 0.064 |
| 0.42 | 0.012 | 0.065 |
| 0.46 | 0.014 | 0.072 |
| 0.50 | 0.018 | 0.091 |
| 0.53 | 0.022 | 0.131 |
| 0.57 | 0.028 | 0.198 |
| 0.61 | 0.037 | 0.293 |
| 0.65 | 0.050 | 0.411 |
| 0.69 | 0.068 | 0.537 |
| 0.72 | 0.091 | 0.647 |
| 0.76 | 0.117 | 0.711 |

*The optical effective radius of the object-side surface of lens 3 is 0.76 mm

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 11.

TABLE 11

(Embodiment 3)

| | | | |
|---|---|---|---|
| f [mm] | 1.25 | f/f1 | 0.81 |
| Fno | 2.46 | f/f2 | 1.84 |
| HFOV [deg.] | 42.4 | f1/f2 | 2.25 |
| CT2/f | 0.307 | FOV [deg.] | 84.8 |
| (R1 + R2)/(R1 − R2) | −0.14 | f/EPD | 2.46 |
| (R5 + R6)/(R5 − R6) | 0.99 | SL/TTL | 0.80 |
| R5/f | −80.00 | Td [mm] | 1.354 |

Embodiment 4

Figure 4A:
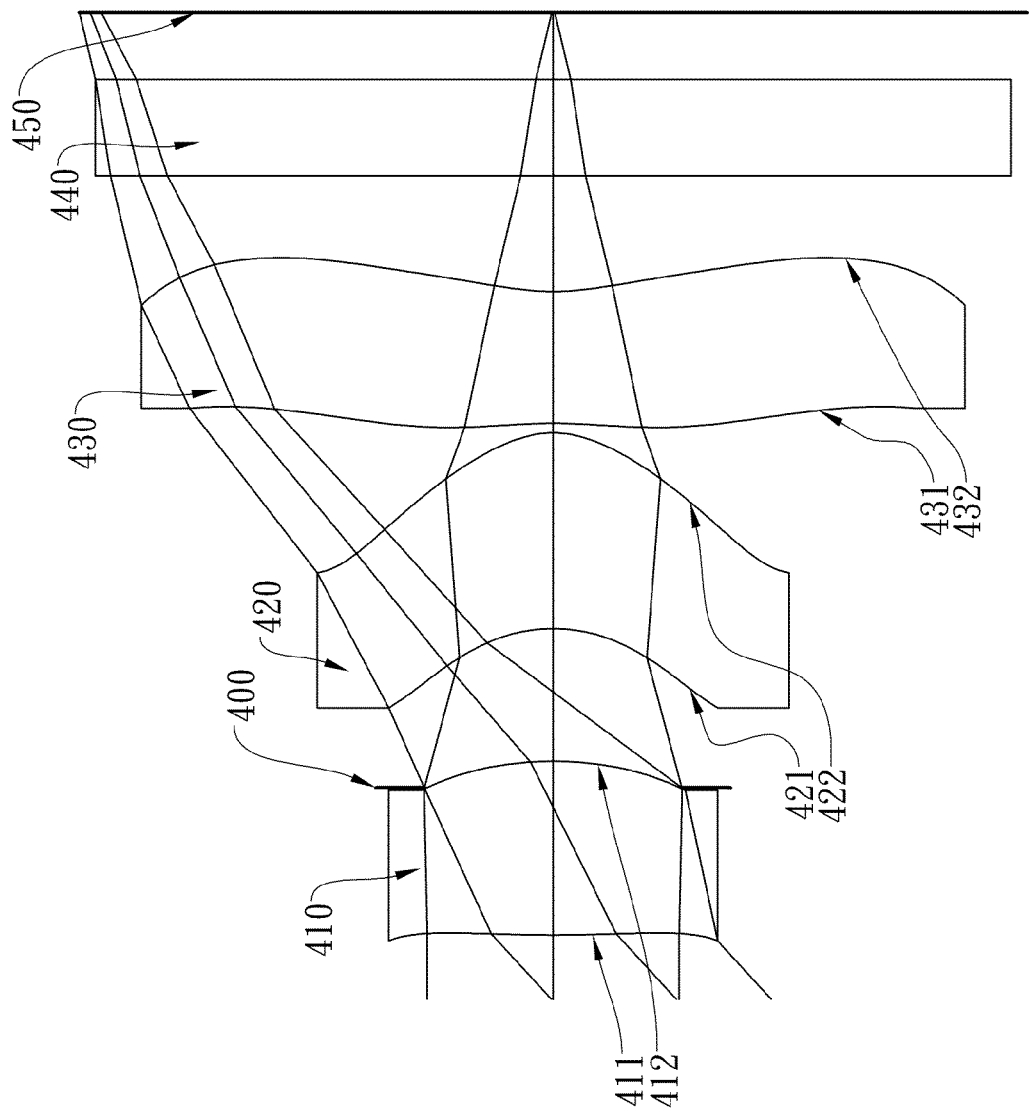
FIG. 4A shows an imaging lens system in accordance with the fourth embodiment of the present invention.
Figure 4B:
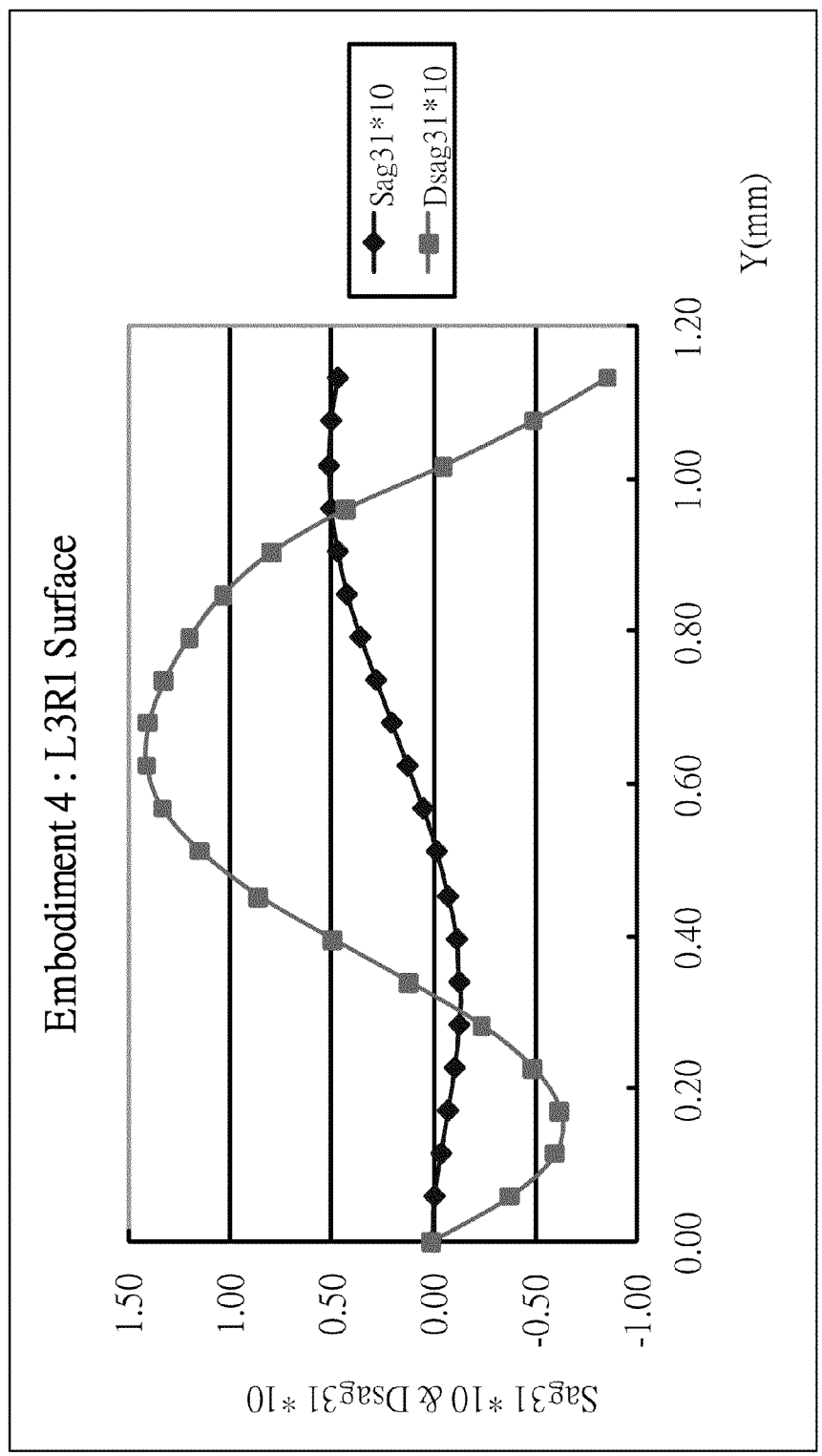
FIG. 4B shows the object-side surface characteristics of the third lens element of the fourth embodiment of the present invention.
Figure 4C:
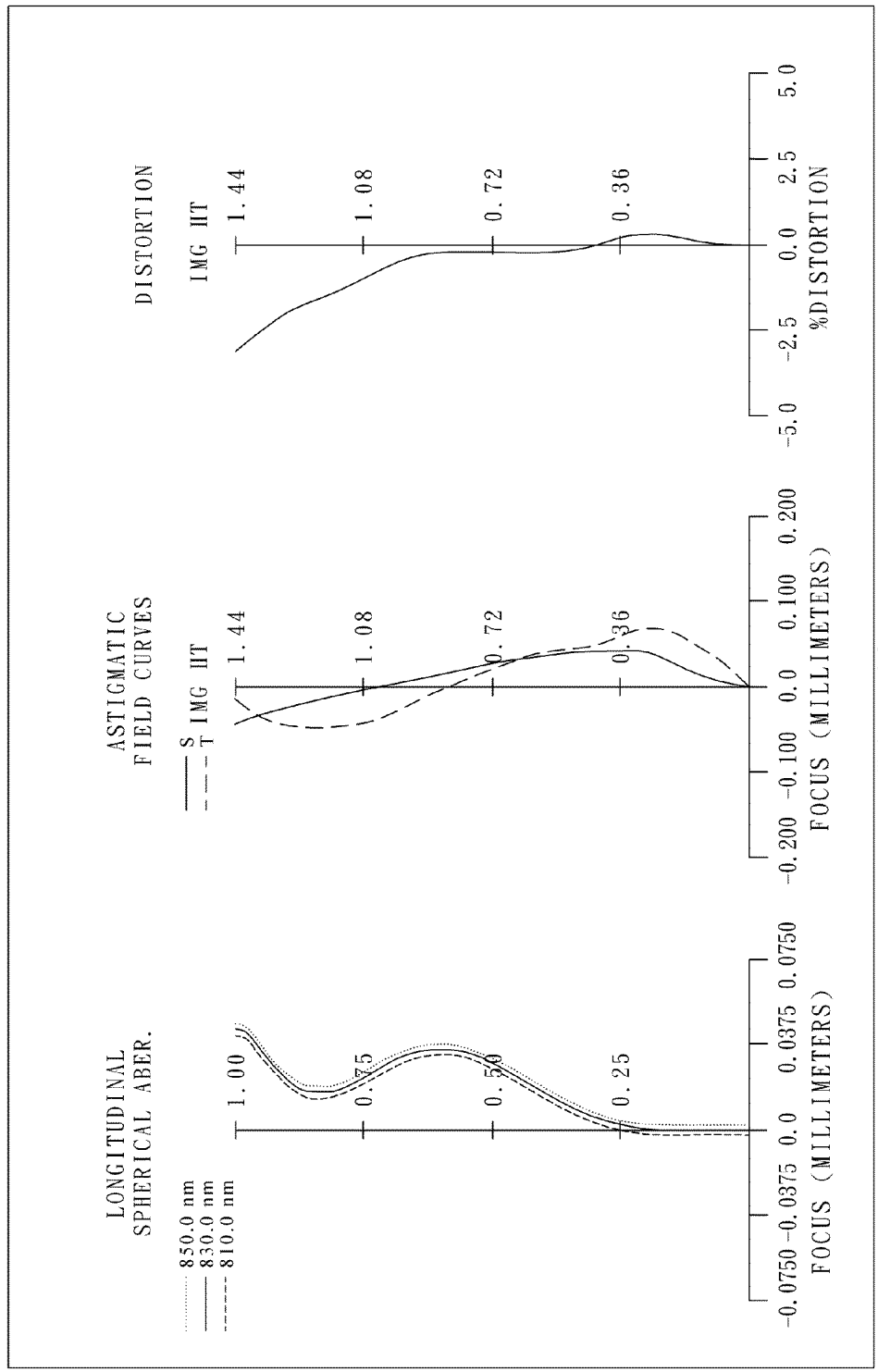
FIG. 4C shows the aberration curves of the fourth embodiment of the present invention.

FIG. 4A shows an imaging lens system in accordance with the fourth embodiment of the present invention, FIG. 4B shows the object-side surface characteristics of the third lens element of the fourth embodiment of the present invention, and FIG. 4C shows the aberration curves of the fourth embodiment of the present invention. The imaging lens system of the fourth embodiment of the present invention mainly comprises three lens elements, in order from an object side to an image side:

a plastic first lens element 410 with positive refractive power having a convex at the paraxial region and concave at the peripheral region object-side surface 411, a convex image-side surface 412 at the paraxial region, and both of the object-side surface 411 and image-side surface 412 thereof being aspheric;

a plastic second lens element 420 with positive refractive power having a concave object-side surface 421 at the paraxial region, a convex image-side surface 422 at the paraxial region, and both of the object-side surface 421 and image-side surface 422 thereof being aspheric; and a plastic third lens element 430 with negative refractive power having a concave object-side surface 431 at the paraxial region, a concave at the paraxial region and convex at the peripheral region image-side surface 432, and both of the object-side surface 431 and image-side surface 432 thereof being aspheric, wherein the object-side surface 431 of the third lens element 430 has two critical points and the Dsag31 thereof switches signs twice;

wherein the imaging lens system further comprises a stop 400 disposed between the first lens element 410 and the second lens element 420, and the stop 400 is closer to the object side than an intersection of the image-side surface 412 of the first lens element 410 and the optical axis;

the imaging lens system further comprises a filter element 440 disposed between the image-side surface 432 of the third lens element 430 and an image plane 450, and the filter element 440 is made of glass and has no influence on the focal length of the imaging lens system.

The detailed optical data of the fourth embodiment is shown in TABLE 12, the aspheric surface data is shown in TABLE 13, and the object-side surface characteristics of the third lens element is shown in TABLE 14, wherein the units of the curvature radius, the thickness and the focal length are mm, and HFOV is half of the maximal field of view.

TABLE 12

(Embodiment 4)
f = 1.61 mm, Fno = 2.05, HFOV = 42.6 deg.

| Surface # | | Curvature Radius | | Thickness | Material | Refractive Index | Focal Length |
|---|---|---|---|---|---|---|---|
| 0 | Object | Plano | | Infinity | | | |
| 1 | Lens 1 | 4.692 | ASP | 0.541 | Plastic | PC 1.569 | 1.60 |
| 2 | | −1.088 | ASP | −0.083 | | | |
| 3 | Ape. Stop | Plano | | 0.496 | | | |
| 4 | Lens 2 | −0.508 | ASP | 0.610 | Plastic | PC 1.569 | 0.60 |
| 5 | | −0.295 | ASP | 0.030 | | | |
| 6 | Lens 3 | −1.342 | ASP | 0.410 | Plastic | PC 1.569 | −0.70 |
| 7 | | 0.691 | ASP | 0.360 | | | |
| 8 | Filter | Plano | | 0.300 | Glass | HOYA BSC7 1.510 | |
| 9 | | Plano | | 0.209 | | | |
| 10 | Image | Plano | | — | | | |

*The optical system can be applied in an infrared wavelength range; the reference wavelength is 830 nm

TABLE 13

Aspheric Coefficients

| | Surface # | | | | | |
|---|---|---|---|---|---|---|
| | 1 | 2 | 4 | 5 | 6 | 7 |
| k = | 4.5596E+01 | −1.6694E+01 | −1.5950E+00 | −3.4689E+00 | −9.0000E+01 | −2.2194E+01 |
| A4 = | −1.9735E−02 | −1.9932E+00 | −2.7157E+00 | −2.6652E+00 | 1.0272E+00 | −4.4388E−01 |
| A6 = | −1.0111E+01 | 1.0232E+01 | 2.3843E+01 | 1.4291E+01 | −2.1730E+00 | 1.7941E+00 |
| A8 = | 1.0242E+02 | −7.5612E+01 | −1.3837E+02 | −4.8107E+01 | 1.6765E+00 | −3.8484E+00 |
| A10 = | −6.0481E+02 | 3.6990E+02 | 4.5365E+02 | 9.2307E+01 | 5.4790E−01 | 4.3990E+00 |
| A12 = | 1.7622E+03 | −7.3847E+02 | −3.4360E+02 | −8.0161E+01 | −1.8822E+00 | −2.7997E+00 |
| A14 = | −2.0620E+03 | | −6.9465E+02 | 2.1886E+01 | 1.2080E+00 | 9.3280E−01 |
| A16 = | | | | | −2.6076E−01 | −1.2712E−01 |

TABLE 14

Embodiment 4: Characteristics of the object-side surface of Lens 3

| Y (mm) | Sag31* 10 | Dsag31* 10 |
|---|---|---|
| 0.00 | 0.000 | 0.000 |
| 0.06 | −0.011 | −0.384 |
| 0.11 | −0.040 | −0.603 |
| 0.17 | −0.076 | −0.630 |
| 0.23 | −0.108 | −0.495 |
| 0.28 | −0.129 | −0.235 |
| 0.34 | −0.133 | 0.111 |
| 0.40 | −0.116 | 0.492 |
| 0.45 | −0.078 | 0.853 |
| 0.51 | −0.021 | 1.144 |
| 0.57 | 0.049 | 1.333 |
| 0.62 | 0.127 | 1.411 |
| 0.68 | 0.207 | 1.396 |
| 0.74 | 0.284 | 1.318 |
| 0.79 | 0.355 | 1.200 |
| 0.85 | 0.419 | 1.037 |
| 0.90 | 0.471 | 0.789 |
| 0.96 | 0.506 | 0.419 |
| 1.02 | 0.516 | −0.049 |
| 1.07 | 0.501 | −0.489 |
| 1.13 | 0.463 | −0.854 |

*The optical effective radius of the object-side surface of lens 3 is 1.13 mm

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 15.

TABLE 15

(Embodiment 4)

| f [mm] | 1.61 | f/f1 | 1.00 |
|---|---|---|---|
| Fno | 2.05 | f/f2 | 2.65 |
| HFOV [deg.] | 42.6 | f1/f2 | 2.67 |
| CT2/f | 0.379 | FOV [deg.] | 85.2 |
| (R1 + R2)/(R1 − R2) | 0.62 | f/EPD | 2.05 |
| (R5 + R6)/(R5 − R6) | 0.32 | SL/TTL | 0.84 |
| R5/f | −0.83 | Td [mm] | 2.004 |

Embodiment 5

Figure 5A:
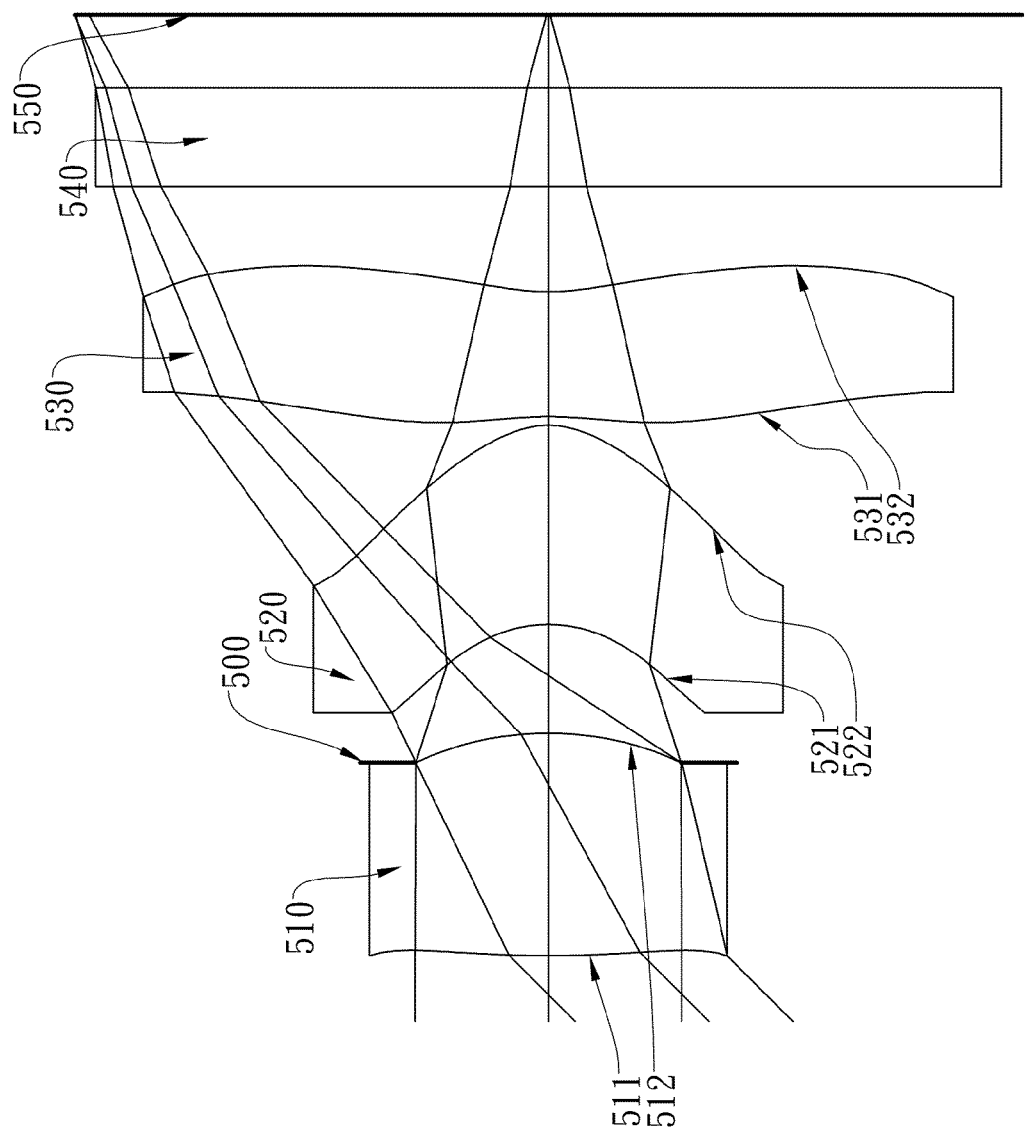
FIG. 5A shows an imaging lens system in accordance with the fifth embodiment of the present invention.
Figure 5B:
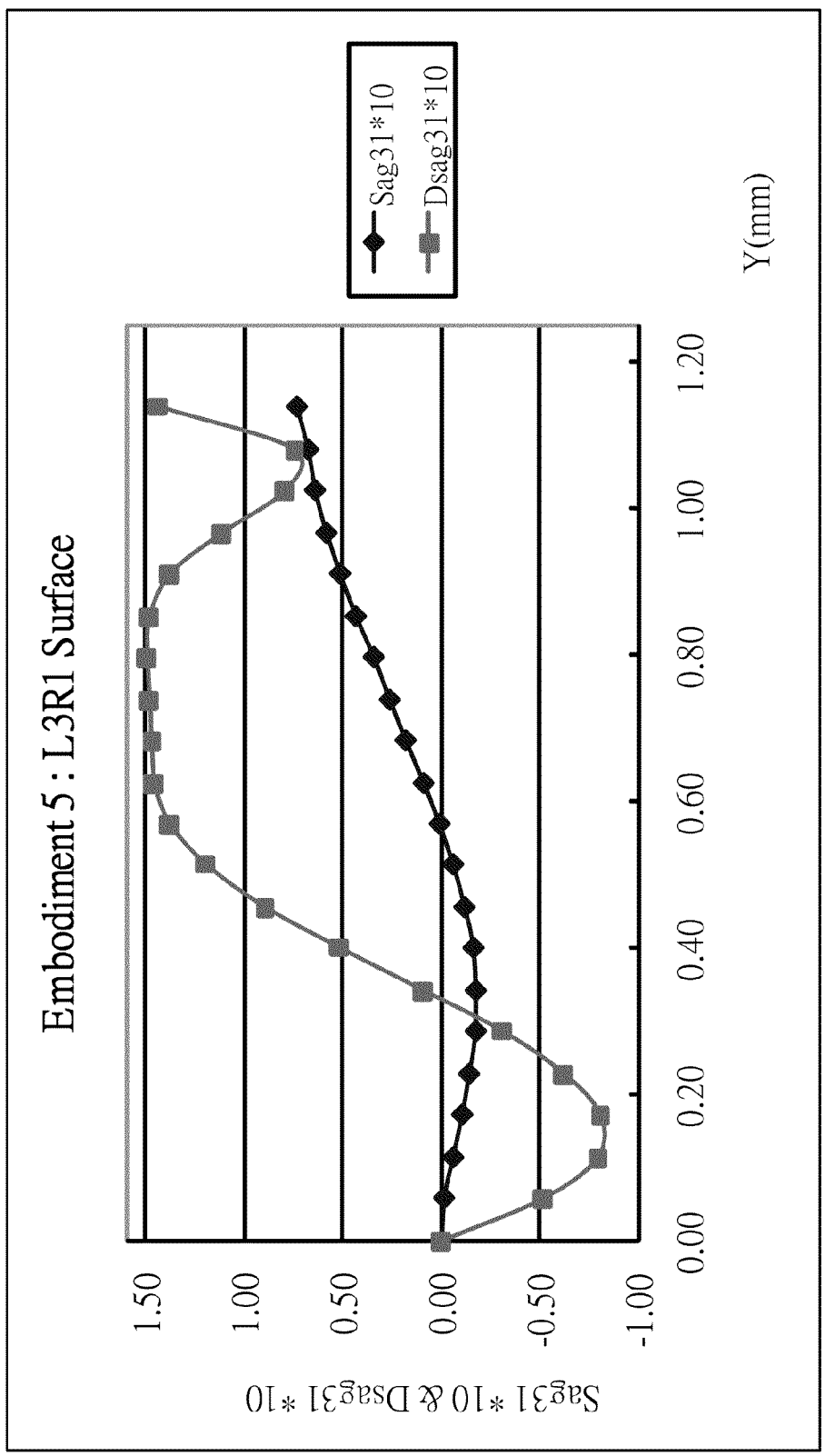
FIG. 5B shows the object-side surface characteristics of the third lens element of the fifth embodiment of the present invention.
Figure 5C:
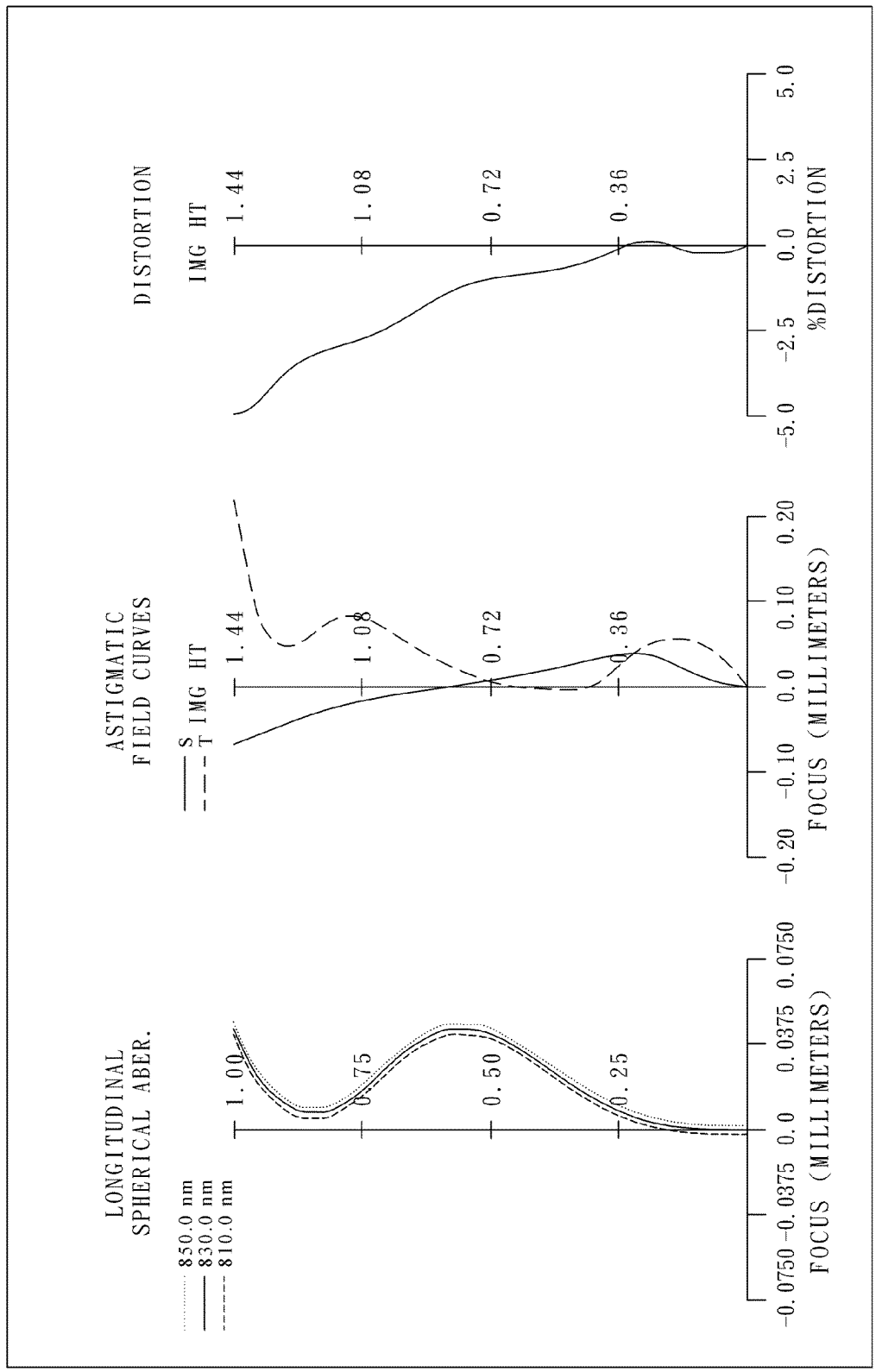
FIG. 5C shows the aberration curves of the fifth embodiment of the present invention.

FIG. 5A shows an imaging lens system in accordance with the fifth embodiment of the present invention, FIG. 5B shows the object-side surface characteristics of the third lens element of the fifth embodiment of the present invention, and FIG. 5C shows the aberration curves of the fifth embodiment of the present invention. The imaging lens system of the fifth embodiment of the present invention mainly comprises three lens elements, in order from an object side to an image side:

a plastic first lens element 510 with positive refractive power having a convex at the paraxial region and concave at the peripheral region object-side surface 511, a convex image-side surface 512 at the paraxial region, and both of the object-side surface 511 and image-side surface 512 thereof being aspheric;

a plastic second lens element 520 with positive refractive power having a concave object-side surface 521 at the paraxial region, a convex image-side surface 522 at the paraxial region, and both of the object-side surface 521 and image-side surface 522 thereof being aspheric; and a plastic third lens element 530 with negative refractive power having a concave object-side surface 531 at the paraxial region, a concave at the paraxial region and convex at the peripheral region image-side surface 532, and both of the object-side surface 531 and image-side surface 532 thereof being aspheric, wherein the object-side surface 531 of the third lens element 530 has one critical point and the Dsag31 thereof switches signs once;

wherein the imaging lens system further comprises a stop 500 disposed between the first lens element 510 and the second lens element 520, and the stop 500 is closer to the object side than an intersection of the image-side surface 512 of the first lens element 510 and the optical axis;

the imaging lens system further comprises a filter element 540 disposed between the image-side surface 532 of the third lens element 530 and an image plane 550, and the filter element 540 is made of glass and has no influence on the focal length of the imaging lens system.

The detailed optical data of the fifth embodiment is shown in TABLE 16, the aspheric surface data is shown in TABLE 17, and the object-side surface characteristics of the third lens element is shown in TABLE 18, wherein the units of the curvature radius, the thickness and the focal length are mm, and HFOV is half of the maximal field of view.

TABLE 16

(Embodiment 5)
f = 1.50 mm, Fno = 1.85, HFOV = 45.1 deg.

| Surface # | | Curvature Radius | | Thickness | Material | | Refractive Index | Focal Length |
|---|---|---|---|---|---|---|---|---|
| 0 | Object | Plano | | Infinity | | | | |
| 1 | Lens 1 | 3.467 | ASP | 0.677 | Plastic | PC | 1.569 | 1.45 |
| 2 | | −1.006 | ASP | −0.089 | | | | |
| 3 | Ape. Stop | Plano | | 0.420 | | | | |
| 4 | Lens 2 | −0.431 | ASP | 0.607 | Plastic | PC | 1.569 | 0.47 |
| 5 | | −0.250 | ASP | 0.026 | | | | |
| 6 | Lens 3 | −0.969 | ASP | 0.380 | Plastic | PC | 1.569 | −0.59 |
| 7 | | 0.592 | ASP | 0.320 | | | | |
| 8 | Filter | Plano | | 0.300 | Glass | HOYA BSC7 | 1.517 | — |
| 9 | | Plano | | 0.223 | | | | |
| 10 | Image | Plano | | — | | | | |

*The optical system can be applied in an infrared wavelength range; the reference wavelength is 830 nm

TABLE 17

Aspheric Coefficients

| | Surface # | | | | | |
|---|---|---|---|---|---|---|
| | 1 | 2 | 4 | 5 | 6 | 7 |
| k = | −1.9020E+01 | −2.8978E+01 | −3.5042E−01 | −3.3265E+00 | −6.4241E+01 | −2.3035E+01 |
| A4 = | 6.4127E−01 | −3.4861E+00 | −3.1525E+00 | −3.5717E+00 | 1.2312E+00 | −7.1902E−01 |
| A6 = | −1.6658E+01 | 3.1572E+01 | 6.5038E+01 | 1.9678E+01 | −2.8828E+00 | 2.8905E+00 |
| A8 = | 1.4991E+02 | −2.9802E+02 | −5.6887E+02 | −6.6722E+01 | 2.7424E+00 | −6.6114E+00 |
| A10 = | −7.3813E+02 | 2.0044E+03 | 3.0475E+03 | 1.2791E+02 | −3.7008E−02 | 8.3281E+00 |
| A12 = | 1.8104E+03 | −7.5624E+03 | −7.9904E+03 | −1.1159E+02 | −1.9881E+00 | −5.8095E+00 |
| A14 = | −1.7851E+03 | 1.1759E+04 | 8.4250E+03 | 2.9689E+01 | 1.4226E+00 | 2.0974E+00 |
| A16 = | | | | | −3.1501E−01 | −3.0514E−01 |

TABLE 18

Embodiment 5: Characteristics of the object-side surface of Lens 3

| Y (mm) | Sag31* 10 | Dsag31* 10 |
|---|---|---|
| 0.00 | 0.000 | 0.000 |
| 0.06 | −0.016 | −0.523 |
| 0.11 | −0.054 | −0.789 |
| 0.17 | −0.101 | −0.803 |
| 0.23 | −0.142 | −0.627 |
| 0.28 | −0.169 | −0.313 |
| 0.34 | −0.176 | 0.088 |
| 0.40 | −0.159 | 0.513 |
| 0.46 | −0.118 | 0.899 |
| 0.51 | −0.058 | 1.194 |
| 0.57 | 0.015 | 1.376 |
| 0.63 | 0.096 | 1.455 |
| 0.68 | 0.180 | 1.473 |
| 0.74 | 0.263 | 1.476 |
| 0.80 | 0.348 | 1.488 |
| 0.85 | 0.432 | 1.479 |
| 0.91 | 0.514 | 1.372 |
| 0.97 | 0.585 | 1.111 |
| 1.02 | 0.639 | 0.786 |
| 1.08 | 0.680 | 0.748 |
| 1.14 | 0.738 | 1.430 |

*The optical effective radius of the object-side surface of lens 3 is 1.14 mm

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 19.

TABLE 19

(Embodiment 5)

| f [mm] | 1.50 | f/f1 | 1.04 |
|---|---|---|---|
| Fno | 1.85 | f/f2 | 3.18 |
| HFOV [deg.] | 45.1 | f1/f2 | 3.09 |
| CT2/f | 0.405 | FOV [deg.] | 90.2 |
| (R1 + R2)/(R1 − R2) | 0.55 | f/EPD | 1.85 |
| (R5 + R6)/(R5 − R6) | 0.24 | SL/TTL | 0.79 |
| R5/f | −0.65 | Td [mm] | 2.021 |

Embodiment 6

Figure 6A:
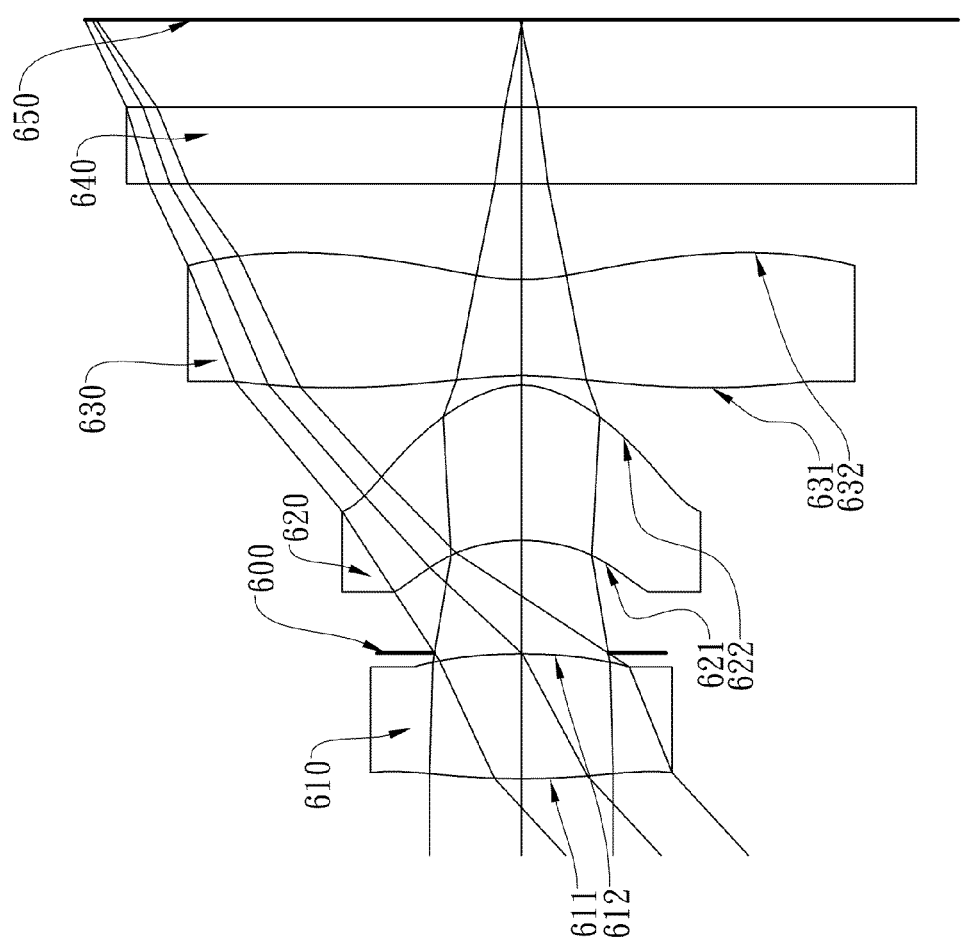
FIG. 6A shows an imaging lens system in accordance with the sixth embodiment of the present invention.
Figure 6B:
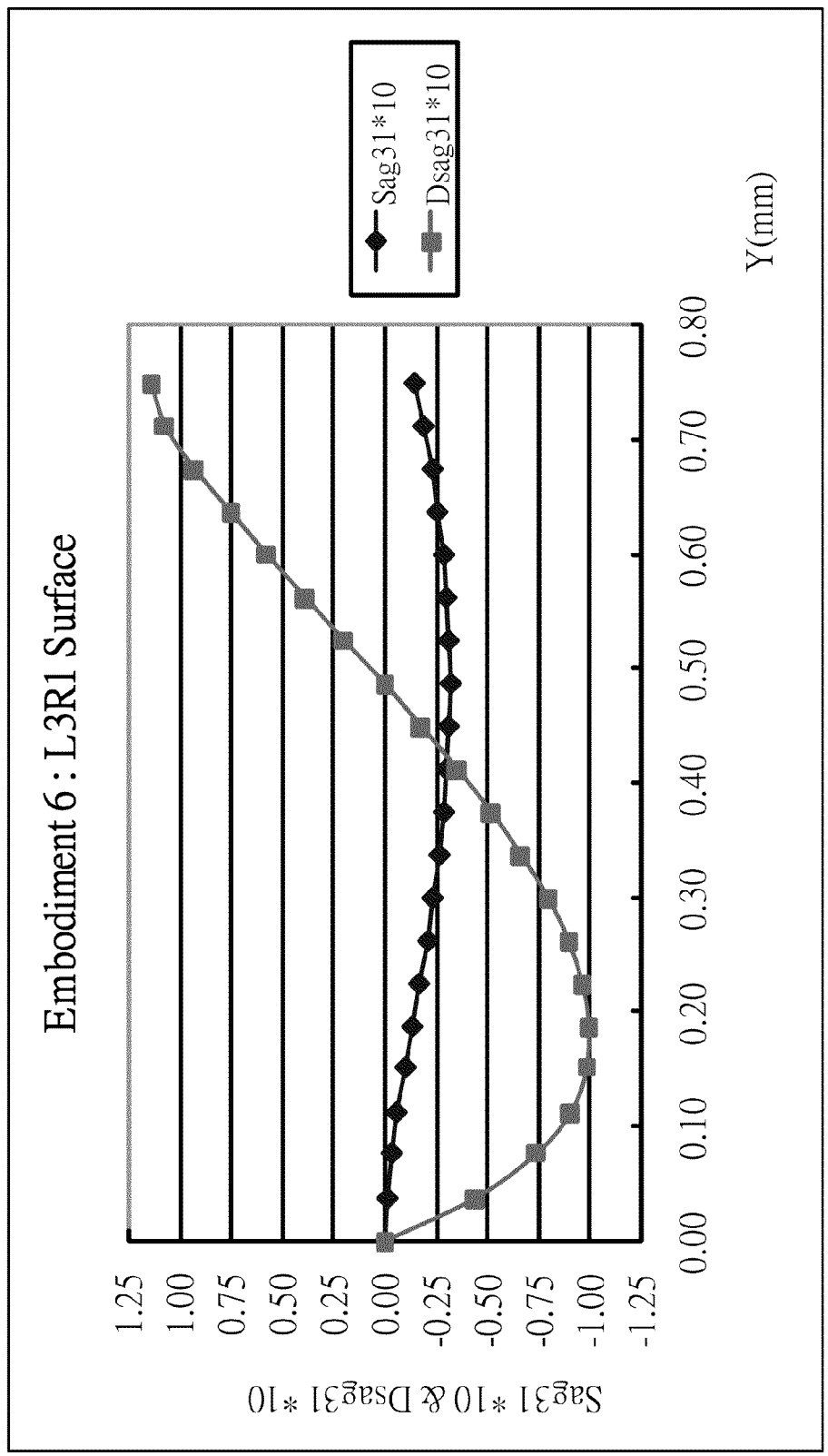
FIG. 6B shows the object-side surface characteristics of the third lens element of the sixth embodiment of the present invention.
Figure 6C:
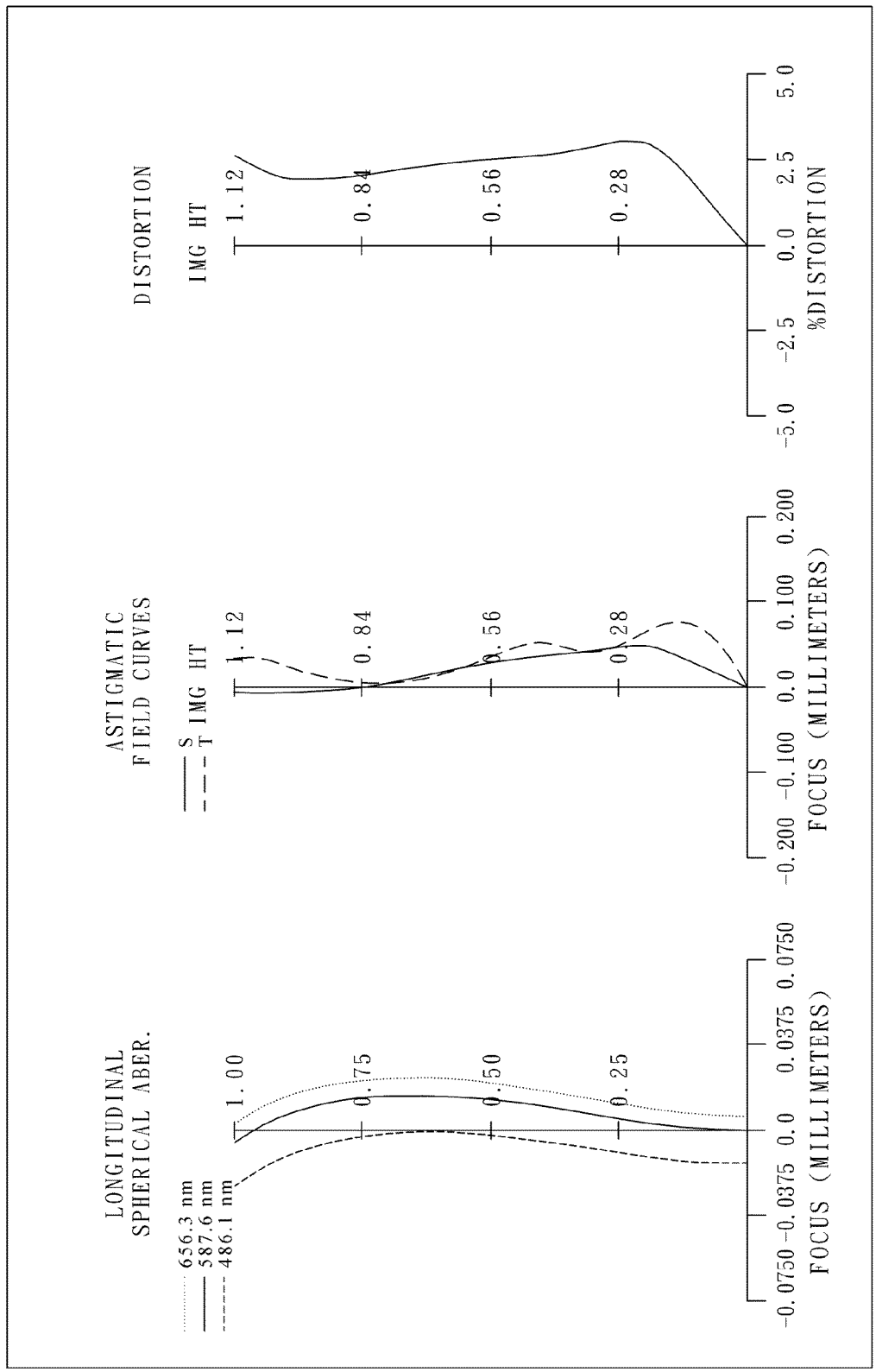
FIG. 6C shows the aberration curves of the sixth embodiment of the present invention.

FIG. 6A shows an imaging lens system in accordance with the sixth embodiment of the present invention, FIG. 6B shows the object-side surface characteristics of the third lens element of the sixth embodiment of the present invention, and FIG. 6C shows the aberration curves of the sixth embodiment of the present invention. The imaging lens system of the sixth embodiment of the present invention mainly comprises three lens elements, in order from an object side to an image side:

a plastic first lens element 610 with positive refractive power having a convex at the paraxial region and concave at the peripheral region object-side surface 611, a convex image-side surface 612 at the paraxial region, and both of the object-side surface 611 and image-side surface 612 thereof being aspheric;

a plastic second lens element 620 with positive refractive power having a concave object-side surface 621 at the paraxial region, a convex image-side surface 622 at the paraxial region, and both of the object-side surface 621 and image-side surface 622 thereof being aspheric; and a plastic third lens element 630 with negative refractive power having a concave object-side surface 631 at the paraxial region, a concave at the paraxial region and convex at the peripheral region image-side surface 632, and both of the object-side surface 631 and image-side surface 632 thereof being aspheric, wherein the object-side surface 631 of the third lens element 630 has one critical point and the Dsag31 thereof switches signs once;

wherein the imaging lens system further comprises a stop 600 disposed between the first lens element 610 and the second lens element 620;

the imaging lens system further comprises a filter element 640 disposed between the image-side surface 632 of the third lens element 630 and an image plane 650, and the filter element 640 is made of glass and has no influence on the focal length of the imaging lens system.

The detailed optical data of the sixth embodiment is shown in TABLE 20, the aspheric surface data is shown in TABLE 21, and the object-side surface characteristics of the third lens element is shown in TABLE 22, wherein the units of the curvature radius, the thickness and the focal length are mm, and HFOV is half of the maximal field of view.

TABLE 20

(Embodiment 6)
f = 1.18 mm, Fno = 2.46, HFOV = 42.7 deg.

| Surface # | | Curvature Radius | Thickness | Material | | Refractive Index | Focal Length |
|---|---|---|---|---|---|---|---|
| 0 | Object | Plano | Infinity | | | | |
| 1 | Lens 1 | 1.863 ASP | 0.326 | Plastic | APEL-5514ML | 1.544 | 1.56 |
| 2 | | −1.464 ASP | 0.002 | | | | |
| 3 | Ape. Stop | Plano | 0.294 | | | | |
| 4 | Lens 2 | −0.500 ASP | 0.406 | Plastic | ARTON-D4532 | 1.514 | 0.45 |
| 5 | | −0.203 ASP | 0.025 | | | | |
| 6 | Lens 3 | −0.786 ASP | 0.250 | Plastic | ARTON-D4532 | 1.514 | −0.56 |
| 7 | | 0.503 ASP | 0.250 | | | | |
| 8 | Filter | Plano | 0.200 | Glass | HOYA BSC7 | 1.517 | — |
| 9 | | Plano | 0.228 | | | | |
| 10 | Image | Plano | — | | | | |

* The reference wavelength is d-line 587.6 nm

TABLE 21

Aspheric Coefficients

| | Surface # | | | | | |
|---|---|---|---|---|---|---|
| | 1 | 2 | 4 | 5 | 6 | 7 |
| k = | −7.9671E+00 | −7.4783E+01 | −7.1553E−01 | −3.7142E+00 | −6.5717E+01 | −1.5130E+01 |
| A4 = | 1.2163E−01 | −4.1803E+00 | −3.6535E+00 | −1.1556E+01 | 4.4383E−01 | −1.1945E+00 |
| A6 = | −1.8354E+01 | 3.9847E+01 | −7.3509E+01 | 1.2615E+02 | −6.9265E−01 | 4.7810E+00 |
| A8 = | 2.1845E+02 | −3.2771E+02 | 3.2246E+03 | −1.0018E+03 | 8.3238E−01 | −1.2910E+01 |
| A10 = | −1.8826E+03 | 1.1317E+03 | −6.3570E+04 | 4.2269E+03 | −1.0587E+00 | 2.1364E+01 |
| A12 = | 9.2269E+03 | | 6.9838E+05 | −6.4107E+03 | 1.1005E+00 | −2.1192E+01 |
| A14 = | −2.3670E+04 | | −3.6850E+06 | | −1.9680E−01 | 1.1765E+01 |
| A16 = | 2.2554E+04 | | 7.1574E+06 | | −5.2222E−01 | −2.8800E+00 |

TABLE 22

Embodiment 6: Characteristics of the object-side surface of Lens 3

| Y (mm) | Sag31*10 | Dsag31*10 |
|---|---|---|
| 0.00 | 0.000 | 0.000 |
| 0.04 | −0.009 | −0.443 |
| 0.08 | −0.031 | −0.748 |
| 0.11 | −0.063 | −0.913 |
| 0.15 | −0.098 | −0.984 |
| 0.19 | −0.136 | −0.995 |
| 0.22 | −0.172 | −0.961 |
| 0.26 | −0.207 | −0.892 |
| 0.30 | −0.239 | −0.794 |
| 0.34 | −0.266 | −0.669 |
| 0.37 | −0.288 | −0.523 |
| 0.41 | −0.305 | −0.360 |
| 0.45 | −0.315 | −0.183 |
| 0.49 | −0.319 | 0.002 |
| 0.52 | −0.315 | 0.191 |
| 0.56 | −0.304 | 0.381 |
| 0.60 | −0.287 | 0.568 |
| 0.64 | −0.262 | 0.751 |
| 0.67 | −0.230 | 0.923 |
| 0.71 | −0.193 | 1.068 |
| 0.75 | −0.152 | 1.140 |

*The optical effective radius of the object-side surface of lens 3 is 0.75 mm

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 23.

TABLE 23

(Embodiment 6)

| f [mm] | 1.18 | f/f1 | 0.78 |
|---|---|---|---|
| Fno | 2.46 | f/f2 | 2.59 |
| HFOV [deg.] | 42.7 | f1/f2 | 3.47 |
| CT2/f | 0.344 | FOV [deg.] | 85.4 |
| (R1 + R2)/(R1 − R2) | 0.12 | f/EPD | 2.46 |
| (R5 + R6)/(R5 − R6) | 0.22 | SL/TTL | 0.83 |
| R5/f | −0.67 | Td [mm] | 1.303 |

Embodiment 7

Figure 7A:
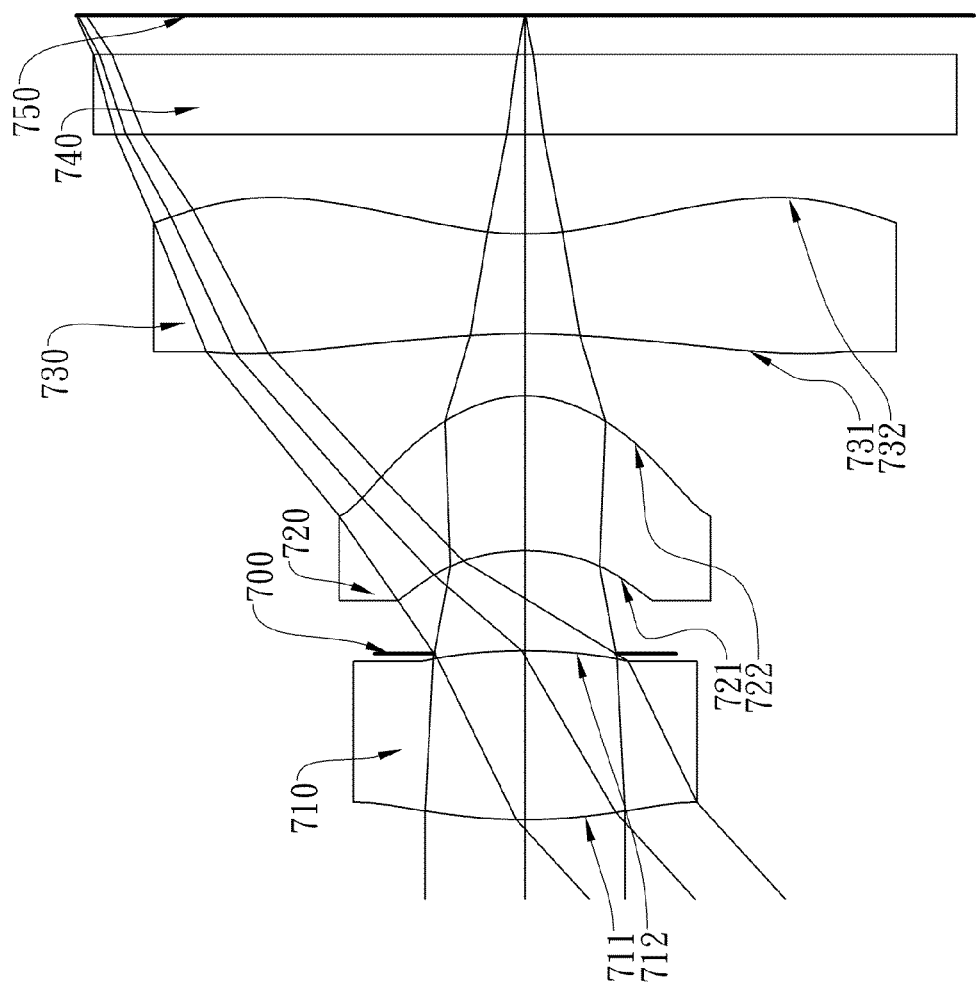
FIG. 7A shows an imaging lens system in accordance with the seventh embodiment of the present invention.
Figure 7B:
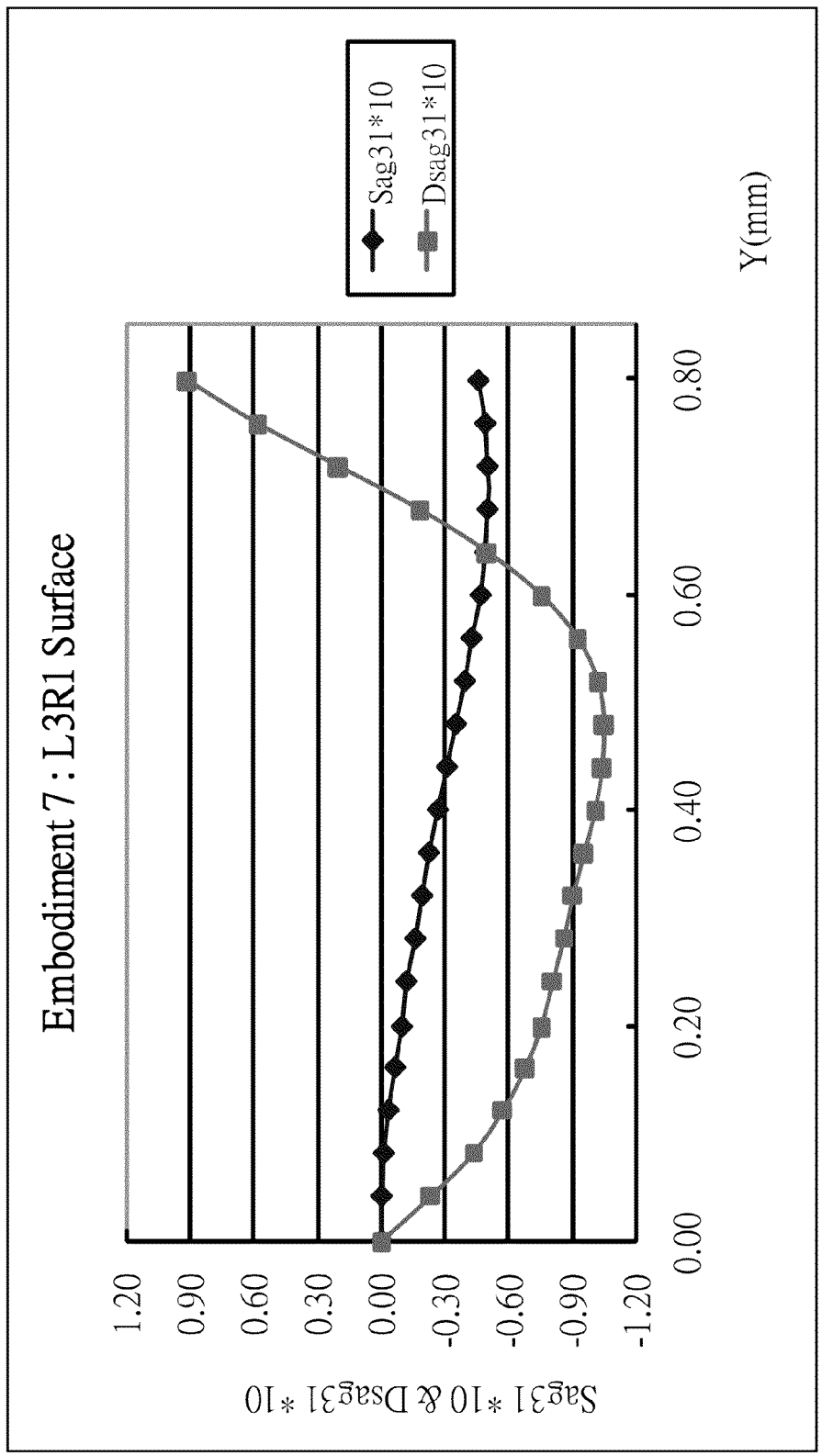
FIG. 7B shows the object-side surface characteristics of the third lens element of the seventh embodiment of the present invention.
Figure 7C:
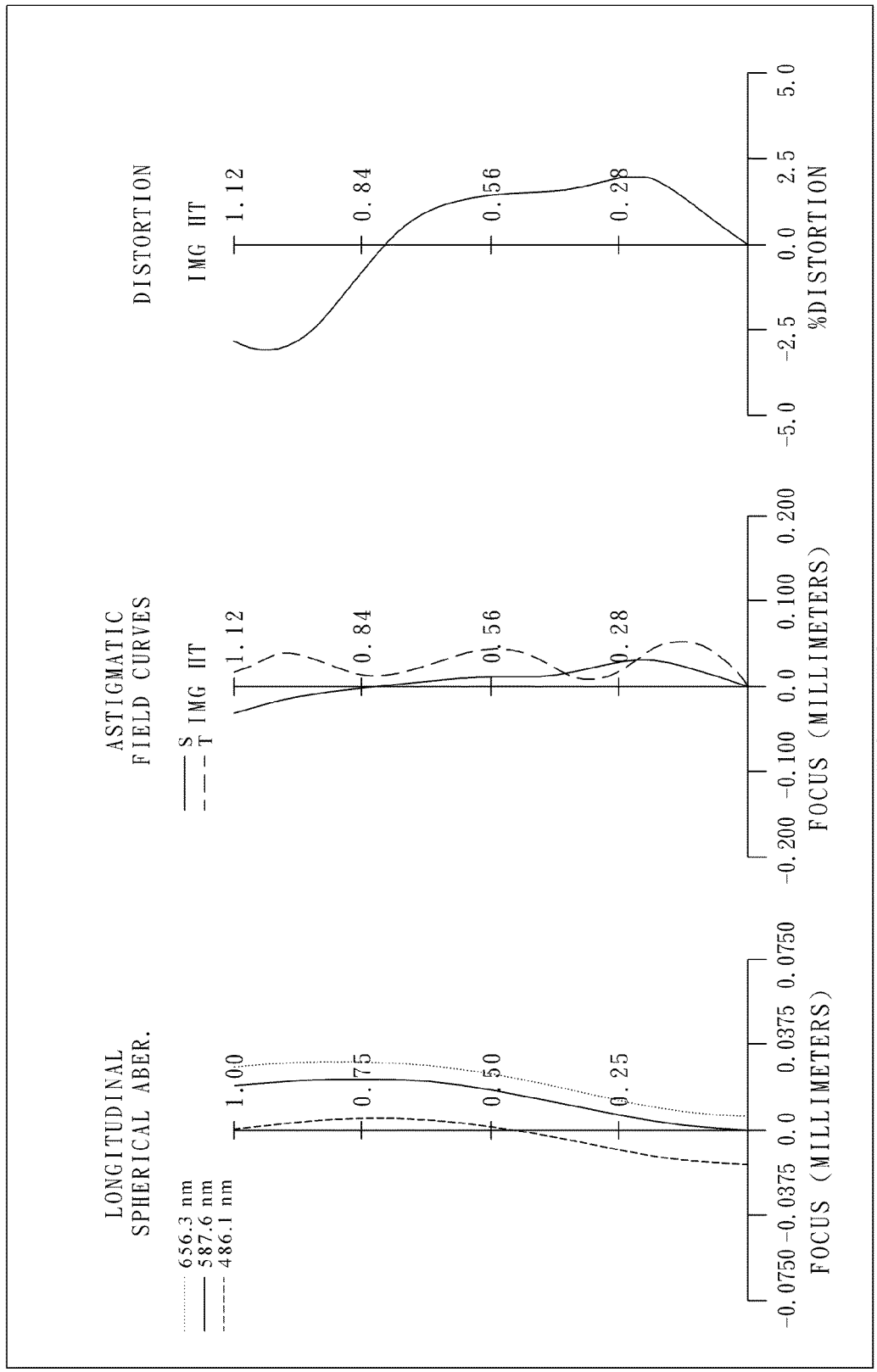
FIG. 7C shows the aberration curves of the seventh embodiment of the present invention.

FIG. 7A shows an imaging lens system in accordance with the seventh embodiment of the present invention, FIG. 7B shows the object-side surface characteristics of the third lens element of the seventh embodiment of the present invention, and FIG. 7C shows the aberration curves of the seventh embodiment of the present invention. The imaging lens system of the seventh embodiment of the present invention mainly comprises three lens elements, in order from an object side to an image side:

a plastic first lens element 710 with positive refractive power having a convex at the paraxial region and concave at the peripheral region object-side surface 711, a convex image-side surface 712 at the paraxial region, and both of the object-side surface 711 and image-side surface 712 thereof being aspheric;

a plastic second lens element 720 with positive refractive power having a concave object-side surface 721 at the paraxial region, a convex image-side surface 722 at the paraxial region, and both of the object-side surface 721 and image-side surface 722 thereof being aspheric; and a plastic third lens element 730 with negative refractive power having a concave object-side surface 731 at the paraxial region, a concave at the paraxial region and convex at the peripheral region image-side surface 732, and both of the object-side surface 731 and image-side surface 732 thereof being aspheric, wherein the object-side surface 731 of the third lens element 730 has one critical point and the Dsag31 thereof switches signs once;

wherein the imaging lens system further comprises a stop 700 disposed between the first lens element 710 and the second lens element 720, and the stop 700 is closer to the object side than an intersection of the image-side surface 712 of the first lens element 710 and the optical axis;

the imaging lens system further comprises a filter element 740 disposed between the image-side surface 732 of the third lens element 730 and an image plane 750, and the filter element 740 is made of glass and has no influence on the focal length of the imaging lens system.

The detailed optical data of the seventh embodiment is shown in TABLE 24, the aspheric surface data is shown in TABLE 25, and the object-side surface characteristics of the third lens element is shown in TABLE 26, wherein the units of the curvature radius, the thickness and the focal length are mm, and HFOV is half of the maximal field of view.

TABLE 24

(Embodiment 7)
f = 1.25 mm, Fno = 2.50, HFOV = 42.4 deg.

| Surface # | | Curvature Radius | Thickness | Material | Refractive Index | Focal Length |
|---|---|---|---|---|---|---|
| 0 | Object | Plano | Infinity | | | |
| 1 | Lens 1 | 1.341 ASP | 0.423 | Plastic | ARTON-D4532 | 1.514 | 1.47 |
| 2 | | −1.555 ASP | −0.007 | | | | |
| 3 | Ape. Stop | Plano | 0.258 | | | | |
| 4 | Lens 2 | −0.513 ASP | 0.389 | Plastic | ARTON-D4532 | 1.514 | 0.86 |
| 5 | | −0.298 ASP | 0.156 | | | | |
| 6 | Lens 3 | −1.627 ASP | 0.250 | Plastic | ARTON-D4532 | 1.514 | −0.98 |
| 7 | | 0.770 ASP | 0.250 | | | | |
| 8 | Filter | Plano | 0.200 | Glass | HOYA BSC7 | 1.517 | — |
| 9 | | Plano | 0.098 | | | | |
| 10 | Image | Plano | — | | | | |

* The reference wavelength is d-line 587.6 nm

TABLE 25

Aspheric Coefficients

| | Surface # | | | | | |
|---|---|---|---|---|---|---|
| | 1 | 2 | 4 | 5 | 6 | 7 |
| k = | −1.3452E+01 | −6.1768E+01 | −8.3402E−01 | −5.1964E+00 | −1.1190E+02 | −7.5090E+00 |
| A4 = | 5.9860E−01 | −2.9953E+00 | −2.0354E+00 | −1.2333E+01 | 4.8218E−02 | −8.1070E−01 |
| A6 = | −1.2002E+01 | 1.8274E+01 | −1.0941E+02 | 1.3125E+02 | −1.0183E+00 | 2.3977E+00 |
| A8 = | 1.1913E+02 | −1.1417E+02 | 3.3966E+03 | −9.9458E+02 | 3.8820E+00 | −5.6220E+00 |
| A10 = | −8.8554E+02 | 4.4033E+02 | −5.8763E+04 | 3.9554E+03 | −5.6393E+00 | 6.9705E+00 |
| A12 = | 3.5142E+03 | | 5.9675E+05 | −5.6855E+03 | 3.9561E+00 | −4.5842E+00 |
| A14 = | −6.8699E+03 | | −2.9909E+06 | | −1.2274E+00 | 1.7217E+00 |
| A16 = | 4.4994E+03 | | 5.6361E+06 | | 2.0447E−02 | −3.6431E−01 |

TABLE 26

Embodiment 7: Characteristics of the object-side surface of Lens 3

| Y (mm) | Sag31*10 | Dsag31*10 |
|---|---|---|
| 0.00 | 0.000 | 0.000 |
| 0.04 | −0.005 | −0.237 |
| 0.08 | −0.018 | −0.435 |
| 0.12 | −0.039 | −0.580 |
| 0.16 | −0.064 | −0.680 |
| 0.20 | −0.093 | −0.751 |
| 0.24 | −0.124 | −0.807 |
| 0.28 | −0.157 | −0.857 |
| 0.32 | −0.192 | −0.907 |
| 0.36 | −0.229 | −0.959 |
| 0.40 | −0.269 | −1.007 |
| 0.44 | −0.310 | −1.043 |
| 0.48 | −0.351 | −1.052 |
| 0.52 | −0.393 | −1.017 |
| 0.56 | −0.432 | −0.922 |
| 0.60 | −0.465 | −0.752 |
| 0.64 | −0.491 | −0.503 |
| 0.68 | −0.505 | −0.178 |
| 0.72 | −0.504 | 0.198 |
| 0.76 | −0.489 | 0.585 |
| 0.80 | −0.458 | 0.909 |

*The optical effective radius of the object-side surface of lens 3 is 0.80 mm

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 27.

TABLE 27

(Embodiment 7)

| f [mm] | 1.25 | f/f1 | 0.85 |
|---|---|---|---|
| Fno | 2.50 | f/f2 | 1.46 |

TABLE 27-continued (Embodiment 7)

| HFOV [deg.] | 42.4 | f1/f2 | 1.71 |
|---|---|---|---|
| CT2/f | 0.311 | FOV [deg.] | 84.8 |
| (R1 + R2)/(R1 − R2) | −0.07 | f/EPD | 2.50 |
| (R5 + R6)/(R5 − R6) | 0.36 | SL/TTL | 0.79 |
| R5/f | −1.30 | Td [mm] | 1.469 |

Embodiment 8

Figure 8A:
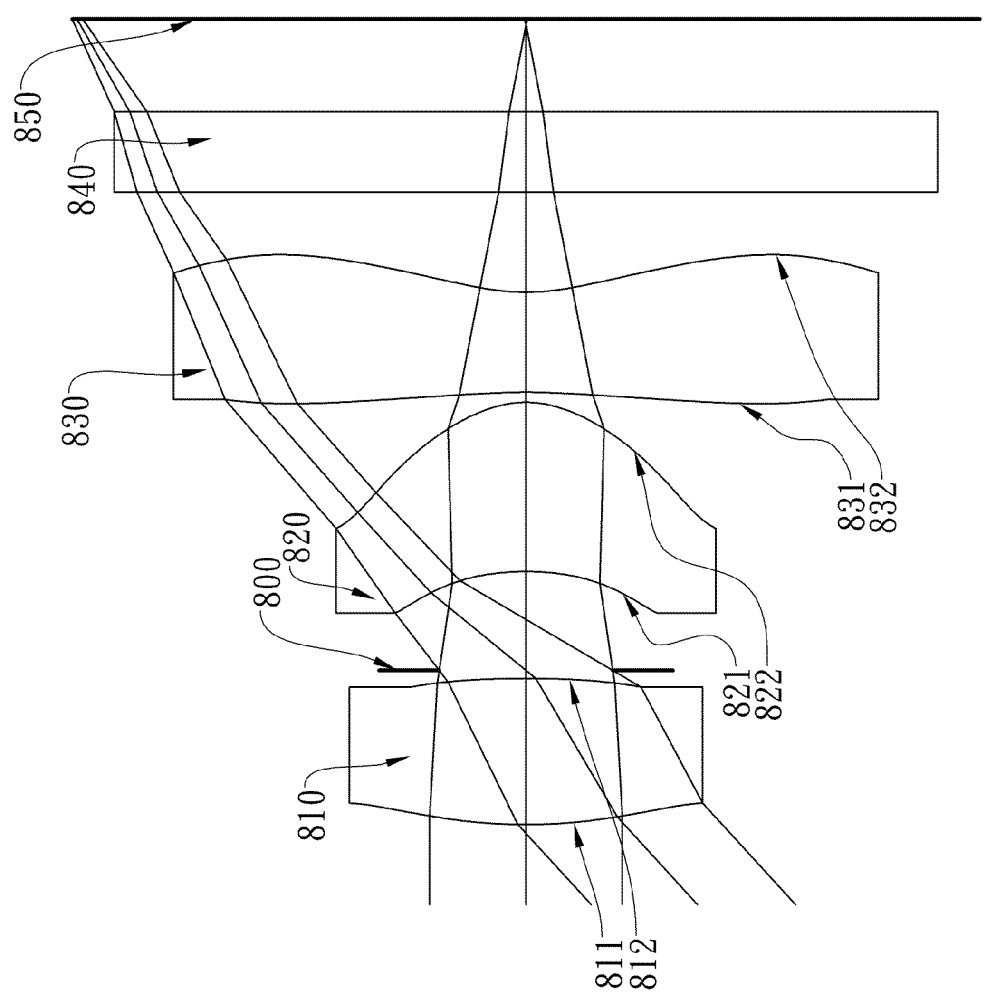
FIG. 8A shows an imaging lens system in accordance with the eighth embodiment of the present invention.
Figure 8B:
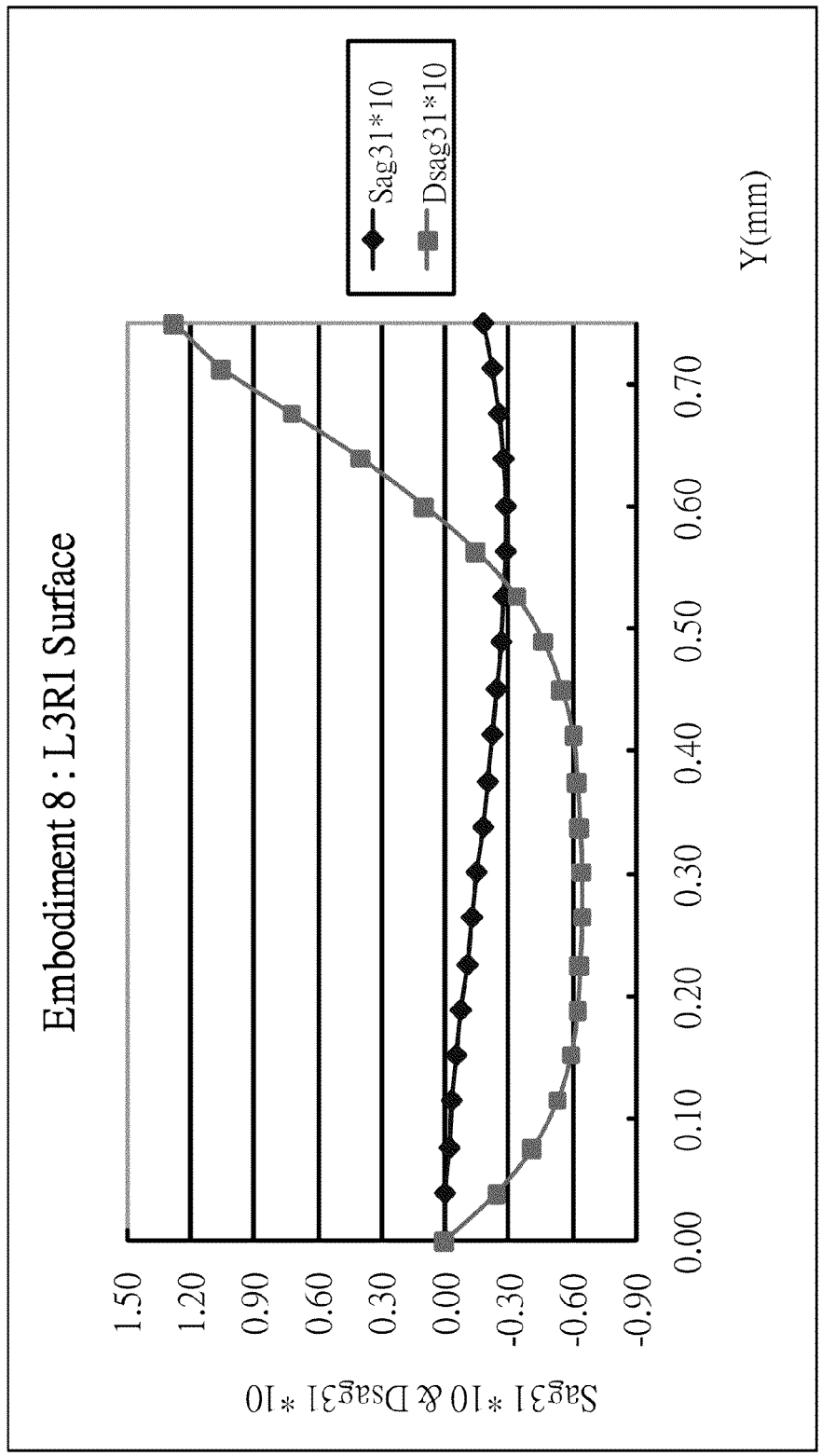
FIG. 8B shows the object-side surface characteristics of the third lens element of the eighth embodiment of the present invention.
Figure 8C:
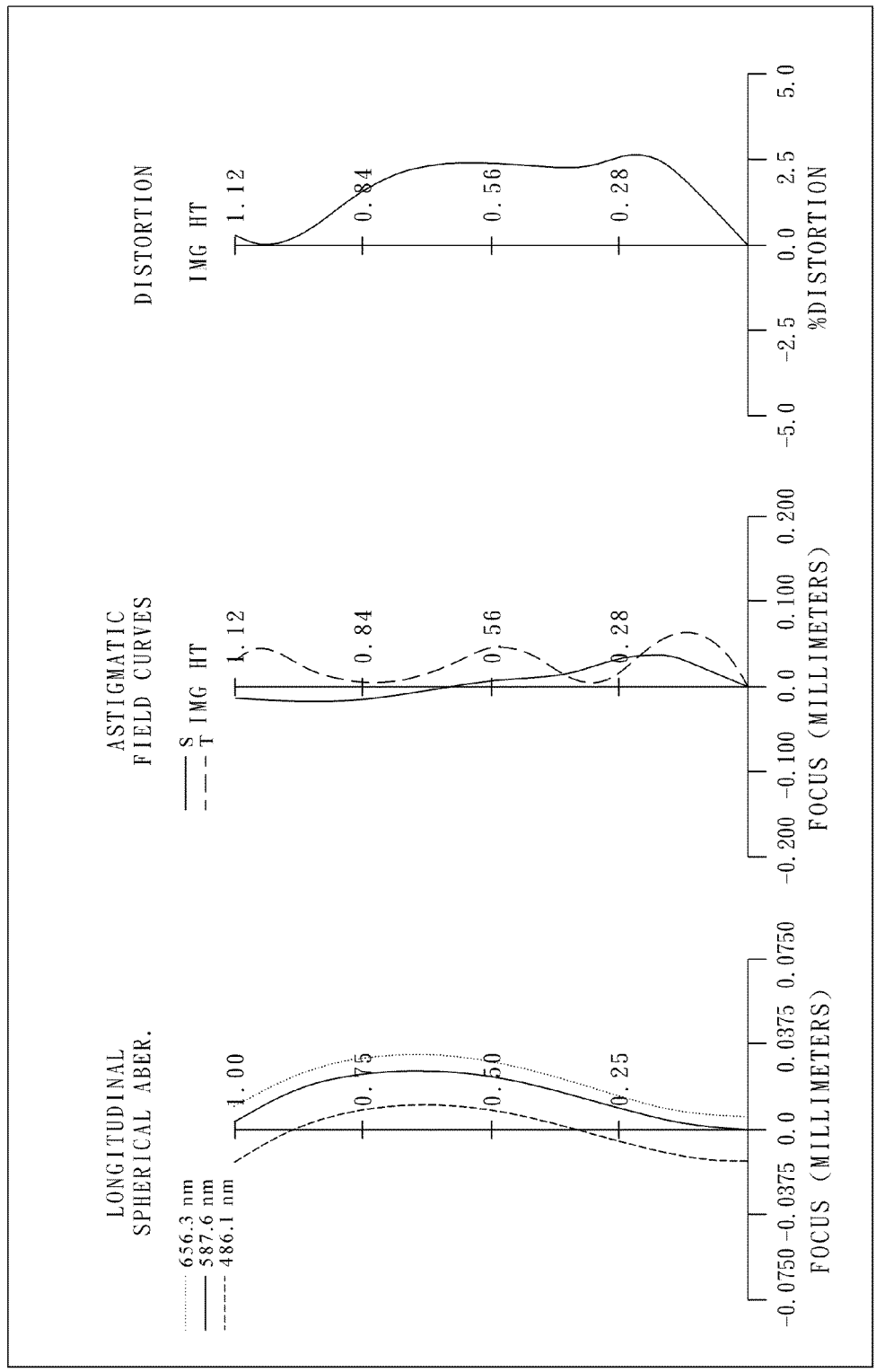
FIG. 8C shows the aberration curves of the eighth embodiment of the present invention.

FIG. 8A shows an imaging lens system in accordance with the eighth embodiment of the present invention, FIG. 8B shows the object-side surface characteristics of the third lens element of the eighth embodiment of the present invention, and FIG. 8C shows the aberration curves of the eighth embodiment of the present invention. The imaging lens system of the eighth embodiment of the present invention mainly comprises three lens elements, in order from an object side to an image side:

a plastic first lens element 810 with positive refractive power having a convex at the paraxial region and concave at the peripheral region object-side surface 811, a convex image-side surface 812 at the paraxial region, and both of the object-side surface 811 and image-side surface 812 thereof being aspheric;

a plastic second lens element 820 with positive refractive power having a concave object-side surface 821 at the paraxial region, a convex image-side surface 822 at the paraxial region, and both of the object-side surface 821 and image-side surface 822 thereof being aspheric; and a plastic third lens element 830 with negative refractive power having a concave object-side surface 831 at the paraxial region, a concave at the paraxial region and convex at the peripheral region image-side surface 832, and both of the object-side surface 831 and image-side surface 832 thereof being aspheric, wherein the object-side surface 831 of the third lens element 830 has one critical point and the Dsag31 thereof switches signs once;

wherein the imaging lens system further comprises a stop 800 disposed between the first lens element 810 and the second lens element 820;

the imaging lens system further comprises a filter element 840 disposed between the image-side surface 832 of the third lens element 830 and an image plane 850, and the filter element 840 is made of glass and has no influence on the focal length of the imaging lens system.

The detailed optical data of the eighth embodiment is shown in TABLE 28, the aspheric surface data is shown in TABLE 29, and the object-side surface characteristics of the third lens element is shown in TABLE 30, wherein the units of the curvature radius, the thickness and the focal length are mm, and HFOV is half of the maximal field of view.

TABLE 28

(Embodiment 8)
f = 1.21 mm, Fno = 2.52, HFOV = 42.4 deg.

| Surface # | | Curvature Radius | | Thickness | Material | Refractive Index | Focal Length |
|---|---|---|---|---|---|---|---|
| 0 | Object | Plano | | Infinity | | | |
| 1 | Lens 1 | 1.301 | ASP | 0.365 | Plastic ARTON-D4532 | 1.514 | 1.73 |
| 2 | | −2.525 | ASP | 0.020 | | | |
| 3 | Ape. Stop | Plano | | 0.247 | | | |
| 4 | Lens 2 | −0.667 | ASP | 0.423 | Plastic ARTON-D4532 | 1.514 | 0.56 |
| 5 | | −0.246 | ASP | 0.025 | | | |
| 6 | Lens 3 | −1.481 | ASP | 0.250 | Plastic ARTON-D4532 | 1.514 | −0.71 |
| 7 | | 0.508 | ASP | 0.250 | | | |
| 8 | Filter | Plano | | 0.200 | Glass HOYA BSC7 | 1.510 | — |
| 9 | | Plano | | 0.232 | | | |
| 10 | Image | Plano | | — | | | |

* The reference wavelength is d-line 587.6 nm

TABLE 29

Aspheric Coefficients

| | Surface # | | | | | |
|---|---|---|---|---|---|---|
| | 1 | 2 | 4 | 5 | 6 | 7 |
| k = | −7.1680E+00 | −2.0000E+02 | −7.4052E−01 | −4.5861E+00 | −1.7787E+02 | −1.1600E+01 |
| A4 = | 5.7267E−01 | −2.1472E+00 | −2.2646E+00 | −1.1592E+01 | 1.3446E−01 | −7.3670E−01 |
| A6 = | −1.2113E+01 | 1.5619E+01 | −9.8520E+01 | 1.3034E+02 | −9.5638E−01 | 2.2497E+00 |
| A8 = | 1.2263E+02 | −1.2918E+02 | 3.3744E+03 | −1.0030E+03 | 3.7152E+00 | −5.4849E+00 |
| A10 = | −8.7361E+02 | 4.6516E+02 | −5.9256E+04 | 3.9432E+03 | −5.7184E+00 | 6.9824E+00 |
| A12 = | 3.4740E+03 | | 5.9577E+05 | −5.5878E+03 | 4.1084E+00 | −4.5445E+00 |
| A14 = | −7.1345E+03 | | −2.9797E+06 | | −9.9179E−01 | 1.7258E+00 |
| A16 = | 5.5049E+03 | | 5.6359E+06 | | −4.2188E−01 | −4.7796E−01 |

TABLE 30

Embodiment 8: Characteristics of the object-side surface of Lens 3

| Y (mm) | Sag31*10 | Dsag31*10 |
|---|---|---|
| 0.00 | 0.000 | 0.000 |
| 0.04 | −0.005 | −0.240 |
| 0.08 | −0.017 | −0.418 |
| 0.11 | −0.035 | −0.528 |
| 0.15 | −0.056 | −0.590 |
| 0.19 | −0.079 | −0.622 |
| 0.23 | −0.103 | −0.638 |
| 0.26 | −0.127 | −0.644 |
| 0.30 | −0.151 | −0.645 |
| 0.34 | −0.175 | −0.640 |
| 0.38 | −0.199 | −0.627 |
| 0.41 | −0.222 | −0.600 |
| 0.45 | −0.244 | −0.550 |
| 0.49 | −0.263 | −0.465 |
| 0.53 | −0.278 | −0.335 |
| 0.56 | −0.287 | −0.149 |
| 0.60 | −0.288 | 0.096 |
| 0.64 | −0.279 | 0.394 |
| 0.68 | −0.258 | 0.726 |
| 0.71 | −0.225 | 1.046 |
| 0.75 | −0.181 | 1.268 |

*The optical effective radius of the object-side surface of lens 3 is 0.75 mm

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 31.

TABLE 31

(Embodiment 8)

| f [mm] | 1.21 | f/f1 | 0.70 |
|---|---|---|---|
| Fno | 2.52 | f/f2 | 2.15 |
| HFOV [deg.] | 42.4 | f1/f2 | 3.09 |
| CT2/f | 0.350 | FOV [deg.] | 84.8 |
| (R1 + R2)/(R1 − R2) | −0.32 | f/EPD | 2.52 |
| (R5 + R6)/(R5 − R6) | 0.49 | SL/TTL | 0.80 |
| R5/f | −1.22 | Td [mm] | 1.330 |

Embodiment 9

Figure 9A:
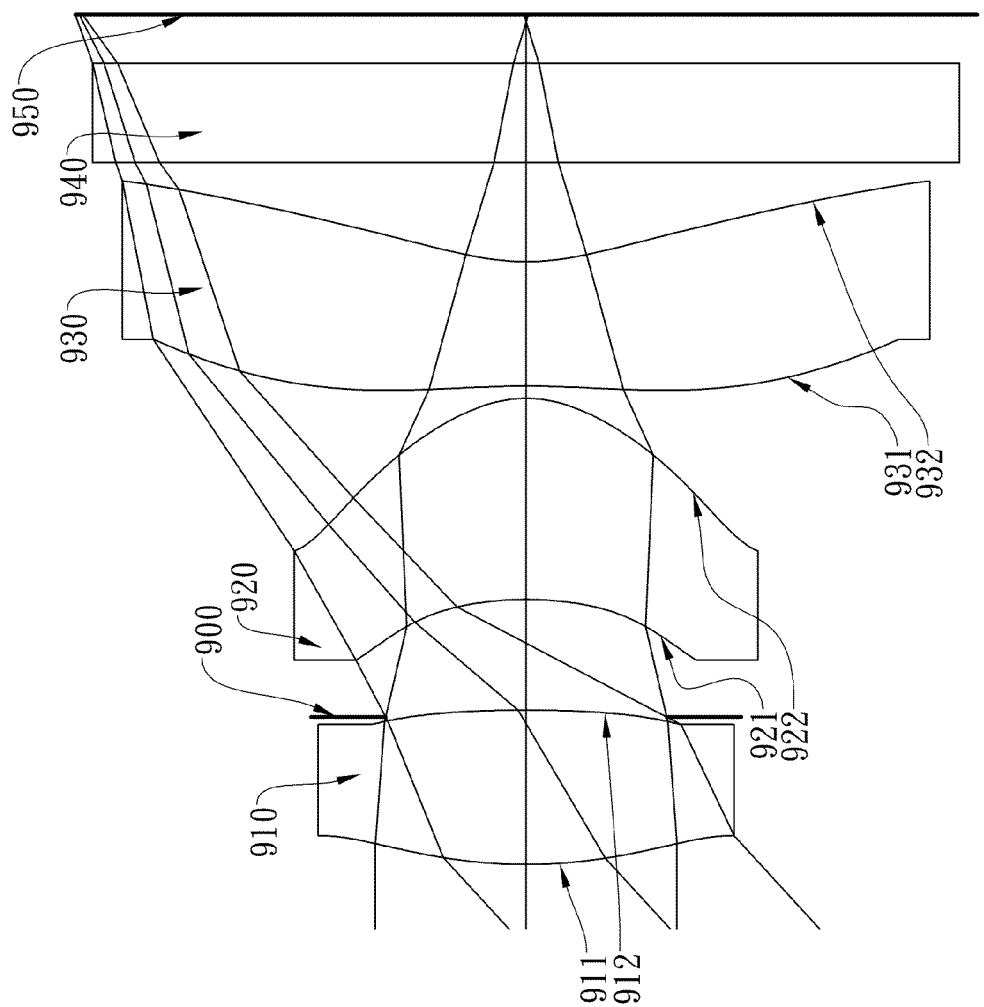
FIG. 9A shows an imaging lens system in accordance with the ninth embodiment of the present invention.
Figure 9B:
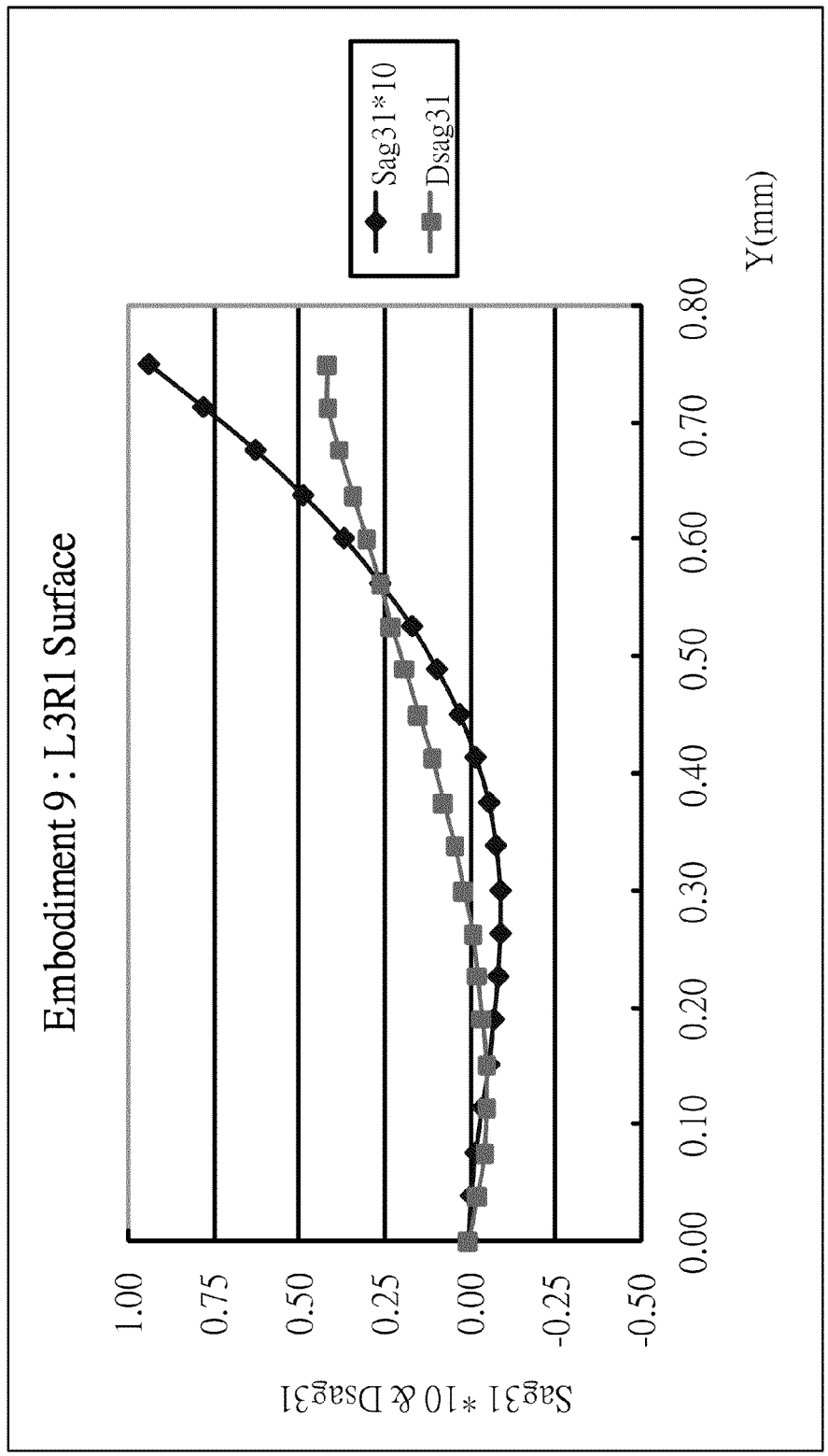
FIG. 9B shows the object-side surface characteristics of the third lens element of the ninth embodiment of the present invention.
Figure 9C:
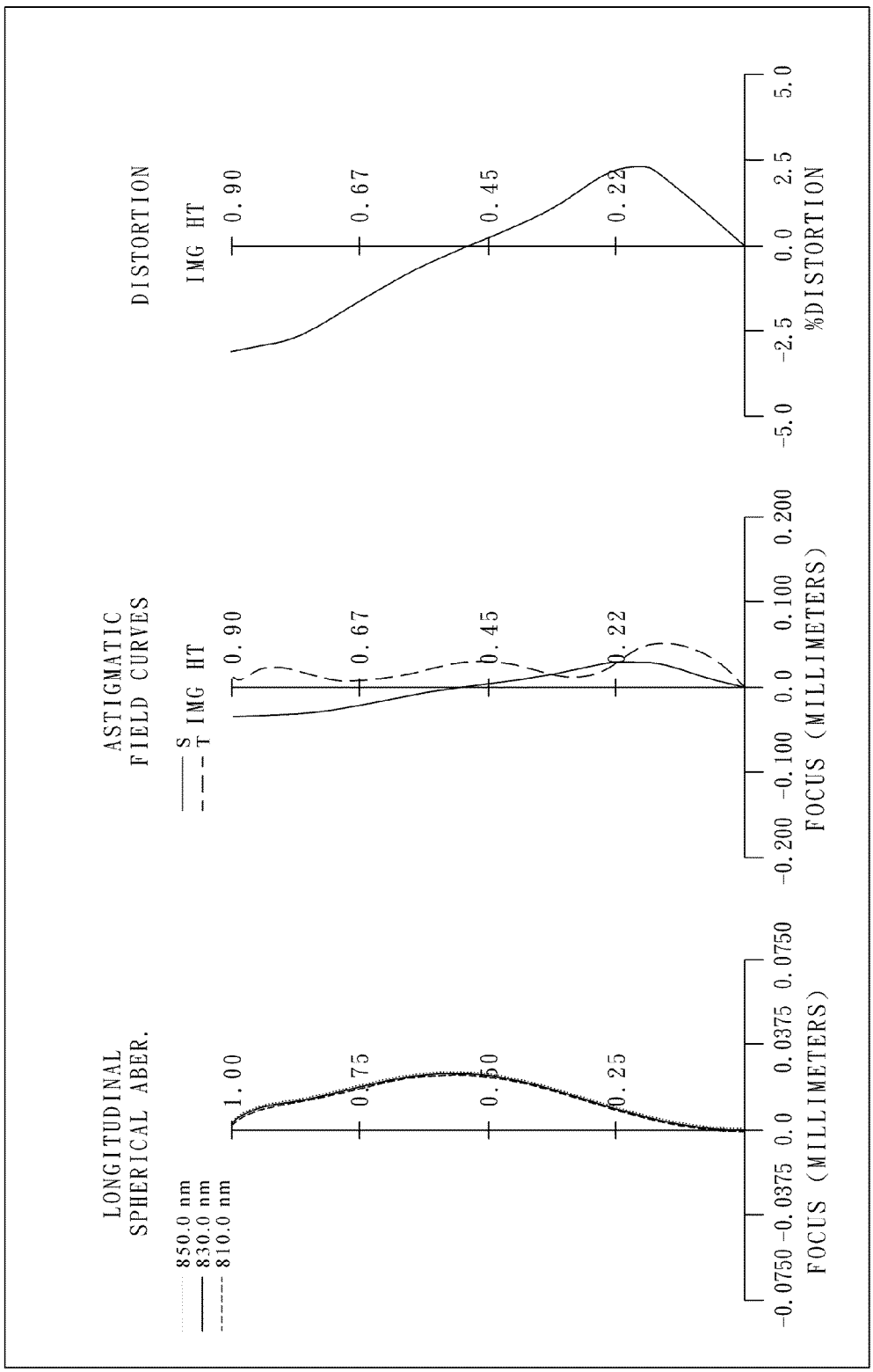
FIG. 9C shows the aberration curves of the ninth embodiment of the present invention.

FIG. 9A shows an imaging lens system in accordance with the ninth embodiment of the present invention, FIG. 9B shows the object-side surface characteristics of the third lens element of the ninth embodiment of the present invention, and FIG. 9C shows the aberration curves of the ninth embodiment of the present invention. The imaging lens system of the ninth embodiment of the present invention mainly comprises three lens elements, in order from an object side to an image side:

a plastic first lens element 910 with positive refractive power having a convex at the paraxial region and concave at the peripheral region object-side surface 911, a convex image-side surface 912 at the paraxial region, and both of the object-side surface 911 and image-side surface 912 thereof being aspheric;

a plastic second lens element 920 with positive refractive power having a concave object-side surface 921 at the paraxial region, a convex image-side surface 922 at the paraxial region, and both of the object-side surface 921 and image-side surface 922 thereof being aspheric; and a plastic third lens element 930 with negative refractive power having a concave object-side surface 931 at the paraxial region, a concave at the paraxial region and convex at the peripheral region image-side surface 932, and both of the object-side surface 931 and image-side surface 932 thereof being aspheric, wherein the object-side surface 931 of the third lens element 930 has one critical point and the Dsag31 thereof switches signs once;

wherein the imaging lens system further comprises a stop 900 disposed between the first lens element 910 and the second lens element 920, and the stop 900 is closer to the object side than an intersection of the image-side surface 912 of the first lens element 910 and the optical axis;

the imaging lens system further comprises a filter element 940 disposed between the image-side surface 932 of the third lens element 930 and an image plane 950, and the filter element 940 is made of glass and has no influence on the focal length of the imaging lens system.

The detailed optical data of the ninth embodiment is shown in TABLE 32, the aspheric surface data is shown in TABLE 33, and the object-side surface characteristics of the third lens element is shown in TABLE 34, wherein the units of the curvature radius, the thickness and the focal length are mm, and HFOV is half of the maximal field of view.

TABLE 32

(Embodiment 9)
f = 1.00 mm, Fno = 1.65, HFOV = 42.6 deg.

| Surface # | | Curvature Radius | Thickness | Material | Refractive Index | Focal Length |
|---|---|---|---|---|---|---|
| 0 | Object | Plano | Infinity | | | |
| 1 | Lens 1 | 0.985 ASP | 0.311 | Plastic | ARTON-D4532 | 1.507 | 1.48 |
| 2 | | −2.804 ASP | −0.014 | | | | |
| 3 | Ape. Stop | Plano | 0.237 | | | | |
| 4 | Lens 2 | −0.717 ASP | 0.406 | Plastic | ARTON-D4532 | 1.507 | 0.51 |
| 5 | | −0.225 ASP | 0.025 | | | | |
| 6 | Lens 3 | −1.352 ASP | 0.250 | Plastic | ARTON-D4532 | 1.507 | −0.61 |
| 7 | | 0.426 ASP | 0.200 | | | | |
| 8 | Filter | Plano | 0.200 | Glass | HOYA BSC7 | 1.510 | — |
| 9 | | Plano | 0.098 | | | | |
| 10 | Image | Plano | — | | | | |

* The optical system can be applied in an infrared wavelength range; the reference wavelength is 830 nm

TABLE 33

Aspheric Coefficients

| | Surface # | | | | | |
|---|---|---|---|---|---|---|
| | 1 | 2 | 4 | 5 | 6 | 7 |
| k = | −7.7403E+00 | −1.6262E+02 | 3.8866E−02 | −4.4135E+00 | −2.0000E+02 | −1.0690E+01 |
| A4 = | 8.0938E−01 | −2.0087E+00 | −2.5219E+00 | −1.1679E+01 | 9.7266E−01 | −6.4435E−01 |
| A6 = | −1.2918E+01 | 4.5234E+00 | −1.0017E+02 | 1.3210E+02 | −1.7909E+00 | 2.5323E+00 |
| A8 = | 1.1595E+02 | −2.6783E+01 | 3.2811E+03 | −1.0041E+03 | 3.1205E+00 | −5.6015E+00 |
| A10 = | −9.0103E+02 | 8.9499E+01 | −5.9073E+04 | 3.9378E+03 | −5.6615E+00 | 6.7227E+00 |
| A12 = | 3.5325E+03 | | 5.9745E+05 | −5.5671E+03 | 5.7966E+00 | −4.1971E+00 |
| A14 = | −7.5179E+03 | | −2.9655E+06 | | 1.3556E+00 | 1.6281E+00 |
| A16 = | 7.0753E+03 | | 5.6393E+06 | | −5.0338E+00 | −7.2441E−01 |

TABLE 34

Embodiment 9: Characteristics of the object-side surface of Lens 3

| Y (mm) | Sag31*10 | Dsag31 |
|---|---|---|
| 0.00 | 0.000 | 0.000 |
| 0.04 | −0.005 | −0.026 |
| 0.08 | −0.018 | −0.042 |
| 0.11 | −0.035 | −0.049 |
| 0.15 | −0.054 | −0.047 |
| 0.19 | −0.070 | −0.040 |
| 0.23 | −0.083 | −0.026 |
| 0.26 | −0.089 | −0.008 |
| 0.30 | −0.088 | 0.016 |
| 0.34 | −0.077 | 0.044 |
| 0.38 | −0.054 | 0.076 |
| 0.41 | −0.019 | 0.112 |
| 0.45 | 0.030 | 0.149 |
| 0.49 | 0.093 | 0.187 |
| 0.53 | 0.171 | 0.226 |
| 0.56 | 0.262 | 0.264 |
| 0.60 | 0.369 | 0.303 |
| 0.64 | 0.490 | 0.343 |
| 0.68 | 0.627 | 0.384 |
| 0.71 | 0.777 | 0.416 |
| 0.75 | 0.935 | 0.414 |

*The optical effective radius of the object-side surface of lens 3 is 0.75 mm

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 35.

TABLE 35

(Embodiment 9)

| f [mm] | 1.00 | f/f1 | 0.67 |
|---|---|---|---|
| Fno | 1.65 | f/f2 | 1.98 |
| HFOV [deg.] | 42.6 | f1/f2 | 2.90 |
| CT2/f | 0.406 | FOV [deg.] | 85.2 |
| (R1 + R2)/(R1 − R2) | −0.48 | f/EPD | 1.65 |
| (R5 + R6)/(R5 − R6) | 0.52 | SL/TTL | 0.82 |
| R5/f | −1.35 | Td [mm] | 1.215 |

Embodiment 10

Figure 10A:
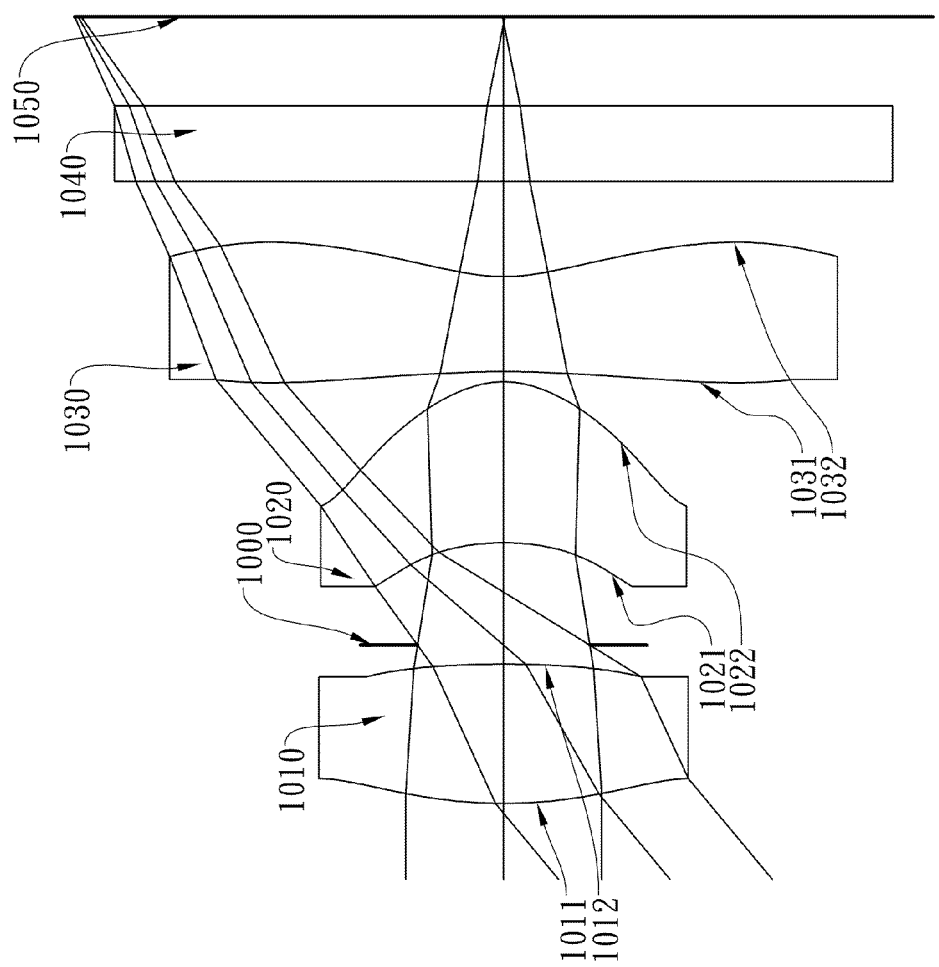
FIG. 10A shows an imaging lens system in accordance with the tenth embodiment of the present invention.
Figure 10B:
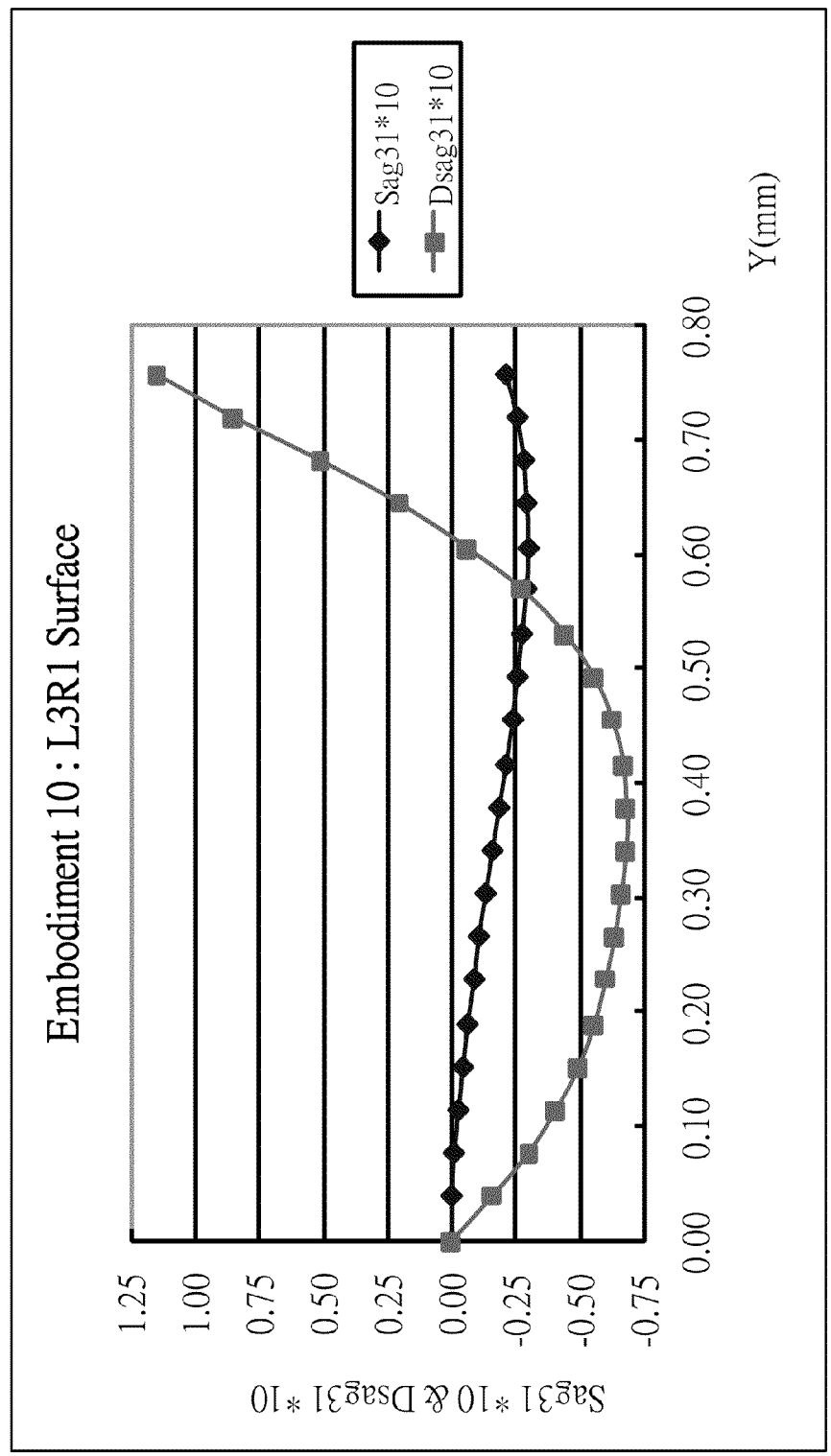
FIG. 10B shows the object-side surface characteristics of the third lens element of the tenth embodiment of the present invention.
Figure 10C:
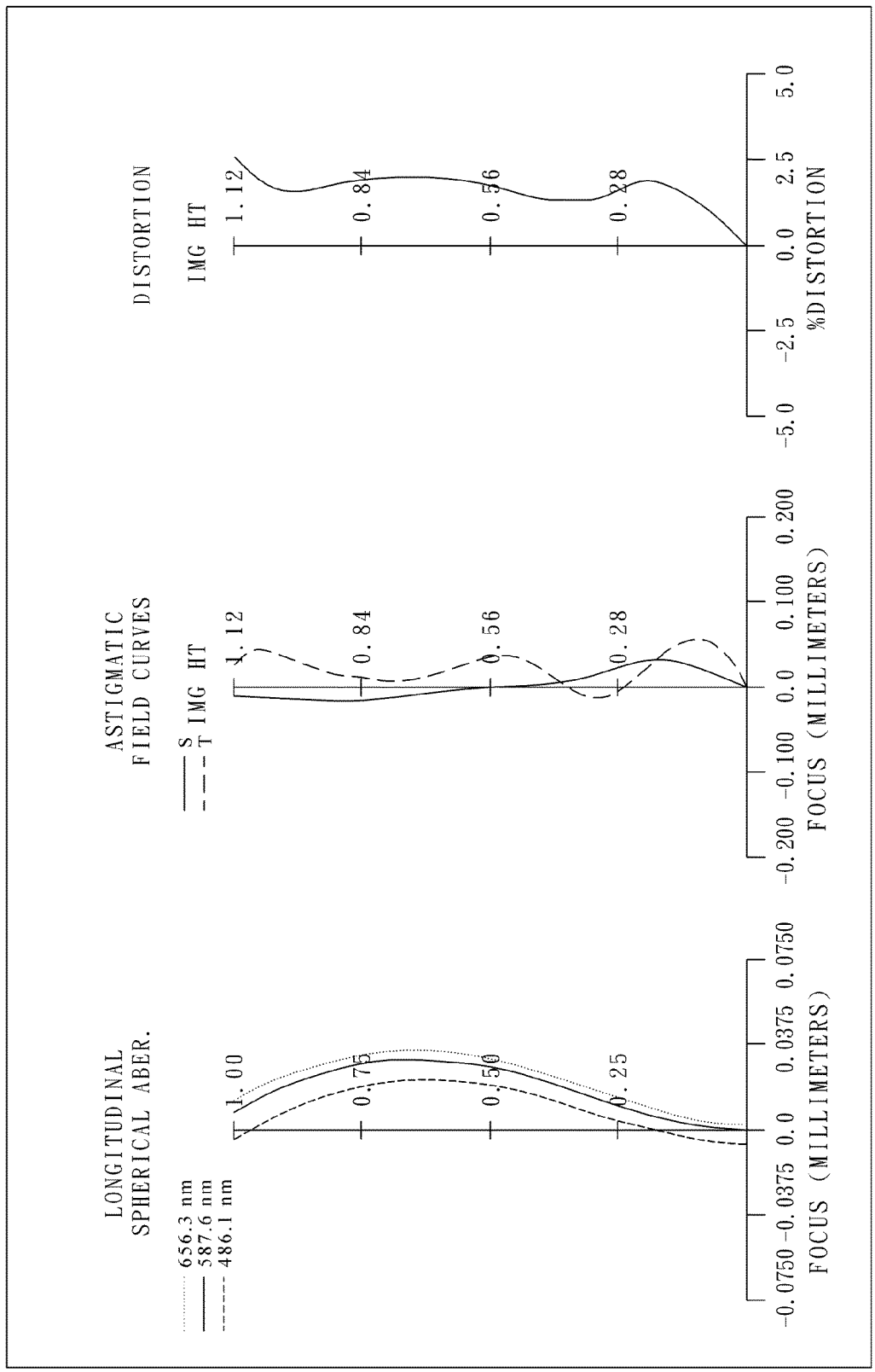
FIG. 10C shows the aberration curves of the tenth embodiment of the present invention.

FIG. 10A shows an imaging lens system in accordance with the tenth embodiment of the present invention, FIG. 10B shows the object-side surface characteristics of the third lens element of the tenth embodiment of the present invention, and FIG. 10C shows the aberration curves of the tenth embodiment of the present invention. The imaging lens system of the tenth embodiment of the present invention mainly comprises three lens elements, in order from an object side to an image side:

a plastic first lens element 1010 with positive refractive power having a convex at the paraxial region and concave at the peripheral region object-side surface 1011, a convex image-side surface 1012 at the paraxial region, and both of the object-side surface 1011 and image-side surface 1012 thereof being aspheric;

a plastic second lens element 1020 with positive refractive power having a concave object-side surface 1021 at the paraxial region, a convex image-side surface 1022 at the paraxial region, and both of the object-side surface 1021 and image-side surface 1022 thereof being aspheric; and a plastic third lens element 1030 with negative refractive power having a concave object-side surface 1031 at the paraxial region, a concave at the paraxial region and convex at the peripheral region image-side surface 1032, and both of the object-side surface 1031 and image-side surface 1032 thereof being aspheric, wherein the object-side surface 1031 of the third lens element 1030 has one critical point and the Dsag31 thereof switches signs once;

wherein the imaging lens system further comprises a stop 1000 disposed between the first lens element 1010 and the second lens element 1020;

the imaging lens system further comprises a filter element 1040 disposed between the image-side surface 1032 of the third lens element 1030 and an image plane 1050, and the filter element 1040 is made of glass and has no influence on the focal length of the imaging lens system.

The detailed optical data of the tenth embodiment is shown in TABLE 36, the aspheric surface data is shown in TABLE 37, and the object-side surface characteristics of the third lens element is shown in TABLE 38, wherein the units of the curvature radius, the thickness and the focal length are mm, and HFOV is half of the maximal field of view.

TABLE 36

(Embodiment 10)
f = 1.30 mm, Fno = 2.52, HFOV = 39.7 deg.

| Surface # | | Curvature Radius | | Thickness | Material | | Refractive Index | Focal Length |
|---|---|---|---|---|---|---|---|---|
| 0 | Object | Plano | | Infinity | | | | |
| 1 | Lens 1 | 1.227 | ASP | 0.367 | Plastic | ARTON-D4532 | 1.514 | 1.72 |
| 2 | | −2.864 | ASP | 0.050 | | | | |
| 3 | Ape. Stop | Plano | | 0.270 | | | | |
| 4 | Lens 2 | −0.644 | ASP | 0.424 | Plastic | ARTON-D4532 | 1.514 | 0.56 |
| 5 | | −0.243 | ASP | 0.027 | | | | |
| 6 | Lens 3 | −2.351 | ASP | 0.250 | Plastic | PC | 1.583 | −0.64 |
| 7 | | 0.462 | ASP | 0.250 | | | | |
| 8 | Filter | Plano | | 0.200 | Glass | HOYA BSC7 | 1.517 | — |
| 9 | | Plano | | 0.234 | | | | |
| 10 | Image | Plano | | — | | | | |

\* The reference wavelength is d-line 587.6 nm

TABLE 37

Aspheric Coefficients

| | Surface # | | | | | |
|---|---|---|---|---|---|---|
| | 1 | 2 | 4 | 5 | 6 | 7 |
| k = | −6.1485E+00 | −1.8269E+02 | −1.1359E+00 | −4.2483E+00 | −1.5898E+02 | −1.2512E+01 |
| A4 = | 5.7052E−01 | −1.2958E+00 | −2.0275E+00 | −1.1569E+01 | 6.2412E−02 | −7.9580E−01 |
| A6 = | −1.1467E+01 | 3.6674E+00 | −1.0445E+02 | 1.3209E+02 | −7.0074E−01 | 2.4025E+00 |
| A8 = | 1.2109E+02 | −1.6678E+01 | 3.3260E+03 | −1.0110E+03 | 3.4424E+00 | −5.5093E+00 |
| A10 = | −8.5936E+02 | 2.4897E+01 | −5.8622E+04 | 3.9050E+03 | −6.1498E+00 | 6.9198E+00 |
| A12 = | 3.4240E+03 | | 6.0817E+05 | −5.4340E+03 | 4.5164E+00 | −4.5732E+00 |
| A14 = | −7.2191E+03 | | −3.2051E+06 | | 1.7490E−01 | 1.7070E+00 |
| A16 = | 6.1024E+03 | | 6.5927E+06 | | −1.5231E+00 | −4.0758E−01 |

TABLE 38

Embodiment 10: Characteristics of the object-side surface of Lens 3

| Y (mm) | Sag31*10 | Dsag31*10 |
|---|---|---|
| 0.00 | 0.000 | 0.000 |
| 0.04 | −0.003 | −0.158 |
| 0.08 | −0.012 | −0.297 |
| 0.11 | −0.025 | −0.410 |
| 0.15 | −0.042 | −0.495 |
| 0.19 | −0.062 | −0.557 |
| 0.23 | −0.084 | −0.603 |
| 0.27 | −0.108 | −0.637 |
| 0.30 | −0.132 | −0.662 |
| 0.34 | −0.158 | −0.679 |
| 0.38 | −0.184 | −0.684 |
| 0.42 | −0.209 | −0.670 |
| 0.45 | −0.234 | −0.631 |
| 0.49 | −0.257 | −0.557 |
| 0.53 | −0.276 | −0.441 |
| 0.57 | −0.289 | −0.276 |
| 0.61 | −0.296 | −0.060 |
| 0.64 | −0.293 | 0.206 |
| 0.68 | −0.280 | 0.516 |
| 0.72 | −0.254 | 0.849 |
| 0.76 | −0.216 | 1.151 |

\*The optical effective radius of the object-side surface of lens 3 is 0.76 mm

The equation of the aspheric surface profiles of the tenth embodiment has the same form as that of the first embodiment. Moreover, the description of the factors in the relations is as those set forth in the first embodiment, but the values of the relations of the tenth embodiment are listed in the following TABLE 39.

TABLE 39

(Embodiment 10)

| f [mm] | 1.30 | f/f1 | 0.75 |
|---|---|---|---|
| Fno | 2.52 | f/f2 | 2.33 |
| HFOV [deg.] | 39.7 | f1/f2 | 3.09 |
| CT2/f | 0.326 | FOV [deg.] | 79.4 |
| (R1 + R2)/(R1 − R2) | −0.40 | f/EPD | 2.52 |
| (R5 + R6)/(R5 − R6) | 0.67 | SL/TTL | 0.79 |
| R5/f | −1.81 | Td [mm] | 1.388 |

Embodiment 11

Figure 11A:
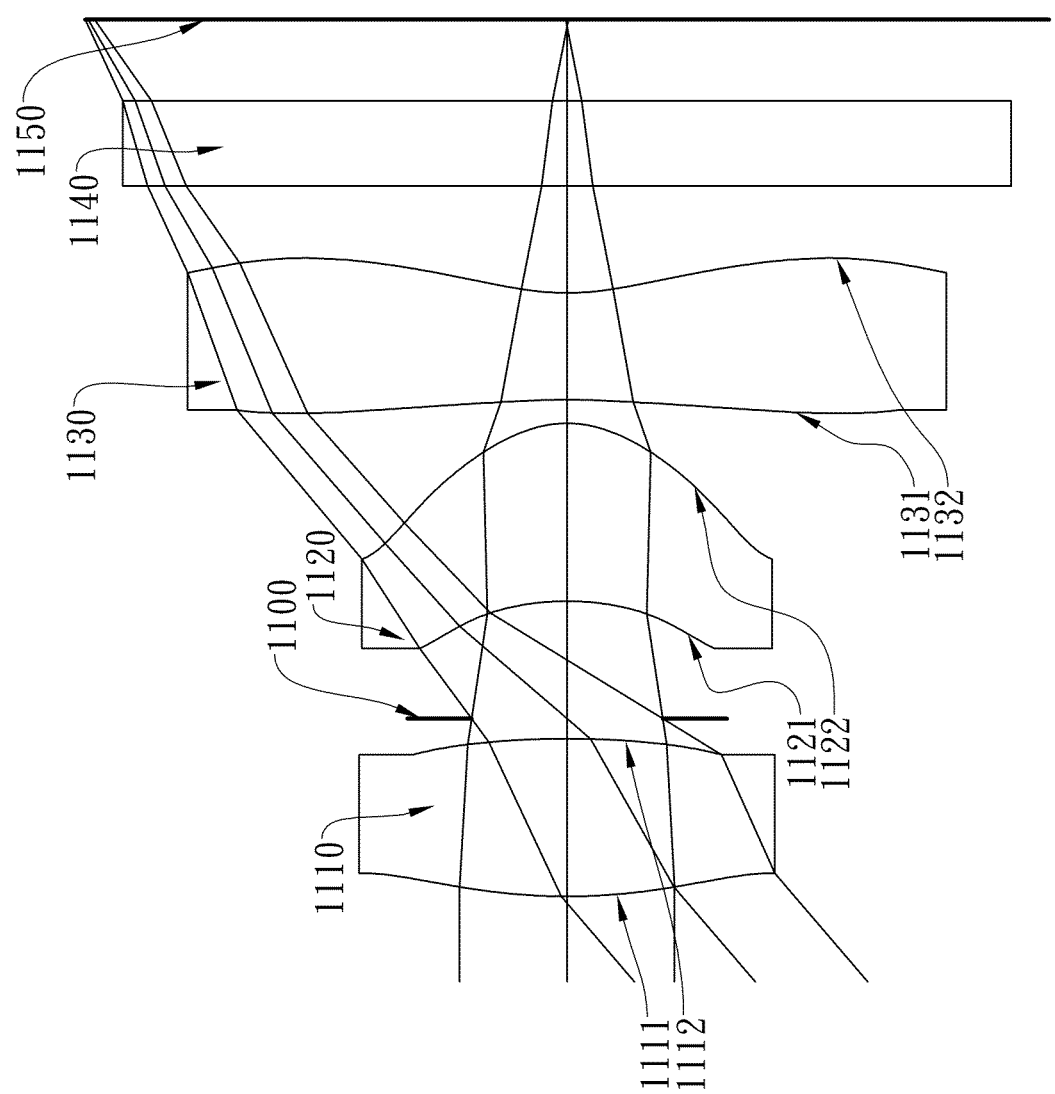
FIG. 11A shows an imaging lens system in accordance with the eleventh embodiment of the present invention.
Figure 11B:
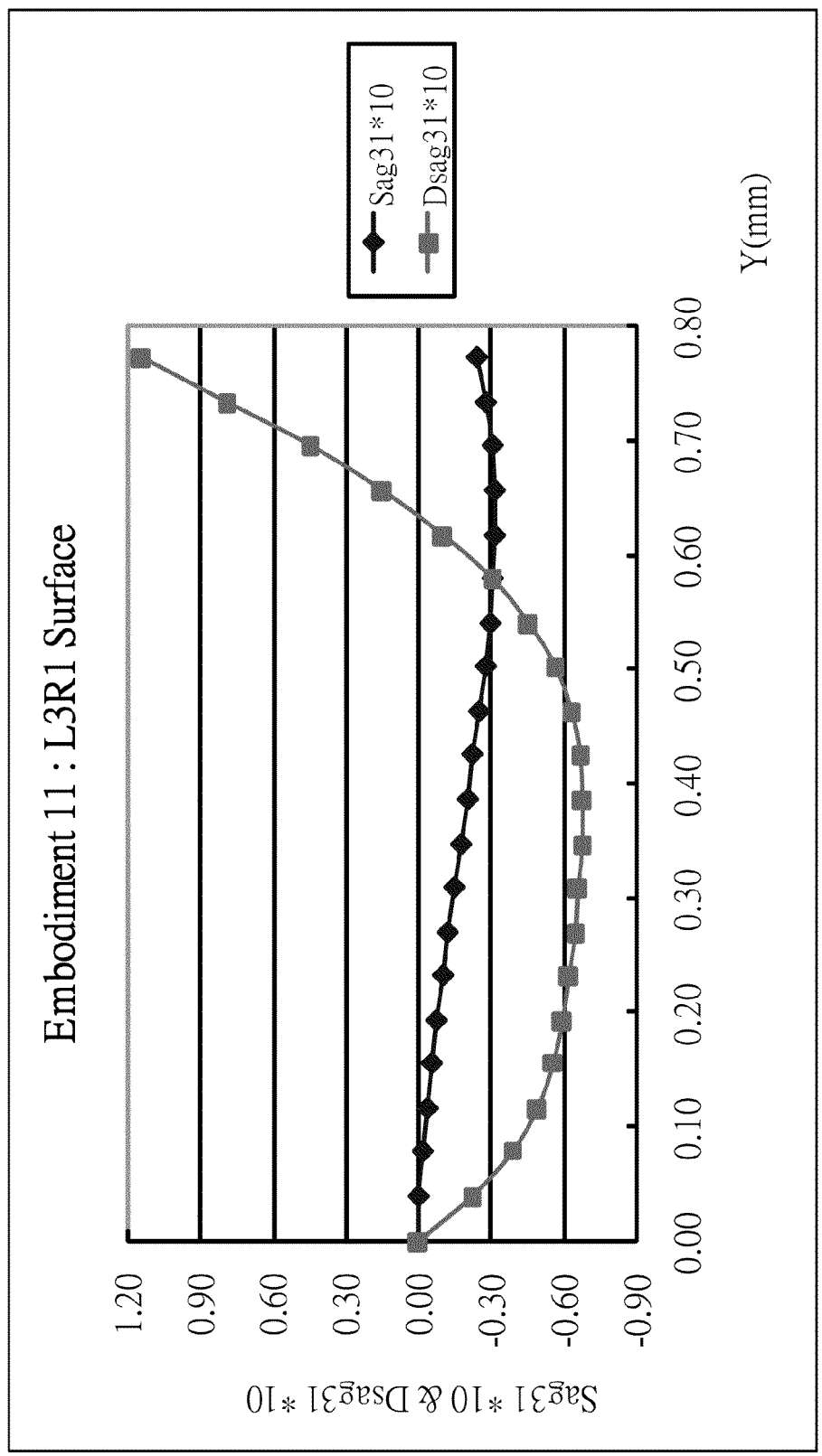
FIG. 11B shows the object-side surface characteristics of the third lens element of the eleventh embodiment of the present invention.
Figure 11C:
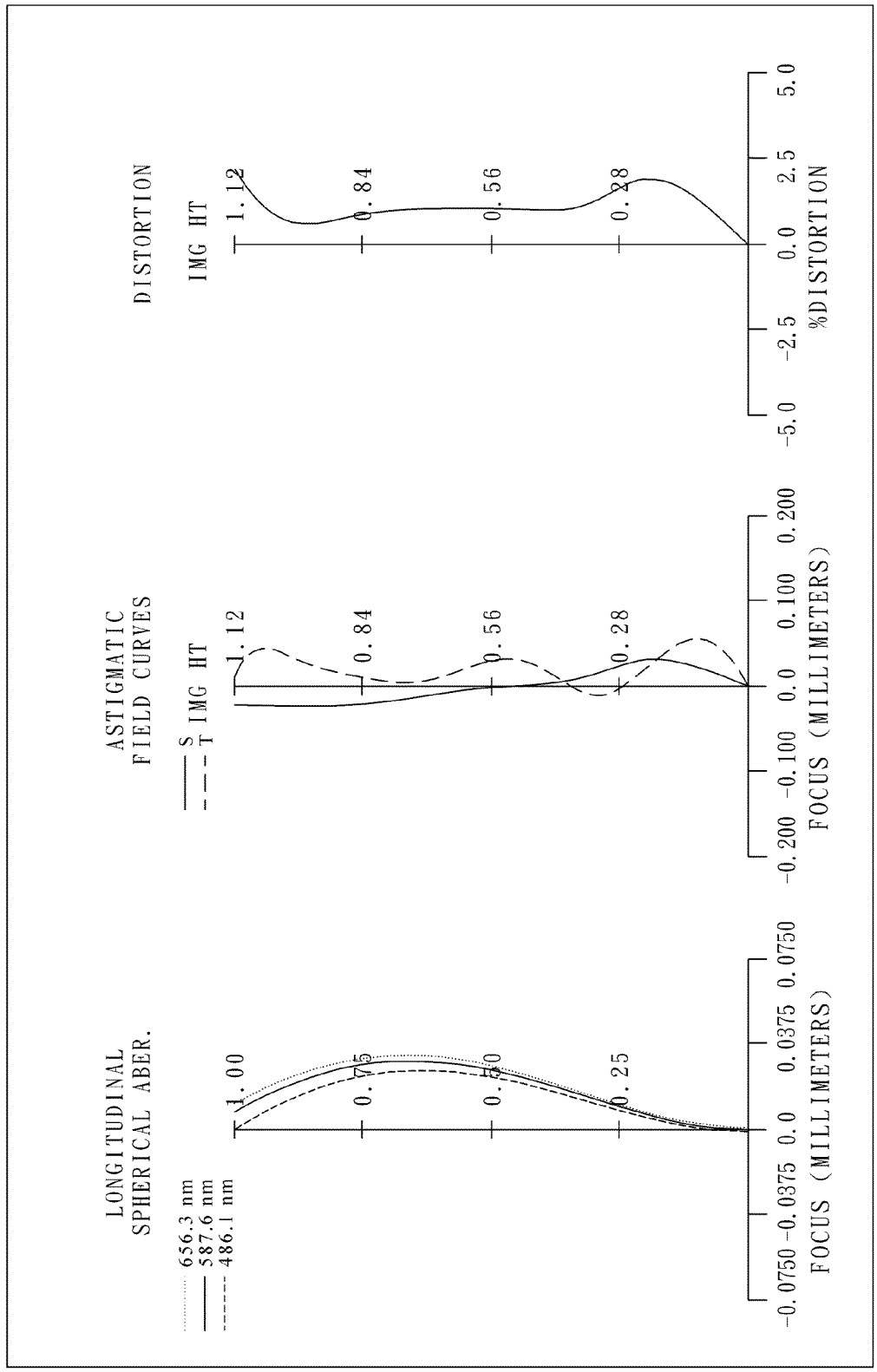
FIG. 11C shows the aberration curves of the eleventh embodiment of the present invention.

FIG. 11A shows an imaging lens system in accordance with the eleventh embodiment of the present invention, FIG. 11B shows the object-side surface characteristics of the third lens element of the eleventh embodiment of the present invention, and FIG. 11C shows the aberration curves of the eleventh embodiment of the present invention. The imaging lens system of the eleventh embodiment of the present invention mainly comprises three lens elements, in order from an object side to an image side:

a plastic first lens element 1110 with positive refractive power having a convex at the paraxial region and concave at the peripheral region object-side surface 1111, a convex image-side surface 1112 at the paraxial region, and both of the object-side surface 1111 and image-side surface 1112 thereof being aspheric;

a plastic second lens element 1120 with positive refractive power having a concave object-side surface 1121 at the paraxial region, a convex image-side surface 1122 at the paraxial region, and both of the object-side surface 1121 and image-side surface 1122 thereof being aspheric; and a plastic third lens element 1130 with negative refractive power having a concave object-side surface 1131 at the paraxial region, a concave at the paraxial region and convex at the peripheral region image-side surface 1132, and both of the object-side surface 1131 and image-side surface 1132 thereof being aspheric, wherein the object-side surface 1131 of the third lens element 1130 has one critical point and the Dsag31 thereof switches signs once;

wherein the imaging lens system further comprises a stop 1100 disposed between the first lens element 1110 and the second lens element 1120;

the imaging lens system further comprises a filter element 1140 disposed between the image-side surface 1132 of the third lens element 1130 and an image plane 1150, and the filter element 1140 is made of glass and has no influence on the focal length of the imaging lens system.

The detailed optical data of the eleventh embodiment is shown in TABLE 40, the aspheric surface data is shown in TABLE 41, and the object-side surface characteristics of the third lens element is shown in TABLE 42, wherein the units of the curvature radius, the thickness and the focal length are mm, and HFOV is half of the maximal field of view.

TABLE 42

Embodiment 11: Characteristics of the object-side surface of Lens 3

| Y (mm) | Sag31*10 | Dsag31*10 |
|---|---|---|
| 0.00 | 0.000 | 0.000 |
| 0.04 | −0.004 | −0.221 |
| 0.08 | −0.016 | −0.388 |
| 0.12 | −0.034 | −0.494 |
| 0.15 | −0.054 | −0.559 |
| 0.19 | −0.076 | −0.599 |
| 0.23 | −0.100 | −0.626 |
| 0.27 | −0.125 | −0.646 |
| 0.31 | −0.150 | −0.662 |
| 0.35 | −0.176 | −0.674 |
| 0.39 | −0.202 | −0.677 |
| 0.43 | −0.228 | −0.665 |
| 0.46 | −0.253 | −0.630 |
| 0.50 | −0.276 | −0.563 |
| 0.54 | −0.296 | −0.456 |
| 0.58 | −0.310 | −0.304 |
| 0.62 | −0.318 | −0.104 |
| 0.66 | −0.318 | 0.147 |
| 0.70 | −0.307 | 0.448 |
| 0.73 | −0.283 | 0.792 |
| 0.77 | −0.245 | 1.137 |

*The optical effective radius of the object-side surface of lens 3 is 0.77 mm

The equation of the aspheric surface profiles of the eleventh embodiment has the same form as that of the first embodiment. Moreover, the description of the factors in the relations is as those set forth in the first embodiment, but the values of the relations of the eleventh embodiment are listed in the following TABLE 43.

TABLE 40

(Embodiment 11)
f = 1.27 mm, Fno = 2.52, HFOV = 40.5 deg.

| Surface # |  | Curvature Radius | Thickness | Material |  | Refractive Index | Focal Length |
|---|---|---|---|---|---|---|---|
| 0 | Object | Plano | Infinity |  |  |  |  |
| 1 | Lens 1 | 1.362 ASP | 0.369 | Plastic | ARTON-D4532 | 1.514 | 1.72 |
| 2 |  | −2.271 ASP | 0.047 |  |  |  |  |
| 3 | Ape. Stop | Plano | 0.275 |  |  |  |  |
| 4 | Lens 2 | −0.660 ASP | 0.417 | Plastic | ARTON-D4532 | 1.514 | 0.56 |
| 5 |  | −0.243 ASP | 0.055 |  |  |  |  |
| 6 | Lens 3 | −1.662 ASP | 0.250 | Plastic | TEIJIN SP3810 | 1.640 | −0.62 |
| 7 |  | 0.555 ASP | 0.250 |  |  |  |  |
| 8 | Filter | Plano | 0.200 | Glass | HOYA BSC7 | 1.517 | — |
| 9 |  | Plano | 0.190 |  |  |  |  |
| 10 | Image | Plano | — |  |  |  |  |

* The reference wavelength is d-line 587.6 nm

TABLE 41

Aspheric Coefficients

| | Surface # | | | | | |
|---|---|---|---|---|---|---|
| | 1 | 2 | 4 | 5 | 6 | 7 |
| k = | −8.6471E+00 | −1.1094E+02 | −1.9083E+00 | −4.3587E+00 | −2.0000E+02 | −1.3682E+01 |
| A4 = | 5.2457E−01 | −1.3277E+00 | −1.7892E+00 | −1.1519E+01 | 5.2045E−02 | −7.9853E−01 |
| A6 = | −1.1462E+01 | 3.5755E+00 | −1.0538E+02 | 1.3214E+02 | −7.1340E−01 | 2.4608E+00 |
| A8 = | 1.2121E+02 | −1.5328E+01 | 3.3210E+03 | −1.0105E+03 | 3.4231E+00 | −5.5384E+00 |
| A10 = | −8.5934E+02 | 2.7378E+01 | −5.8614E+04 | 3.9068E+03 | −6.1467E+00 | 6.8945E+00 |
| A12 = | 3.4238E+03 |  | 6.0814E+05 | −5.4337E+03 | 4.5399E+00 | −4.5754E+00 |
| A14 = | −7.2194E+03 |  | −3.2049E+06 |  | 1.9968E−01 | 1.7106E+00 |
| A16 = | 6.1522E+03 |  | 6.6163E+06 |  | −1.4726E+00 | −3.8233E−01 |

TABLE 43

(Embodiment 11)

| | | | |
|---|---|---|---|
| f [mm] | 1.27 | f/f1 | 0.74 |
| Fno | 2.52 | f/f2 | 2.27 |
| HFOV [deg.] | 40.5 | f1/f2 | 3.07 |
| CT2/f | 0.334 | FOV [deg.] | 81.0 |
| (R1 + R2)/(R1 − R2) | −0.25 | f/EPD | 2.52 |
| (R5 + R6)/(R5 − R6) | 0.50 | SL/TTL | 0.79 |
| R5/f | −1.31 | Td [mm] | 1.413 |

Embodiment 12

Figure 12A:
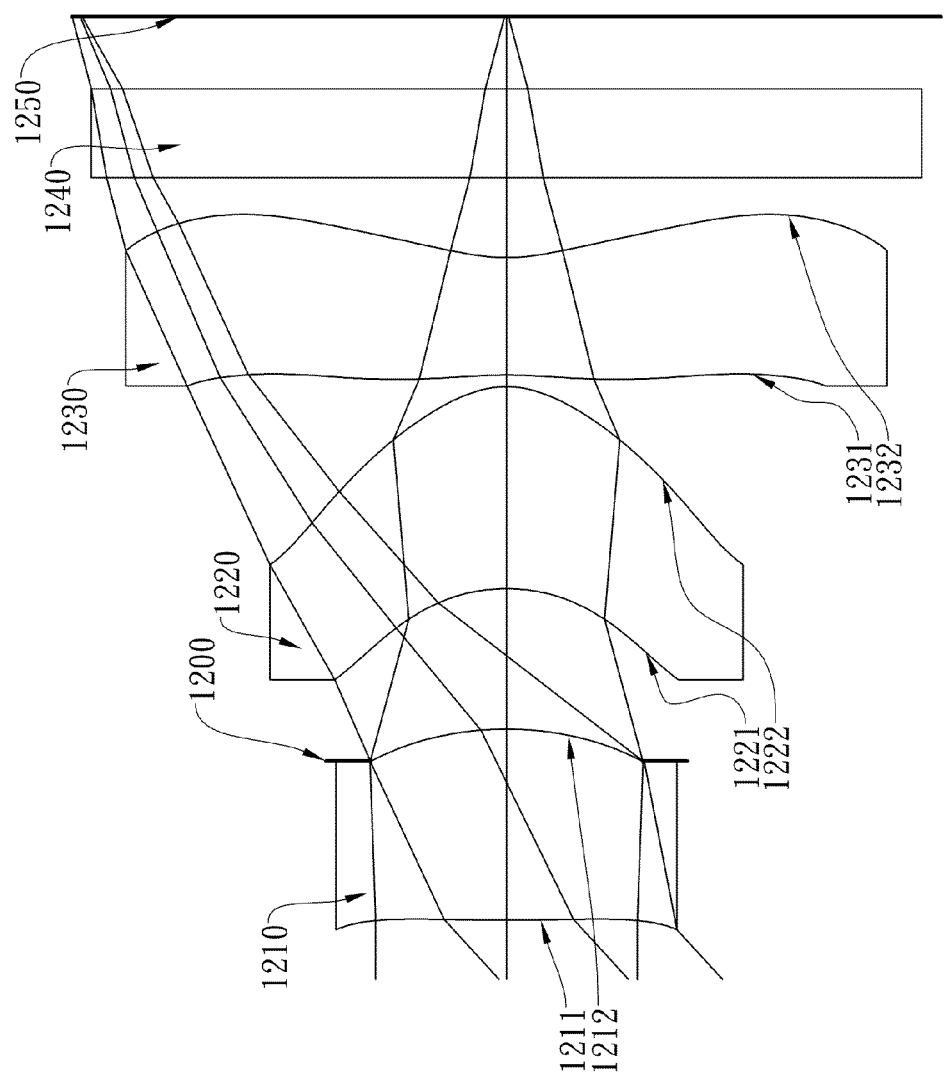
FIG. 12A shows an imaging lens system in accordance with the twelfth embodiment of the present invention.
Figure 12B:
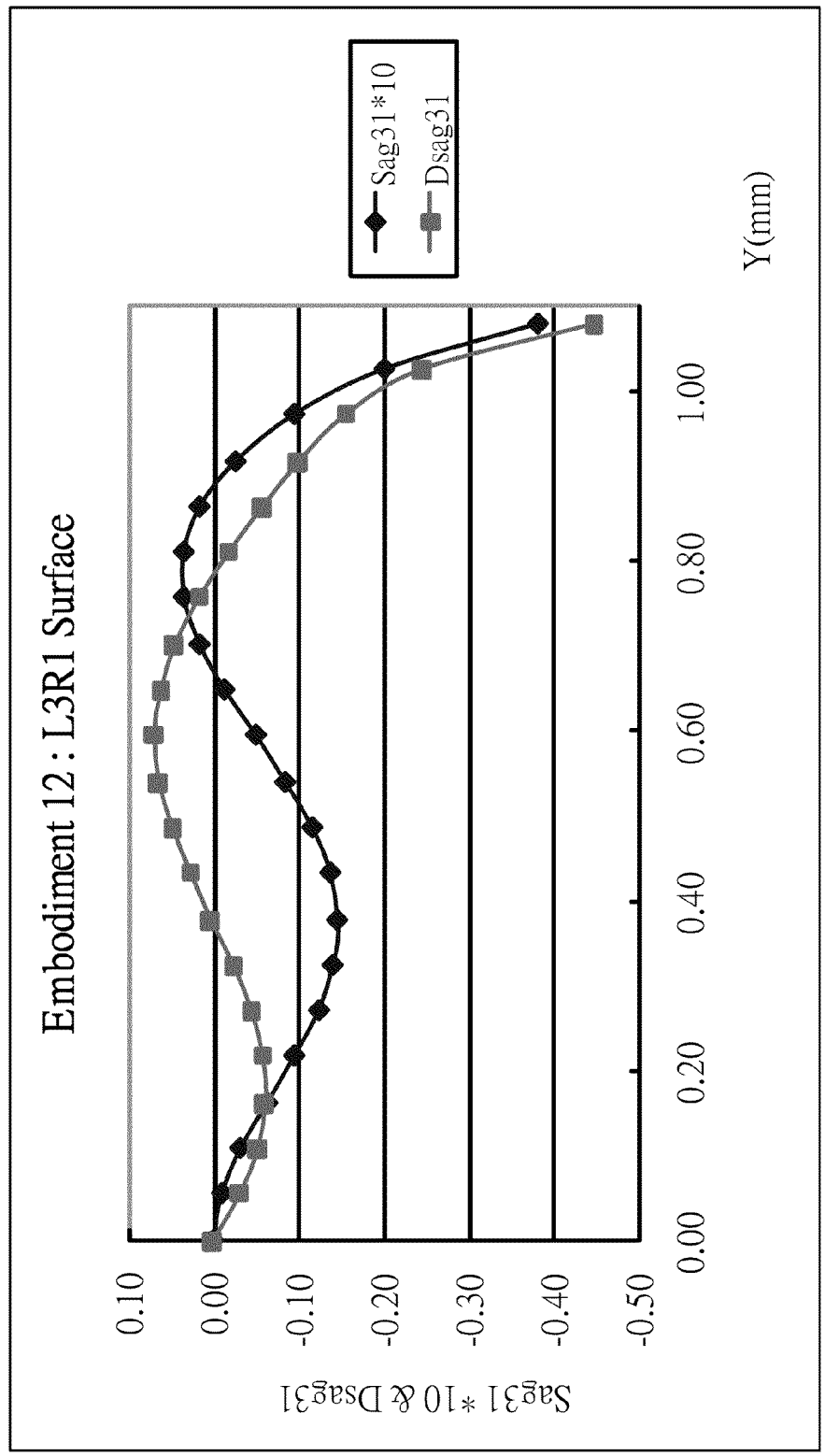
FIG. 12B shows the object-side surface characteristics of the third lens element of the twelfth embodiment of the present invention.
Figure 12C:
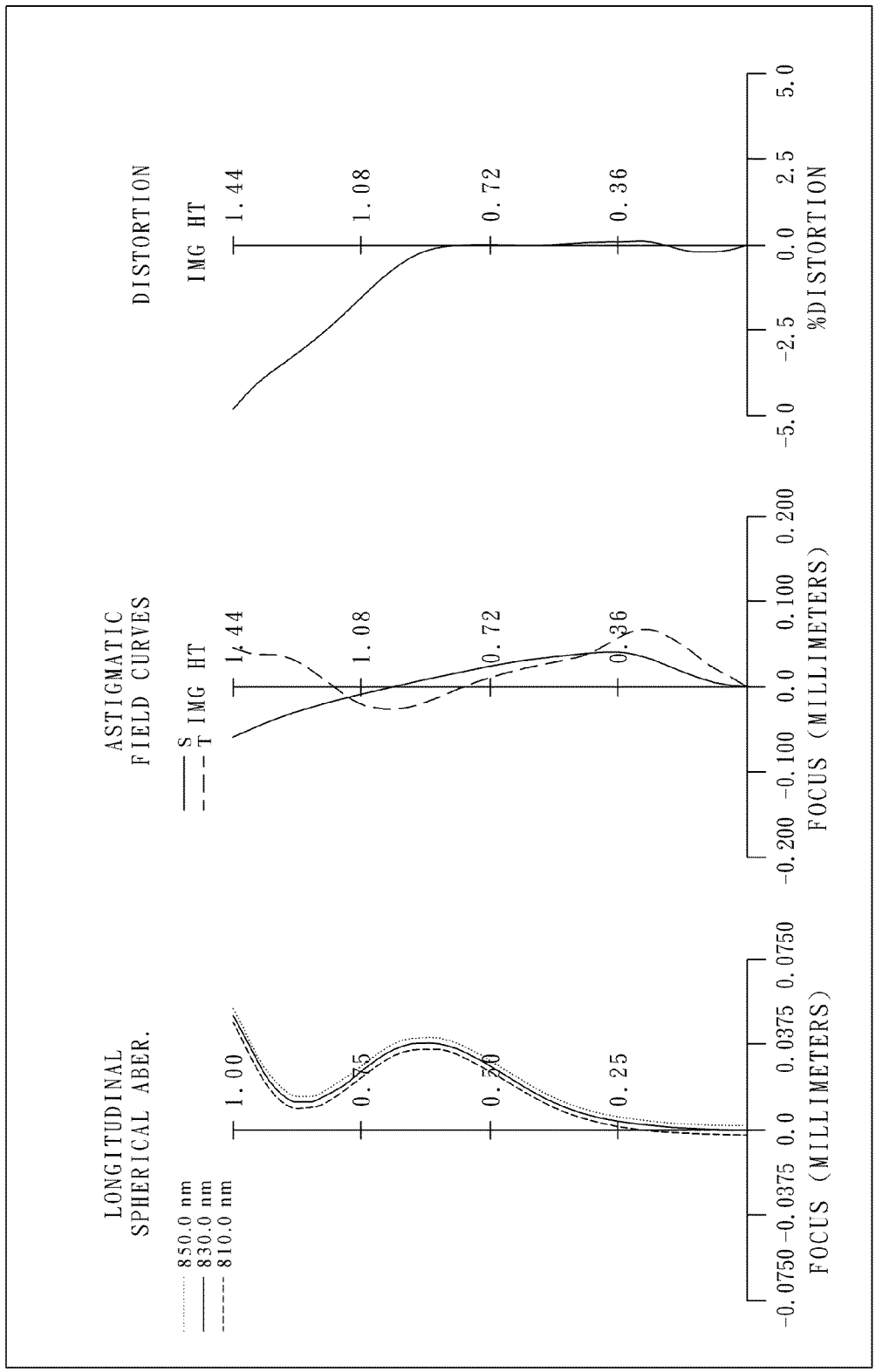
FIG. 12C shows the aberration curves of the twelfth embodiment of the present invention.

FIG. 12A shows an imaging lens system in accordance with the twelfth embodiment of the present invention, FIG. 12B shows the object-side surface characteristics of the third lens element of the twelfth embodiment of the present invention, and FIG. 12C shows the aberration curves of the twelfth embodiment of the present invention. The imaging lens system of the twelfth embodiment of the present invention mainly comprises three lens elements, in order from an object side to an image side:

a plastic first lens element 1210 with positive refractive power having a convex at the paraxial region and concave at the peripheral region object-side surface 1211, a convex image-side surface 1212 at the paraxial region, and both of the object-side surface 1211 and image-side surface 1212 thereof being aspheric;

a plastic second lens element 1220 with positive refractive power having a concave object-side surface 1221 at the paraxial region, a convex image-side surface 1222 at the paraxial region, and both of the object-side surface 1221 and image-side surface 1222 thereof being aspheric; and a plastic third lens element 1230 with negative refractive power having a concave object-side surface 1231 at the paraxial region, a concave at the paraxial region and convex at the peripheral region image-side surface 1232, and both of the object-side surface 1231 and image-side surface 1232 thereof being aspheric, wherein the object-side surface 1231 of the third lens element 1230 has two critical points and the Dsag31 thereof switches signs twice;

wherein the imaging lens system further comprises a stop 1200 disposed between the first lens element 1210 and the second lens element 1220, and the stop 1200 is closer to the object side than an intersection of the image-side surface 1212 of the first lens element 1210 and the optical axis;

the imaging lens system further comprises a filter element 1240 disposed between the image-side surface 1232 of the third lens element 1230 and an image plane 1250, and the filter element 1240 is made of glass and has no influence on the focal length of the imaging lens system.

The detailed optical data of the twelfth embodiment is shown in TABLE 44, the aspheric surface data is shown in TABLE 45, and the object-side surface characteristics of the third lens element is shown in TABLE 46, wherein the units of the curvature radius, the thickness and the focal length are mm, and HFOV is half of the maximal field of view.

TABLE 44

(Embodiment 12)
f = 1.64 mm, Fno = 1.85, HFOV = 42.5 deg.

| Surface # | | Curvature Radius | | Thickness | Material | | Refractive Index | Focal Length |
|---|---|---|---|---|---|---|---|---|
| 0 | Object | Plano | | Infinity | | | | |
| 1 | Lens 1 | 7.989 | ASP | 0.646 | Plastic | PC | 1.569 | 1.72 |
| 2 | | −1.085 | ASP | −0.108 | | | | |
| 3 | Ape. Stop | Plano | | 0.583 | | | | |
| 4 | Lens 2 | −0.595 | ASP | 0.683 | Plastic | PC | 1.569 | 0.60 |
| 5 | | −0.307 | ASP | 0.039 | | | | |
| 6 | Lens 3 | −1.623 | ASP | 0.397 | Plastic | PC | 1.569 | −0.69 |
| 7 | | 0.569 | ASP | 0.270 | | | | |
| 8 | Filter | Plano | | 0.300 | Glass | HOYA BSC7 | 1.510 | — |
| 9 | | Plano | | 0.244 | | | | |
| 10 | Image | Plano | | — | | | | |

* The optical system can be applied in an infrared wavelength range; the reference wavelength is 830 nm

TABLE 45

Aspheric Coefficients

| | Surface # | | | | | |
|---|---|---|---|---|---|---|
| | 1 | 2 | 4 | 5 | 6 | 7 |
| k = | −4.3694E+01 | −2.7829E+01 | −5.0788E−01 | −3.0677E+00 | −9.0000E+01 | −1.5320E+01 |
| A4 = | 2.3428E−01 | −2.5657E+00 | −1.5869E+00 | −1.6919E+00 | 7.5448E−01 | −2.4849E−01 |
| A6 = | −1.0794E+01 | 1.6410E+01 | 1.5353E+01 | 5.1127E+00 | −1.6698E+00 | 8.2194E−01 |
| A8 = | 1.0527E+02 | −9.0914E+01 | −8.5809E+01 | −9.1971E+00 | 1.7589E+00 | −1.5531E+00 |
| A10 = | −6.0191E+02 | 3.0153E+02 | 2.6044E+02 | 1.2895E+00 | −1.1147E+00 | 1.4549E+00 |
| A12 = | 1.9283E+03 | −4.6460E+02 | −2.8273E+02 | 1.8259E+01 | 3.9171E−01 | −7.3832E−01 |
| A14 = | −3.2385E+03 | 1.7768E+02 | −4.6557E−10 | −1.5320E+01 | −7.7073E−03 | 1.9665E−01 |
| A16 = | 2.1903E+03 | | | | −3.7835E−02 | −2.2288E−02 |

TABLE 46

Embodiment 12: Characteristics of the object-side surface of Lens 3

| Y (mm) | Sag31*10 | Dsag31 |
|---|---|---|
| 0.00 | 0.000 | 0.000 |
| 0.05 | −0.009 | −0.031 |
| 0.11 | −0.032 | −0.053 |
| 0.16 | −0.063 | −0.061 |
| 0.22 | −0.096 | −0.057 |
| 0.27 | −0.123 | −0.043 |
| 0.32 | −0.141 | −0.022 |
| 0.38 | −0.146 | 0.003 |
| 0.43 | −0.137 | 0.028 |
| 0.49 | −0.116 | 0.050 |
| 0.54 | −0.085 | 0.064 |
| 0.59 | −0.048 | 0.069 |
| 0.65 | −0.012 | 0.063 |
| 0.70 | 0.018 | 0.046 |
| 0.76 | 0.035 | 0.018 |
| 0.81 | 0.036 | −0.017 |
| 0.86 | 0.016 | −0.057 |
| 0.92 | −0.027 | −0.101 |
| 0.97 | −0.095 | −0.155 |
| 1.03 | −0.200 | −0.246 |
| 1.08 | −0.380 | −0.446 |

*The optical effective radius of the object-side surface of lens 3 is 1.08 mm

The equation of the aspheric surface profiles of the twelfth embodiment has the same form as that of the first embodiment. Moreover, the description of the factors in the relations is as those set forth in the first embodiment, but the values of the relations of the twelfth embodiment are listed in the following TABLE 47.

TABLE 47

(Embodiment 12)

| f [mm] | 1.64 | f/f1 | 0.95 |
|---|---|---|---|
| Fno | 1.85 | f/f2 | 2.73 |
| HFOV [deg.] | 42.5 | f1/f2 | 2.88 |
| CT2/f | 0.418 | FOV [deg.] | 85.0 |
| (R1 + R2)/(R1 − R2) | 0.76 | f/EPD | 1.85 |
| (R5 + R6)/(R5 − R6) | 0.48 | SL/TTL | 0.82 |
| R5/f | −0.99 | Td [mm] | 2.240 |

It is to be noted that TABLES 1-47 show different data of the different embodiments; however, the data of the different embodiments are obtained from experiments. Therefore, any imaging lens system of the same structure is considered to be within the scope of the present invention even if it uses different data. The embodiments depicted above and the appended drawings are exemplary and are not intended to limit the scope of the present invention.

What is claimed is:

1. An imaging lens system, in order from an object side to an image side comprising:
a first lens element with positive refractive power having a convex object-side surface at a paraxial region and a convex image-side surface at a paraxial region;
a plastic second lens element with positive refractive power having a concave object-side surface at a paraxial region, a convex image-side surface at a paraxial region, and both of the object-side and image-side surfaces thereof being aspheric; and
a plastic third lens element with negative refractive power having a concave object-side surface at a paraxial region, a concave at a paraxial region and convex at a peripheral region image-side surface, and both of the object-side and image-side surfaces thereof being aspheric;
wherein the lens elements of the imaging lens system with refractive power are only the first lens element, the second lens element, and the third lens element, a curvature radius of the object-side surface of the first lens element is R1, a curvature radius of the image-side surface of the first lens element is R2, a focal length of the first lens element is f1, a focal length of the second lens element is f2, and they satisfy the following relations:

$-0.5<(R1+R2)/(R1-R2)<1.0$; and $1.65<f1/f2<5.0$.

2. The imaging lens system according to claim 1, wherein the imaging lens system further comprises a stop disposed between the first lens element and the second lens element, an axial distance between the stop and an image plane is SL, an axial distance between the object-side surface of the first lens element and the image plane is TTL, and they satisfy the following relation:

$0.65<SL/TTL<0.88$.

3. The imaging lens system according to claim 2, wherein the focal length of the first lens element is f1, the focal length of the second lens element is f2, and they satisfy the following relation:

$2.0<f1/f2<3.4$.

4. The imaging lens system according to claim 3, wherein at least one critical point is formed on the object-side surface of the third lens element.

5. The imaging lens system according to claim 3, wherein a curvature radius of the object-side surface of the third lens element is R5, a focal length of the imaging lens system is f, and they satisfy the following relation:

$-1.33<R5/f<-0.55$.

6. The imaging lens system according to claim 3, wherein a central thickness of the second lens element is CT2, a focal length of the imaging lens system is f, and they satisfy the following relation:

$0.28<CT2/f<0.50$.

7. The imaging lens system according to claim 3, wherein the imaging lens system is used for optical wavelengths ranging from 780 nm to 950 nm.

8. The imaging lens system according to claim 1, wherein the curvature radius of the object-side surface of the first lens element is R1, the curvature radius of the image-side surface of the first lens element is R2, and they satisfy the following relation:

$-0.1<(R1+R2)/(R1-R2)<0.8$.

9. The imaging lens system according to claim 8, wherein a curvature radius of the object-side surface of the third lens element is R5, a curvature radius of the image-side surface of the third lens element is R6, and they satisfy the following relation:

$0<(R5+R6)/(R5-R6)<0.8$.

10. The imaging lens system according to claim 8, wherein the imaging lens system further comprises a stop, and the stop is closer to the object side than a vertex on the optical axis of the image-side surface of the first lens element.

11. The imaging lens system according to claim 8, wherein a focal length of the imaging lens system is f, the focal length of the second lens element is f2, and they satisfy the following relation:

$2.0<f/f2<3.6$.

12. The imaging lens system according to claim 1, wherein a distance in parallel with an optical axis from a point on the object-side surface of the third lens element to an axial vertex on the object-side surface of the third lens element is Sag31, a height perpendicular to the optical axis from the point on the object-side surface of the third lens element to the optical axis is Y, a derivative of the distance Sag31 with respect to the height Y is Dsag31, and Dsag31 changes from positive to negative or vice versa at least twice between a paraxial region and a peripheral region of the object-side surface of the third lens element.

13. The imaging lens system according to claim 1, wherein the object-side surface of the first lens element is concave at a peripheral region.

14. The imaging lens system according to claim 1, wherein an axial distance between the object-side surface of the first lens element and the image-side surface of the third lens element is Td, and it satisfies the following relation:

1.0 mm<$Td$<2.70 mm.

15. An imaging lens system, in order from an object side to an image side comprising:
 a first lens element with positive refractive power having a convex object-side surface at a paraxial region and a convex image-side surface at a paraxial region;
 a plastic second lens element with positive refractive power having a concave object-side surface at a paraxial region, a convex image-side surface at a paraxial region, and both of the object-side and image-side surfaces thereof being aspheric; and
 a plastic third lens element with negative refractive power having a concave at a paraxial region and convex at a peripheral region image-side surface, and both of an object-side surface and the image-side surface thereof being aspheric;
 wherein the lens elements of the imaging lens system with refractive power are only the first lens element, the second lens element, and the third lens element, the imaging lens system is used for optical wavelengths ranging from 780 nm to 950 nm, a curvature radius of the object-side surface of the first lens element is R1, a curvature radius of the image-side surface of the first lens element is R2, a focal length of the first lens element is f1, a focal length of the second lens element is f2, and they satisfy the following relation:

−0.5<($R1$+$R2$)/($R1$−$R2$)<1.0; and 2.0<$f1/f2$<3.4.

16. The imaging lens system according to claim 15, wherein an object-side surface of the third lens element is concave at a paraxial region.

17. The imaging lens system according to claim 15, wherein an axial distance between the object-side surface of the first lens element and the image-side surface of the third lens element is Td, and it satisfies the following relation:

1.0 mm<$Td$<2.70 mm.

18. The imaging lens system according to claim 15, wherein a distance in parallel with an optical axis from a point on the object-side surface of the third lens element to an axial vertex on the object-side surface of the third lens element is Sag31, a height perpendicular to the optical axis from the point on the object-side surface of the third lens element to the optical axis is Y, a derivative of the distance Sag31 with respect to the height Y is Dsag31, and Dsag31 changes from positive to negative or vice versa at least twice between a paraxial region and a peripheral region of the object-side surface of the third lens element.

\* \* \* \* \*